US010231229B2

(12) United States Patent
Zhang et al.

(10) Patent No.: US 10,231,229 B2
(45) Date of Patent: *Mar. 12, 2019

(54) COMMUNICATION METHOD, DEVICE, AND SYSTEM

(71) Applicant: Huawei Technologies Co., Ltd., Shenzhen, Guangdong (CN)

(72) Inventors: Tao Zhang, Beijing (CN); Bo Lin, Beijing (CN); Yongqiang Gao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/714,872

(22) Filed: Sep. 25, 2017

(65) Prior Publication Data
US 2018/0014288 A1 Jan. 11, 2018

Related U.S. Application Data

(63) Continuation of application No. 14/830,522, filed on Aug. 19, 2015, now Pat. No. 9,807,752, which is a (Continued)

(51) Int. Cl.
H04W 72/04 (2009.01)
H04W 56/00 (2009.01)
(Continued)

(52) U.S. Cl.
CPC ..... H04W 72/042 (2013.01); H04W 56/0045 (2013.01); H04W 72/0413 (2013.01); H04W 16/32 (2013.01); H04W 36/0016 (2013.01)

(58) Field of Classification Search
CPC ..... H04W 36/08; H04W 36/12; H04W 36/14; H04W 36/18; H04W 36/30;
(Continued)

(56) References Cited

U.S. PATENT DOCUMENTS

2006/0265480 A1 11/2006 Kim et al.
2010/0265842 A1 10/2010 Khandekar et al.
(Continued)

FOREIGN PATENT DOCUMENTS

CN 101940023 A 1/2011
CN 102158981 A 8/2011
(Continued)

OTHER PUBLICATIONS

"3rd Generation Partnership Project;Technical Specification Group Radio Access Network;Evolved Universal Terrestrial Radio Access (E-UTRA);Packet Data Convergence Protocol (PDCP) specification(Release 11)"; 3GPP TS 36.323 V11.1.0; Dec. 2012; 27 pages.
(Continued)

Primary Examiner — Dady Chery

(57) ABSTRACT

The present disclosure describes a communication method, including: sending, by a user equipment (UE), a request message to a micro network node, so that the micro network node sends an indication message to a macro network node; receiving an uplink resource sent according to the indication message by the macro network node; and sending uplink signaling or uplink data to the macro network node according to the uplink resource. The present disclosure further describes a corresponding device and system. The micro network node participates in accessing the user equipment (UE) to a network so that a UE can rapidly access the network and reduce access delay.

21 Claims, 21 Drawing Sheets

Related U.S. Application Data continuation of application No. PCT/CN2013/071776, filed on Feb. 22, 2013.

(51) Int. Cl.
*H04W 36/00* (2009.01)
*H04W 16/32* (2009.01)

(58) Field of Classification Search
CPC . H04W 36/0083; H04W 36/32; H04W 16/32; H04W 36/04; H04W 84/045; H04W 92/02; H04W 72/00; H04B 7/2121; H04B 7/2123; H04J 2203/0069; H04Q 2213/394
USPC .......... 370/329, 341, 331, 332; 455/436–444
See application file for complete search history.

(56) References Cited

U.S. PATENT DOCUMENTS

| | | | |
|---|---|---|---|
| 2011/0111693 | A1 | 5/2011 | Nakao et al. |
| 2012/0026972 | A1 | 2/2012 | Miao |
| 2012/0309405 | A1 | 12/2012 | Parkvall et al. |
| 2015/0031369 | A1 | 1/2015 | Gunnarsson |
| 2018/0139738 | A1 | 5/2018 | Matsuo et al. |

FOREIGN PATENT DOCUMENTS

| | | | |
|---|---|---|---|
| CN | 102202311 A | | 9/2011 |
| CN | 102300156 A | | 12/2011 |
| CN | 102405681 A | | 4/2012 |
| CN | 102474878 A | | 5/2012 |
| JP | 2006-325213 A | | 11/2006 |
| JP | 2007013827 A | | 1/2007 |
| JP | 2009-246508 A | | 10/2009 |
| JP | 2011-211321 A | | 10/2011 |
| JP | 2012-514930 A | | 6/2012 |
| RU | 2388181 C2 | | 4/2010 |
| WO | WO 2009/101816 A1 | | 8/2009 |
| WO | WO 2010/079951 A2 | | 7/2010 |
| WO | WO 2011/127018 A1 | | 10/2011 |
| WO | WO 2011/140138 A1 | | 11/2011 |
| WO | 2012029237 A1 | | 3/2012 |
| WO | 2012107986 A1 | | 8/2012 |
| WO | WO 2012/134567 A1 | | 10/2012 |
| WO | WO 2012/136256 A1 | | 10/2012 |
| WO | WO 2013/023353 A1 | | 2/2013 |

OTHER PUBLICATIONS

"3rd Generation Partnership Project;Technical Specification Group Radio Access Network;Evolved Universal Terrestrial Radio Access Network (E-UTRAN);X2 application protocol (X2AP)(Release 11)"; 3GPP TS 36.423 V11.3.0; Dec. 2012; 141 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.4.0, Dec. 2012, 208 pages.

"3rd Generation Partnership Project; Technical Specification Group Radio Access Network; Evolved Universal Terrestrial Radio Access (E-UTRA); Medium Access Control (MAC) protocol specification (Release 11)", 3GPP TS 36.321 V11.1.0, Dec. 2012, 57 pages.

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.2.0, Dec. 2012, 340 pages.

Qualcomm Incorporated, "Supporting multiple timing advance groups," R2-100423, 3GPP TSG-RAN WG2 meeting#68bis, Valencia, Spain, Jan. 18-22, 2010, 3 pages.

COMMUNICATION METHOD, DEVICE, AND SYSTEM

CROSS-REFERENCE TO RELATED APPLICATIONS

This application is a continuation of U.S. patent application Ser. No. 14/830,522, filed on Aug. 19, 2015, which is a continuation of International Application No. PCT/CN2013/071776, filed on Feb. 22, 2013. The afore-mentioned patent applications are hereby incorporated by reference in their entireties.

TECHNICAL FIELD

The present invention relates to the field of communications technologies, and in particular, to a communication method, device, and system.

BACKGROUND

There are two different types of network nodes in a network deployment scenario, which are evolved base stations (Evolved NodeB, eNB) and small cell nodes (Small Cell Node, SCN). An eNB and an SCN separately control one or more cells, and a cell under the eNB and a cell under the SCN may use different frequencies. The cell under the eNB covers a larger area, and may be referred to as a macro cell; the cell under the SCN covers a smaller area, and may be referred to as a small cell.

In the prior art, any one of the following situations may occur:

a time alignment timer (Time Alignment Timer, TAT) set for a macro cell in a user equipment (User Equipment, UE) expires, and the UE needs to send uplink data or signaling to an eNB;

a UE does not have a resource for sending a scheduling request (Scheduling Request, SR) on a macro cell, and the UE needs to send uplink data or signaling to an eNB; and a UE fails to send a dynamic scheduling request (Dynamic Scheduling Request, DSR) on the macro cell, where the DSR failure refers to that a quantity of times that the UE continuously sends an SR exceeds a preset maximum quantity of times.

When any one of the foregoing three situations occurs, the UE needs to first initiate a contention-based random access procedure to the eNB, and only after this procedure is completed, the UE can send the uplink data or signaling to the eNB, and then the eNB may send, to the UE, downlink data or signaling in response to the uplink data or signaling. The contention-based random access procedure is defined in detail in the 3rd Generation Partnership Project (3rd Generation Partnership Project, 3GPP) protocol TS 36.321.

The inventors of the present invention find that, the contention-based random access procedure used in the prior art is complex, and has a very long access delay.

SUMMARY

Embodiments of the present invention provide a communication method, which can ensure that a UE rapidly accesses a network, and reduce an access delay of the UE. The embodiments of the present invention further provide a corresponding device and system.

A first aspect of the present invention provides a communication method, including:

sending, by a user equipment, a request message to a micro network node, so that the micro network node sends an indication message to a macro network node;

receiving an uplink resource (UG) sent according to the indication message by the macro network node; and sending uplink signaling or uplink data to the macro network node according to the uplink resource (UG).

With reference to the first aspect, in a first possible implementation manner, the receiving an uplink resource (UG) sent according to the indication message by the macro network node includes:

receiving a first timing advance (TA) and the uplink resource (UG) by using a non-contention-based random access procedure; and correspondingly, the sending uplink signaling or uplink data to the macro network node according to the uplink resource (UG) includes:

sending the uplink signaling or uplink data to the macro network node according to the first timing advance (TA) and the uplink resource (UG).

With reference to the first aspect, in a second possible implementation manner, the receiving an uplink resource (UG) sent according to the indication message by the macro network node includes:

receiving, through a physical downlink control channel (PDCCH), the uplink resource (UG) sent by the macro network node;

correspondingly, the method further includes:

reading an existing second timing advance (TA); and the sending uplink signaling or uplink data to the macro network node according to the uplink resource (UG) includes:

sending uplink signaling or uplink data to the macro network node according to the second timing advance (TA) and the uplink resource (UG).

With reference to the first aspect or the first or second possible implementation manner of the first aspect, in a third possible implementation manner, both the request message and the indication message carry size of the uplink signaling or uplink data, and the size of the uplink signaling or uplink data is used by the macro network node to determine the uplink resource (UG).

With reference to the first aspect or any one of the first to the third possible implementation manners of the first aspect, in a fourth possible implementation manner, before the step of sending, by a user equipment, a request message to a micro network node, the method further includes:

determining first control information of the uplink signaling or uplink data, where correspondingly, both the request message and the indication message carry the first control information, and the first control information is used by the macro network node to perform access control on the user equipment.

With reference to the first aspect or any one of the first to the third possible implementation manners of the first aspect, in a fifth possible implementation manner, before the step of sending a request message to a micro network node, the method further includes: receiving a first configuration message sent by the macro network node, where the first configuration message carries an uplink synchronization flag and/or second control information, and the uplink synchronization flag is used for instructing, after a time alignment timer (TAT) of a timing advance group (TAG) to which a macro cell controlled by the macro network node belongs expires, the user equipment to still maintain continuous running of a TAT of a TAG to which a micro cell controlled by the micro network node belongs.

With reference to the fifth possible implementation manner of the first aspect, in a sixth possible implementation manner, when the first configuration message carries the second control information, after the step of receiving a first configuration message sent by the macro network node, the method further includes:

determining third control information of the uplink signaling or uplink data; and when the third control information meets an access control rule specified by the second control information, sending the request message to the micro network node.

With reference to the first aspect or any one of the first to the third possible implementation manners of the first aspect, in a seventh possible implementation manner, before the step of sending a request message to a micro network node, the method further includes:

determining fourth control information of the uplink signaling or uplink data, where the request message carries the fourth control information, so that after determining that the fourth control information meets an access control rule specified by fifth control information that is carried in a second configuration message sent by the macro network node, the micro network node sends the indication message to the macro network node.

With reference to the seventh possible implementation manner of the first aspect, in an eighth possible implementation manner, the indication message carries the fourth control information, and the fourth control information is further used by the macro network node to perform access control on the user equipment.

With reference to the first aspect or any one of the first to the third possible implementation manners of the first aspect, in a ninth possible implementation manner, before the step of sending a request message to a micro network node, the method further includes:

receiving a third configuration message sent by the macro network node, where the third configuration message carries sixth control information; and determining seventh control information of the uplink signaling or uplink data;

the sending the request message to the micro network node includes:

when the seventh control information meets an access control rule specified by the sixth control information, sending the request message to the micro network node; and correspondingly, both the request message and the indication message further carry the seventh control information, and the seventh control information is used by the macro network node to perform access control on the user equipment.

With reference to the first aspect or any one of the first to the third possible implementation manners of the first aspect, in a tenth possible implementation manner, before the step of sending a request message to a micro network node, the method further includes:

receiving a fourth configuration message sent by the macro network node, where the fourth configuration message carries eighth control information; and determining ninth control information of the uplink signaling or uplink data;

the sending the request message to the micro network node includes:

when the ninth control information meets an access control rule specified by the eighth control information, sending the request message to the micro network node; and correspondingly, the request message carries the ninth control information, so that after determining that the ninth control information meets an access control rule specified by tenth control information that is carried in a fifth configuration message sent by the macro network node to the micro network node, the micro network node sends the indication message to the macro network node.

With reference to the tenth possible implementation manner of the first aspect, in an eleventh possible implementation manner, the indication message carries the ninth control information, and the ninth control information is further used by the macro network node to perform access control on the user equipment.

With reference to any one of the fourth to the eleventh possible implementation manners of the first aspect, in a twelfth possible implementation manner, the first control information, the second control information, the third control information, the fourth control information, the fifth control information, the sixth control information, the seventh control information, the eighth control information, the ninth control information, and the tenth control information each include at least one of emergency indication information, service type information, data/signaling information, quality of service (QoS) information, an identity of a radio bearer (RB), an identity of a logical channel (LCH), and an identity of a logical channel group to which the logical channel used by the radio bearer belongs.

A second aspect of the present invention provides a communication method, including:

receiving, by a macro network node, an indication message that is sent by a micro network node after the micro network node receives a request message sent by a user equipment; and sending an uplink resource (UG) to the user equipment according to the indication message, so that the user equipment sends uplink signaling or uplink data to the macro network node according to the uplink resource (UG).

With reference to the second aspect, in a first possible implementation manner, the sending an uplink resource (UG) to the user equipment according to the indication message includes:

initiating a non-contention-based random access procedure to the user equipment according to the indication message, and sending a first timing advance (TA) and the uplink resource (UG) to the user equipment in the non-contention-based random access procedure, so that the user equipment sends the uplink signaling or uplink data to the macro network node according to the first timing advance (TA) and the uplink resource (UG).

With reference to the second aspect, in a second possible implementation manner, the sending an uplink resource (UG) to the user equipment according to the indication message includes:

sending the uplink resource (UG) to the user equipment through a physical downlink control channel (PDCCH) according to the indication message, so that the user equipment sends, after reading an existing second timing advance (TA), uplink signaling or uplink data according to the second timing advance (TA) and the uplink resource (UG).

With reference to the second aspect, and the first or the second possible implementation manner of the second aspect, in a third possible implementation manner, both the request message and the indication message carry size information of the uplink signaling or uplink data; and before the sending an uplink resource (UG) to the user equipment, the method further includes:

determining the uplink resource (UG) according to the size information of the uplink signaling or uplink data.

With reference to the second aspect or any one of the first to the third possible implementation manners of the second aspect, in a fourth possible implementation manner, both the request message and the indication message further carry first control information, determined by the user equipment, of the uplink signaling or uplink data, and before the step of sending an uplink resource (UG) to the user equipment, the method further includes:

performing access control on the user equipment according to the first control information.

With reference to the second aspect or any one of the first to the third possible implementation manners of the second aspect, in a fifth possible implementation manner, before the step of receiving the indication message, the method further includes:

sending a first configuration message to the user equipment, where the first configuration message carries an uplink synchronization flag and/or second control information, and the uplink synchronization flag is used for instructing, after a time alignment timer (TAT) of a timing advance group (TAG) to which a macro cell controlled by the macro network node belongs expires, the user equipment to still maintain continuous running of a TAT of a TAG to which a micro cell controlled by the micro network node belongs.

With reference to the fifth possible implementation manner of the second aspect, in a sixth possible implementation manner, the first configuration message carries the second control information, so that the user equipment sends, after determining third control information of the uplink signaling or uplink data, the request message to the micro network node when the third control information meets an access control rule specified by the second control information.

With reference to the second aspect or any one of the first to the third possible implementation manners of the second aspect, in a seventh possible implementation manner, the request message carries fourth control information, determined by the user equipment, of the uplink signaling or uplink data; and before the step of receiving the indication message, the method further includes:

sending a second configuration message to the micro network node, where the second configuration message carries fifth control information, so that after determining that the fourth control information meets an access control rule specified by the fifth control information, the micro network node sends the indication message to the macro network node.

With reference to the seventh possible implementation manner of the second aspect, in the eighth possible implementation manner, the indication message carries the fourth control information, and the fourth control information is further used by the macro network node to perform access control on the user equipment; and before the step of sending an uplink resource (UG) to the user equipment, the method further includes:

performing access control on the user equipment according to the fourth control information.

With reference to the second aspect or any one of the first to the third possible implementation manners of the second aspect, in a ninth possible implementation manner, before the step of receiving the indication message, the method further includes:

sending a third configuration message to the user equipment, where the third configuration message carries sixth control information, so that after determining that seventh control information of the uplink signaling or uplink data meets an access control rule specified by the sixth control information, the user equipment sends the request message to the micro network node; and correspondingly, both the request message and the indication message further carry the seventh control information, and before the step of sending an uplink resource (UG) to the user equipment, the method further includes:

performing access control on the user equipment according to the seventh control information.

With reference to the second aspect or any one of the first to the third possible implementation manners of the second aspect, in a tenth possible implementation manner, before the step of receiving the indication message, the method further includes:

sending a fourth configuration message to the user equipment, where the fourth configuration message carries eighth control information, so that after determining that ninth control information of the uplink signaling or uplink data meets an access control rule specified by the eighth control information, the user equipment sends the request message to the micro network node, where correspondingly, the request message carries the ninth control information; and sending a fifth configuration message to the micro network node, where the fifth configuration message carries tenth control information, so that after determining that the ninth control information meets an access control rule specified by the tenth control information, the micro network node sends the indication message to the macro network node.

With reference to the tenth possible implementation manner of the second aspect, in an eleventh possible implementation manner, the indication message carries the ninth control information, and the ninth control information is further used by the macro network node to perform access control on the user equipment; and before the step of sending an uplink resource (UG) to the user equipment, the method further includes:

performing access control on the user equipment according to the ninth control information.

With reference to any one of the fourth to the eleventh possible implementation manners of the second aspect, in a twelfth possible implementation manner, the first control information, the second control information, the third control information, the fourth control information, the fifth control information, the sixth control information, the seventh control information, the eighth control information, the ninth control information, and the tenth control information each include at least one of emergency indication information, service type information, data/signaling information, quality of service (QoS) information, an identity of a radio bearer (RB), an identity of a logical channel (LCH), and an identity of a logical channel group to which the logical channel used by the radio bearer belongs.

A third aspect of the present invention provides a communication method, including:

receiving, by a micro network node, a request message sent by a user equipment; and sending an indication message to a macro network node according to the request message, so that the macro network node sends an uplink resource (UG) to the user equipment, and then the user equipment sends uplink signaling or uplink data according to the uplink resource (UG).

With reference to the third aspect, in a first possible implementation manner, both the request message and the indication message carry first control information, determined by the user equipment, of the uplink signaling or uplink data, and the first control information is used by the macro network node to perform access control on the user equipment.

With reference to the third aspect, in a second possible implementation manner, the request message carries fourth control information, determined by the user equipment, of the uplink signaling or uplink data, and before the step of receiving a request message sent by a user equipment, the method further includes:

receiving a second configuration message sent by the macro network node, where the second configuration message carries fifth control information; and correspondingly, the sending an indication message to a macro network node includes:

when the fourth control information meets an access control rule specified by the fifth control information, sending the indication message to the macro network node.

With reference to the second possible implementation manner of the third aspect, in a third possible implementation manner, the indication message further carries the fourth control information, and the fourth control information is further used by the macro network node to perform access control on the user equipment.

With reference to the third aspect, in a fourth possible implementation manner, the receiving a request message sent by a user equipment includes:

when seventh control information, determined by the user equipment, of the uplink signaling or uplink data meets an access control rule specified by sixth control information that is carried in a third configuration message sent by the macro network node, receiving the request message sent by the user equipment, where the request message carries the seventh control information, where the indication message carries the seventh control information, and the seventh control information is used by the macro network node to perform access control on the user equipment.

With reference to the third aspect, in a fifth possible implementation manner, the receiving a request message sent by a user equipment includes:

when ninth control information, determined by the user equipment, of the uplink signaling or uplink data meets an access control rule specified by eighth control information that is carried in a fourth configuration message sent by the macro network node, receiving the request message sent by the user equipment, where the request message carries the ninth control information;

before the step of receiving a request message sent by a user equipment, the method further includes:

receiving a fifth configuration message sent by the macro network node, where the fifth configuration message carries tenth control information; and correspondingly, the sending an indication message to a macro network node includes:

when the ninth control information meets an access control rule specified by the tenth control information, sending the indication message to the macro network node.

With reference to the fifth possible implementation manner of the third aspect, in a sixth possible implementation manner, the indication message carries the ninth control information, and the ninth control information is further used by the macro network node to perform access control on the user equipment.

With reference to any one of the first to the sixth possible implementation manners of the third aspect, in a seventh possible implementation manner, the first control information, the fourth control information, the fifth control information, the sixth control information, the seventh control information, the eighth control information, the ninth control information, and the tenth control information each include at least one of emergency indication information, service type information, data/signaling information, quality of service (QoS) information, an identity of a radio bearer (RB), an identity of a logical channel (LCH), and an identity of a logical channel group to which the logical channel used by the radio bearer belongs.

A fourth aspect of the present invention provides a communication method, including:

receiving, by a user equipment, configuration information sent by a macro network node; and sending uplink signaling or uplink data to a micro network node and/or the macro network node according to the configuration information.

With reference to the fourth aspect, in a first possible implementation manner, the method further includes:

receiving downlink signaling or downlink data sent by the macro network node and/or the micro network node; and when the downlink signaling or downlink data sent by the macro network node and the micro network node is received, deleting duplicate signaling or data in the downlink signaling or downlink data sent by the macro network node and in the downlink signaling or downlink data sent by the micro network node.

With reference to the fourth aspect or the first possible implementation manner of the fourth aspect, in a second possible implementation manner, the configuration information includes an identity of a micro cell controlled by the micro network node and an identity of a radio bearer (RB) of the user equipment; and the sending uplink signaling or uplink data to a micro network node according to the configuration information includes:

sending, to the micro network node, the uplink signaling or uplink data transmitted on a radio bearer corresponding to the identity of the RB, where the uplink signaling or uplink data is sent through a default logical channel by using a micro cell corresponding to the identity of the micro cell.

With reference to the second possible implementation manner, in a third possible implementation manner, the configuration information further includes an identity of a logical channel (LCH); and the sending uplink signaling or uplink data to a micro network node according to the configuration information includes:

sending, to the micro network node, the uplink signaling or uplink data transmitted on the radio bearer corresponding to the identity of the RB, where the uplink signaling or uplink data is sent through a logical channel corresponding to the identity of the LCH by using the micro cell corresponding to the identity of the micro cell.

With reference to the second or third possible implementation manner of the fourth aspect, in a fourth possible implementation manner, the configuration information further includes an uplink flag; and the receiving downlink signaling or downlink data sent by the macro network node and/or the micro network node includes:

receiving downlink signaling or downlink data sent by the macro network node.

With reference to any one of the second to the fourth possible implementation manners of the fourth aspect, in a fifth possible implementation manner, the configuration information further includes an uplink synchronization flag, where the uplink synchronization flag is used for instructing, after a time alignment timer (TAT) of a timing advance group (TAG) to which a macro cell controlled by the macro network node belongs expires, the user equipment to still maintain continuous running of a TAT of a TAG to which a micro cell controlled by the micro network node belongs.

With reference to the fourth aspect or any one of the first to the fifth possible implementation manners of the fourth aspect, in a sixth possible implementation manner, the uplink signaling is an uplink radio resource control (RRC) message and the downlink signaling is a downlink radio resource control (RRC) message.

With reference to the sixth possible implementation manner of the fourth aspect, in a seventh possible implementation manner, the uplink RRC message includes an uplink measurement report message and an uplink information transfer message, and the downlink RRC message includes a handover command message and a downlink information transfer message.

A fifth aspect of the present invention provides a communication method, including:
sending, by a macro network node, configuration information to a user equipment, so that the user equipment sends uplink signaling or uplink data to a micro network node and/or the macro network node according to the configuration information; and
receiving the uplink signaling or uplink data forwarded by the micro network node and sent by the user equipment, and/or receiving the uplink signaling or uplink data sent by the user equipment.

With reference to the fifth aspect, in a first possible implementation manner, when the uplink signaling or uplink data that is sent by the user equipment and forwarded by the micro network node is received and the uplink signaling or uplink data sent by the user equipment is received, duplicate signaling or data in the uplink signaling or uplink data sent by the user equipment and in the uplink signaling or uplink data sent by the micro network node is deleted.

With reference to the fifth aspect or the first possible implementation manner of the fifth aspect, in a second possible implementation manner, the method further includes:
sending another configuration information to the micro network node, so that the micro network node forwards downlink signaling or downlink data to the user equipment according to the another configuration information; and
sending the downlink signaling or downlink data to the micro network node.

With reference to the second possible implementation manner of the fifth aspect, in a third possible implementation manner, the uplink signaling is an uplink radio resource control (RRC) message and the downlink signaling is a downlink radio resource control (RRC) message.

With reference to the third possible implementation manner of the fifth aspect, in a fourth possible implementation manner, the uplink RRC message includes an uplink measurement report message and an uplink information transfer message, and the downlink RRC message includes a handover command message and a downlink information transfer message.

A sixth aspect of the present invention provides a communication method, including:
receiving, by a micro network node, another configuration information sent by a macro network node;
receiving downlink signaling or downlink data sent by the macro network node; and
forwarding the downlink signaling or downlink data to a user equipment according to the another configuration information.

With reference to the sixth aspect, in a first possible implementation manner, the another configuration information includes an identity of the user equipment and an identity of a radio bearer (RB) of the user equipment; and
the forwarding the downlink signaling or downlink data to a user equipment according to the another configuration information includes:
sending, to the user equipment, the downlink signaling or downlink data transmitted on a radio bearer corresponding to the identity of the RB, where the downlink signaling or downlink data is sent through a default logical channel by using a micro cell corresponding to an identity of the micro cell.

With reference to the first possible implementation manner of the sixth aspect, in a second possible implementation manner, the another configuration information further includes an identity of a logical channel (LCH); and the forwarding the downlink signaling or downlink data to the user equipment according to the another configuration information includes:
sending, to the user equipment, the downlink signaling or downlink data transmitted on the radio bearer corresponding to the identity of the RB, where the downlink signaling or downlink data is sent through a logical channel corresponding to the identity of the LCH by using the micro cell corresponding to the identity of the micro cell.

With reference to the sixth aspect, and the first or the second possible implementation manner of the sixth aspect, in a third possible implementation manner, the downlink signaling is a downlink radio resource control (RRC) message.

With reference to the third possible implementation manner of the sixth aspect, in a fourth possible implementation manner, the downlink RRC message includes a handover command message and a downlink information transfer message.

A seventh aspect of the present invention provides a user equipment, including:
a first sending unit, configured to send a request message to a micro network node, so that the micro network node sends an indication message to a macro network node; and
an obtaining unit, configured to receive an uplink resource (UG) sent according to the indication message by the macro network node, where
the first sending unit is configured to send uplink signaling or uplink data to the macro network node according to the uplink resource (UG) obtained by the obtaining unit.

With reference to the seventh aspect, in a first possible implementation manner:
the obtaining unit is configured to receive a first timing advance (TA) and the uplink resource (UG) by using a non-contention-based random access procedure; and
the first sending unit is configured to send uplink signaling or uplink data to the macro network node according to the first timing advance (TA) and the uplink resource (UG) obtained by the obtaining unit.

With reference to the seventh aspect, in a second possible implementation manner:
the obtaining unit is configured to read an existing second timing advance (TA), and receive, through a physical downlink control channel (PDCCH), the uplink resource (UG) sent by the macro network node; and
the first sending unit is configured to send uplink signaling or uplink data to the macro network node according to the second timing advance (TA) and the uplink resource (UG) obtained by the obtaining unit.

With reference to the seventh aspect, and the first or the second possible implementation manner of the seventh aspect, in a third possible implementation manner, the user equipment further includes:

a first determining unit, configured to determine first control information of the uplink signaling or uplink data, where both the request message and the indication message carry the first control information, and the first control information is used by the macro network node to perform access control on the user equipment.

With reference to the seventh aspect, and the first or the second possible implementation manner of the seventh aspect, in a fourth possible implementation manner, the user equipment further includes:

a first receiving unit, configured to receive a first configuration message sent by the macro network node, where the first configuration message carries an uplink synchronization flag and/or second control information, and the uplink synchronization flag is used for instructing, after a time alignment timer (TAT) of a timing advance group (TAG) to which a macro cell controlled by the macro network node belongs expires, the user equipment to still maintain continuous running of a TAT of a TAG to which a micro cell controlled by the micro network node belongs.

With reference to the fourth possible implementation manner of the seventh aspect, in a fifth possible implementation manner, when the first configuration message carries the second control information, the user equipment further includes:

a second determining unit, configured to determine third control information of the uplink signaling or uplink data, and send the request message to the micro network node when the third control information meets an access control rule specified by the second control information.

With reference to the seventh aspect, and the first or the second possible implementation manner of the seventh aspect, in a sixth possible implementation manner, the user equipment further includes:

a third determining unit, configured to determine fourth control information of the uplink signaling or uplink data, where the request message carries the fourth control information, so that after determining that the fourth control information meets an access control rule specified by fifth control information that is carried in a second configuration message sent by the macro network node, the micro network node sends the indication message to the macro network node.

With reference to the seventh aspect, and the first or the second possible implementation manner of the seventh aspect, in a seventh possible implementation manner, the user equipment further includes:

a second receiving unit, configured to receive a third configuration message sent by the macro network node, where the third configuration message carries sixth control information; and a fourth determining unit, configured to determine seventh control information of the uplink signaling or uplink data, where the first sending unit is further configured to: when the seventh control information meets an access control rule specified by the sixth control information, send the request message to the micro network node.

With reference to the seventh aspect, and the first or the second possible implementation manner of the seventh aspect, in an eighth possible implementation manner, the user equipment further includes:

a third receiving unit, configured to receive a fourth configuration message sent by the macro network node, where the fourth configuration message carries eighth control information; and a fifth determining unit, configured to determine ninth control information of the uplink signaling or uplink data, where the first sending unit is further configured to: when the ninth control information meets an access control rule specified by the eighth control information, send the request message to the micro network node.

An eighth aspect of the present invention provides a macro network node device, including:

a fourth receiving unit, configured to receive an indication message that is sent by a micro network node after the micro network node receives a request message sent by a user equipment; and a second sending unit, configured to send an uplink resource (UG) to the user equipment according to the indication message, so that the user equipment sends uplink signaling or uplink data according to the uplink resource (UG).

With reference to the eighth aspect, in a first possible implementation manner:

the second sending unit is configured to initiate a non-contention-based random access procedure to the user equipment according to the indication message, and send a first timing advance (TA) and the uplink resource (UG) to the user equipment in the non-contention-based random access procedure, so that the user equipment sends uplink signaling or uplink data to the macro network node according to the first timing advance (TA) and the uplink resource (UG).

With reference to the eighth aspect, in a second possible implementation manner:

the second sending unit is configured to send the uplink resource (UG) to the user equipment through a physical downlink control channel (PDCCH) according to the indication message, so that the user equipment sends, after reading an existing second timing advance (TA), uplink signaling or uplink data to the macro network node according to the second timing advance (TA) and the uplink resource (UG).

With reference to the eighth aspect, and the first or the second possible implementation manner of the eighth aspect, in a third possible implementation manner, both the request message and the indication message carry size information of the uplink signaling or uplink data to be sent; and the macro network node device further includes: a resource determining unit, where the resource determining unit is configured to determine the uplink resource (UG) according to the size information of the uplink signaling or uplink data.

With reference to the eighth aspect or any one of the first to the third possible implementation manners of the eighth aspect, in a fourth possible implementation manner, both the request message and the indication message further carry first control information, determined by the user equipment, of the uplink signaling or uplink data; and the macro network node device further includes:

a first control unit, configured to perform access control on the user equipment according to the first control information.

With reference to the eighth aspect or any one of the first to the third possible implementation manners of the eighth aspect, in a fifth possible implementation manner:

the second sending unit is further configured to send a first configuration message to the user equipment, where the first configuration message carries an uplink synchronization flag and/or second control information, and the uplink synchronization flag is used for instructing, after a time alignment timer (TAT) of a timing advance group (TAG) to which a macro cell controlled by the macro network node belongs expires, the user equipment to still maintain continuous running of a TAT of a TAG to which a micro cell controlled by the micro network node belongs.

With reference to the eighth aspect or any one of the first to the third possible implementation manners of the eighth aspect, in a sixth possible implementation manner:

the request message carries fourth control information, determined by the user equipment, of the uplink signaling or uplink data; and The second sending unit is further configured to send a second configuration message to the micro network node, where the second configuration message carries fifth control information, so that after determining that the fourth control information meets an access control rule specified by the fifth control information, the micro network node sends the indication message to the macro network node.

With reference to the sixth possible implementation manner of the eighth aspect, in a seventh possible implementation manner, the indication message further carries the fourth control information; and the macro network node device further includes:

a second control unit, configured to perform access control on the user equipment according to the fourth control information.

With reference to the eighth aspect or any one of the first to the third possible implementation manners of the eighth aspect, in an eighth possible implementation manner, the second sending unit is further configured to send a third configuration message to the user equipment, where the third configuration message carries sixth control information, so that after determining that seventh control information of the uplink signaling or uplink data meets an access control rule specified by the sixth control information, the user equipment sends the request message to the micro network node; and the macro network node device further includes:

a third control unit, configured to: when both the request message and the indication message further carry the seventh control information, perform access control on the user equipment according to the seventh control information.

With reference to the eighth aspect or any one of the first to the third possible implementation manners of the eighth aspect, in a ninth possible implementation manner:

the second sending unit is further configured to send a fourth configuration message to the user equipment, where the fourth configuration message carries eighth control information, so that after determining that ninth control information of the uplink signaling or uplink data meets an access control rule specified by the eighth control information, the user equipment sends the request message to the micro network node;

the request message carries the ninth control information; and the second sending unit is further configured to send a fifth configuration message to the micro network node, where the fifth configuration message carries tenth control information, so that after determining that the ninth control information meets an access control rule specified by the tenth control information, the micro network node sends the indication message to the macro network node.

With reference to the ninth possible implementation manner of the eighth aspect, in a tenth possible implementation manner, the indication message carries the ninth control information; and the macro network node device further includes:

a fourth control unit, configured to perform access control on the user equipment according to the ninth control information.

A ninth aspect of the present invention provides a micro network node device, including:

a fifth receiving unit, configured to receive a request message sent by a user equipment; and a third sending unit, configured to send an indication message to a macro network node, so that the macro network node allocates an uplink resource (UG) to the user equipment, and then the user equipment sends uplink signaling or uplink data to the macro network node according to the uplink resource (UG).

With reference to the ninth aspect, in a first possible implementation manner, the fifth receiving unit is further configured to receive a second configuration message sent by the macro network node, where the second configuration message carries fifth control information; and the micro network node device further includes:

a sixth determining unit, configured to determine whether fourth control information meets an access control rule specified by the fifth control information, where the third sending unit is further configured to: after the fourth control information meets an access control rule specified by the fifth control information, send the indication message to the macro network node.

With reference to the first possible implementation manner of the ninth aspect, in a second possible implementation manner:

the fifth receiving unit is configured to: when seventh control information, determined by the user equipment, of the uplink signaling or uplink data meets an access control rule specified by sixth control information that is carried in a third configuration message sent by the macro network node, receive the request message sent by the user equipment, where the request message carries the seventh control information.

With reference to the ninth aspect, in a third possible implementation manner, the fifth receiving unit is configured to: when ninth control information, determined by the user equipment, of the uplink signaling or uplink data meets an access control rule specified by eighth control information that is carried in a fourth configuration message sent by the macro network node, receive the request message sent by the user equipment, where the request message carries the ninth control information; and the fifth receiving unit is further configured to receive a fifth configuration message sent by the macro network node, where the fifth configuration message carries tenth control information; and the micro network node device further includes:

a seventh determining unit, configured to determine whether the ninth control information meets an access control rule specified by the tenth control information, where the third sending unit is further configured to: when the ninth control information meets an access control rule specified by the tenth control information, send the indication message to the macro network node.

A tenth aspect of the present invention provides a user equipment, including:

a sixth receiving unit, configured to receive configuration information sent by a macro network node; and a fourth sending unit, configured to send uplink signaling or uplink data to a micro network node and/or the macro network node according to the configuration information received by the sixth receiving unit.

With reference to the tenth aspect, in a first possible implementation manner:

the sixth receiving unit is configured to receive downlink signaling or downlink data sent by the macro network node and/or the micro network node; the user equipment further includes a first processing unit, configured to: when the downlink signaling or downlink data sent by the macro network node and the micro network node is received, delete duplicate signaling or data in the downlink signaling or downlink data sent by the macro network node and in the downlink signaling or downlink data sent by the micro network node.

With reference to the tenth aspect or the first possible implementation manner of the tenth aspect, in a second possible implementation manner, the configuration information includes an identity of a micro cell controlled by the micro network node and an identity of a radio bearer (RB) of the user equipment; and the fourth sending unit is configured to send, to the micro network node, the uplink signaling or uplink data transmitted on a radio bearer corresponding to the identity of the RB, where the uplink signaling or uplink data is sent through a default logical channel by using a micro cell corresponding to the identity of the micro cell.

With reference to the second possible implementation manner of the tenth aspect, in a third possible implementation manner, the configuration information further includes an identity of a logical channel (LCH); and the fourth sending unit is configured to send, to the micro network node, the uplink signaling or uplink data transmitted on a radio bearer corresponding to the identity of the RB, where the uplink signaling or uplink data is sent through a logical channel corresponding to the identity of the LCH by using the micro cell corresponding to the identity of the micro cell.

With reference to the second or the third possible implementation manner of the tenth aspect, in a fourth possible implementation manner, the configuration information further includes an uplink flag; and the sixth receiving unit is configured to receive downlink signaling or downlink data sent by the macro network node.

An eleventh aspect of the present invention provides a macro network node device, including:

a fifth sending unit, configured to send configuration information to a user equipment, so that the user equipment sends uplink signaling or uplink data to a micro network node and/or a macro network node according to the configuration information; and a seventh receiving unit, configured to receive the uplink signaling or uplink data that is sent by the user equipment and forwarded by the micro network node, and/or receive the uplink signaling or uplink data sent by the user equipment.

With reference to the eleventh aspect, in a first possible implementation manner, the macro network node device further includes:

a second processing unit, configured to: when the uplink signaling or uplink data that is sent by the user equipment and forwarded by the micro network node is received and the uplink signaling or uplink data sent by the user equipment is received, delete duplicate signaling or data in the uplink signaling or uplink data sent by the user equipment and in the uplink signaling or uplink data sent by the micro network node.

With reference to the eleventh aspect or the first possible implementation manner of the eleventh aspect, in a second possible implementation manner, the macro network node device further includes:

a sixth sending unit, configured to send another configuration information to the micro network node, so that the micro network node forwards downlink signaling or downlink data to the user equipment according to the another configuration information, where the sixth sending unit is further configured to send the downlink signaling or downlink data to the micro network node.

A twelfth aspect of the present invention provides a micro network node device, including:

an eighth receiving unit, configured to receive another configuration information sent by a macro network node, where the eighth receiving unit is further configured to receive downlink signaling or downlink data sent by the macro network node; and a seventh sending unit, configured to forward the downlink signaling or downlink data to the user equipment according to the another configuration information.

With reference to the twelfth aspect, in a first possible implementation manner, the another configuration information includes an identity of the user equipment and an identity of a radio bearer (RB) of the user equipment; and the seventh sending unit is configured to send, to the user equipment, the downlink signaling or downlink data transmitted on a radio bearer corresponding to the identity of the RB, where the downlink signaling or downlink data is sent through a default logical channel by using a micro cell corresponding to an identity of the micro cell.

With reference to the first possible implementation manner of the twelfth aspect, in a second possible implementation manner, the another configuration information further includes an identity of a logical channel (LCH); and the seventh sending unit is configured to send, to the user equipment, the downlink signaling or downlink data transmitted on a radio bearer corresponding to the identity of the RB, where the downlink signaling or downlink data is sent through a logical channel corresponding to the identity of the LCH by using the micro cell corresponding to the identity of the micro cell.

A thirteenth aspect of the present invention provides a user equipment, including a first receiver, a first transmitter, a first memory, and a first processor, where the first transmitter is configured to send a request message to a micro network node, so that the micro network node sends an indication message to a macro network node;

the first receiver is configured to receive an uplink resource (UG) sent according to the indication message by the macro network node; and the first transmitter is further configured to send uplink signaling or uplink data to the macro network node according to the uplink resource (UG).

With reference to the thirteenth aspect, in a first possible implementation manner, the first receiver is configured to receive a first timing advance (TA) and the uplink resource (UG) by using a non-contention-based random access procedure; and the first transmitter is configured to send uplink signaling or uplink data to the macro network node according to the first timing advance (TA) and the uplink resource (UG).

With reference to the thirteenth aspect, in a second possible implementation manner, the first receiver is configured to read an existing second timing advance (TA), and receive, through a physical downlink control channel (PD-CCH), the uplink resource (UG) sent by the macro network node; and the first transmitter is configured to send uplink signaling or uplink data to the macro network node according to the second timing advance (TA) and the uplink resource (UG).

With reference to the thirteenth aspect, and the first or the second possible implementation manner of the thirteenth aspect, in a third possible implementation manner:

the first processor is configured to determine first control information of the uplink signaling or uplink data.

With reference to the thirteenth aspect or any one of the first to the third possible implementation manners of the thirteenth aspect, in a fourth possible implementation manner:

the first receiver is configured to receive a first configuration message sent by the macro network node, where the first configuration message carries an uplink synchronization flag and/or second control information, and the uplink synchronization flag is used for instructing, after a time alignment timer (TAT) of a timing advance group (TAG) to which a macro cell controlled by the macro network node belongs expires, the user equipment to still maintain continuous running of a TAT of a TAG to which a micro cell controlled by the micro network node belongs.

With reference to the fourth possible implementation manner of the thirteenth aspect, in a fifth possible implementation manner, the first processor is configured to determine third control information of the uplink signaling or uplink data; and the first transmitter is configured to: when the third control information meets an access control rule specified by the second control information, send the request message to the micro network node.

With reference to the thirteenth aspect or any one of the first to the third possible implementation manners of the thirteenth aspect, in a sixth possible implementation manner:

the first processor is configured to determine fourth control information of the uplink signaling or uplink data, where the request message carries the fourth control information, so that after determining that the fourth control information meets an access control rule specified by fifth control information that is carried in a second configuration message sent by the macro network node, the micro network node sends the indication message to the macro network node.

With reference to the thirteenth aspect or any one of the first to the third possible implementation manners of the thirteenth aspect, in a seventh possible implementation manner:

the first receiver is configured to receive a third configuration message sent by the macro network node, where the third configuration message carries sixth control information;

the first processor is configured to determine seventh control information of the uplink signaling or uplink data; and the first transmitter is configured to: when the seventh control information meets an access control rule specified by the sixth control information, send the request message to the micro network node.

With reference to the thirteenth aspect or any one of the first to the third possible implementation manners of the thirteenth aspect, in an eighth possible implementation manner:

the first receiver is configured to receive a fourth configuration message sent by the macro network node, where the fourth configuration message carries eighth control information;

the first processor is configured to determine ninth control information of the uplink signaling or uplink data; and the first transmitter is configured to: when the ninth control information meets an access control rule specified by the eighth control information, send the request message to the micro network node.

A fourteenth aspect of the present invention provides a macro network node device, including a second receiver, a second transmitter, a second memory, and a second processor, where the second receiver is configured to receive an indication message that is sent by a micro network node after the micro network node receives a request message sent by a user equipment; and the second transmitter is configured to send an uplink resource (UG) to the user equipment according to the indication message, so that the user equipment sends uplink signaling or uplink data according to the uplink resource (UG).

With reference to the fourteenth aspect, in a first possible implementation manner:

the second transmitter is configured to initiate a non-contention-based random access procedure to the user equipment according to the indication message, and send a first timing advance (TA) and the uplink resource (UG) to the user equipment in the non-contention-based random access procedure, so that the user equipment sends the uplink signaling or uplink data to the macro network node according to the first timing advance (TA) and the uplink resource (UG).

With reference to the fourteenth aspect, in a second possible implementation manner, the second transmitter is configured to send the uplink resource (UG) to the user equipment through a physical downlink control channel (PDCCH) according to the indication message, so that the user equipment sends, after reading an existing second timing advance (TA), uplink signaling or uplink data to the macro network node according to the second timing advance (TA) and the uplink resource (UG).

With reference to the fourteenth aspect, and the first or the second possible implementation manner of the fourteenth aspect, in a third possible implementation manner, both the request message and the indication message carry size information of the uplink signaling or uplink data to be sent; and the second processor is configured to determine the uplink resource (UG) according to the size information of the uplink signaling or uplink data.

With reference to the fourteenth aspect or any one of the first to the third possible implementation manners of the fourteenth aspect, in a fourth possible implementation manner:

both the request message and the indication message further carry first control information, determined by the user equipment, of the uplink signaling or uplink data; and the second processor is configured to perform access control on the user equipment according to the first control information.

With reference to the fourteenth aspect or any one of the first to the third possible implementation manners of the fourteenth aspect, in a fifth possible implementation manner:

the second transmitter is configured to send a first configuration message to the user equipment, where the first configuration message carries an uplink synchronization flag and/or second control information, and the uplink synchronization flag is used for instructing, after a time alignment timer (TAT) of a timing advance group (TAG) to which a macro cell controlled by the macro network node belongs expires, the user equipment to still maintain continuous running of a TAT of a TAG to which a micro cell controlled by the micro network node belongs.

With reference to the fourteenth aspect, and any one of the first to the third possible implementation manners of the fourteenth aspect, in a sixth possible implementation manner:

the second transmitter is configured to send a second configuration message to the micro network node, where the second configuration message carries fifth control information, so that after determining that fourth control information meets an access control rule specified by the fifth control information, the micro network node sends the indication message to the macro network node; and the second processor is further configured to: when the indication message carries the fourth control information, perform access control on the user equipment according to the fourth control information.

With reference to the sixth possible implementation manner of the fourteenth aspect, in a seventh possible implementation manner:

the second transmitter is configured to send a third configuration message to the user equipment, where the third configuration message carries sixth control information, so that after determining that seventh control information of the uplink signaling or uplink data meets an access control rule specified by the sixth control information, the user equipment sends the request message to the micro network node; and the second processor is configured to: when both the request message and the indication message further carry the seventh control information, perform access control on the user equipment according to the seventh control information.

With reference to the fourteenth aspect or any one of the first to the third possible implementation manners of the fourteenth aspect, in an eighth possible implementation manner:

the second transmitter is configured to send a fourth configuration message to the user equipment, where the fourth configuration message carries eighth control information, so that after determining that ninth control information of the uplink signaling or uplink data meets an access control rule specified by the eighth control information, the user equipment sends the request message to the micro network node; and the second transmitter is configured to send a fifth configuration message to the micro network node, where the fifth configuration message carries tenth control information, so that after determining that the ninth control information meets an access control rule specified by the tenth control information, the micro network node sends the indication message to the macro network node.

With reference to the eighth possible implementation manner of the fourteenth aspect, in a ninth possible implementation manner:

the second processor is configured to: when the indication message carries the ninth control information, perform access control on the user equipment according to the ninth control information.

A fifteenth aspect of the present invention provides a micro network node device, including a third receiver, a third transmitter, a third memory, and a third processor, where the third receiver is configured to receive a request message sent by a user equipment; and the third transmitter is configured to send an indication message to a macro network node according to the request message, so that the macro network node sends an uplink resource (UG) to the user equipment, and then the user equipment sends uplink signaling or uplink data to the macro network node according to the uplink resource (UG).

With reference to the fifteenth aspect, in a first possible implementation manner, the request message carries fourth control information, determined by the user equipment, of the uplink signaling or uplink data;

the third receiver is configured to receive a second configuration message sent by the macro network node, where the second configuration message carries fifth control information;

the third processor is configured to determine whether the fourth control information meets an access control rule specified by the fifth control information; and the third transmitter is configured to: after the fourth control information meets the access control rule specified by the fifth control information, send the indication message to the macro network node.

With reference to the fifteenth aspect, in a second possible implementation manner:

the third receiver is configured to: when seventh control information, determined by the user equipment, of the uplink signaling or uplink data meets an access control rule specified by sixth control information that is carried in a third configuration message sent by the macro network node, receive the request message sent by the user equipment, where the request message carries the seventh control information.

With reference to the fifteenth aspect, in a third possible implementation manner:

the third receiver is configured to: when ninth control information, determined by the user equipment, of the uplink signaling or uplink data meets an access control rule specified by eighth control information that is carried in a fourth configuration message sent by the macro network node, receive the request message sent by the user equipment, where the request message carries the ninth control information; and the third receiver is further configured to receive a fifth configuration message sent by the macro network node, where the fifth configuration message carries tenth control information;

the third processor is configured to determine whether the ninth control information meets an access control rule of the tenth control information; and the third transmitter is further configured to: when the ninth control information meets an access control rule specified by the tenth control information, send the indication message to the macro network node.

A sixteenth aspect of the present invention provides a user equipment, including a fourth receiver, a fourth transmitter, a fourth memory, and a fourth processor, where the fourth receiver is configured to receive configuration information sent by a macro network node; and the fourth transmitter is configured to send uplink signaling or uplink data to a micro network node and/or the macro network node according to the configuration information.

With reference to the sixteenth aspect, in a first possible implementation manner:

the fourth receiver is configured to receive downlink signaling or downlink data sent by the macro network node and/or the micro network node; and the fourth processor is configured to: when the downlink signaling or downlink data sent by the macro network node and the micro network node is received, delete duplicate signaling or data in the downlink signaling or downlink data sent by the macro network node and in the downlink signaling or downlink data sent by the micro network node.

With reference to the sixteenth aspect or the first possible implementation manner of the sixteenth aspect, in a second possible implementation manner, the configuration information includes an identity of a micro cell controlled by the micro network node and an identity of a radio bearer (RB) of the user equipment; and the fourth transmitter is configured to send, to the micro network node, the uplink signaling or uplink data transmitted on a radio bearer corresponding to the identity of the RB, where the uplink signaling or uplink data is sent through a default logical channel by using a micro cell corresponding to the identity of the micro cell.

With reference to the second possible implementation manner of the sixteenth aspect, in a third possible implementation manner:

the fourth transmitter is configured to send, to the micro network node, the uplink signaling or uplink data transmitted on a radio bearer corresponding to the identity of the RB, where the uplink signaling or uplink data is sent through a logical channel corresponding to the identity of the LCH by using the micro cell corresponding to the identity of the micro cell.

With reference to the second or the third possible implementation manner of the sixteenth aspect, in a fourth possible implementation manner, the configuration information further includes an uplink flag; and the fourth receiver is configured to receive downlink signaling or downlink data sent by the macro network node.

A seventeenth aspect of the present invention provides a macro network node device, including a fifth receiver, a fifth transmitter, a fifth memory, and a fifth processor, where the fifth transmitter is configured to send configuration information to a user equipment, so that the user equipment sends uplink signaling or uplink data to a micro network node and/or a macro network node according to the configuration information; and the fifth receiver is configured to receive the uplink signaling or uplink data that is sent by the user equipment and forwarded by the micro network node, and/or receive the uplink signaling or uplink data sent by the user equipment.

With reference to the seventeenth aspect, in a first possible implementation manner:

the fifth processor is configured to: when the uplink signaling or uplink data that is sent by the user equipment and forwarded by the micro network node is received and the uplink signaling or uplink data sent by the user equipment is received, delete duplicate signaling or data in the uplink signaling or uplink data sent by the user equipment and in the uplink signaling or uplink data sent by the micro network node.

With reference to the seventeenth aspect or the first possible implementation manner of the seventeenth aspect, in a second possible implementation manner, the fifth transmitter is configured to send another configuration information to the micro network node, so that the micro network node forwards downlink signaling or downlink data to the user equipment according to the another configuration information; and the fifth transmitter is configured to send the downlink signaling or downlink data to the micro network node.

An eighteenth aspect of the present invention provides a micro network node device, including a sixth receiver, a sixth transmitter, a sixth memory, and a sixth processor, where the sixth receiver is configured to receive another configuration information sent by a macro network node;

the sixth receiver is further configured to receive downlink signaling or downlink data sent by the macro network node; and the sixth transmitter is configured to forward the downlink signaling or downlink data to the user equipment according to the another configuration information.

With reference to the eighteenth aspect, in a first possible implementation manner, the another configuration information includes an identity of the user equipment and an identity of a radio bearer (RB) of the user equipment; and the sixth transmitter is configured to send, to the user equipment, the downlink signaling or downlink data transmitted on a radio bearer corresponding to the identity of the RB, where the downlink signaling or downlink data is sent through a default logical channel by using a micro cell corresponding to an identity of the micro cell.

With reference to the first possible implementation manner of the eighteenth aspect, in a second possible implementation manner, when the another configuration information further includes an identity of a logical channel (LCH), the sixth transmitter is configured to send, to the user equipment, the downlink signaling or downlink data transmitted on a radio bearer corresponding to the identity of the RB, where the downlink signaling or downlink data is sent through a logical channel corresponding to the identity of the LCH by using the micro cell corresponding to the identity of the micro cell.

A nineteenth aspect of the present invention provides a communication system, including: a user equipment, a macro network node device, and a micro network node device, where the user equipment is the user equipment described in the foregoing first set of technical solutions;

the macro network node device is the macro network node device described in the foregoing first set of technical solutions; and the micro network node device is the micro network node device described in the foregoing first set of technical solutions.

A twentieth aspect of the present invention provides a communication system, including: a user equipment, a macro network node device, and a micro network node device, where the user equipment is the user equipment described in the foregoing second set of technical solutions;

the macro network node device is the macro network node device described in the foregoing second set of technical solutions; and the micro network node device is the micro network node device described in the foregoing second set of technical solutions.

In the embodiments of the present invention, a user equipment sends a request message to a micro network node, so that the micro network node sends an indication message to a macro network node; receives an uplink resource (UG) sent according to the indication message by the macro network node; and sends uplink signaling or uplink data to the macro network node according to the uplink resource (UG). Compared with the prior art where a contention-based random access procedure is directly used for UE access without participation of a micro network node, the solutions provided by the embodiments of the present invention can enable a UE to more rapidly access a network, thereby reducing an access delay of the UE.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

Embodiments of the present invention provide a communication method, which can ensure that a UE rapidly accesses a network, and reduce an access delay of the UE. The embodiments of the present invention further provide a corresponding device and system. The following describes the method, device, and system in detail separately.

In the embodiments of the present invention, a user equipment (user equipment, UE) may be a device capable of communication, such as a mobile phone, a personal digital assistant (Personal Digital Assistant, PDA), a notebook computer, or a personal computer (Personal computer, PC). A micro network node may be a relay node (Relay Node, RN), a home base station (Home eNB or Home NB), a micro base station (Micro eNB), a pico base station (Pico eNB), a femto base station (Femto eNB), a WiFi access point (Access Point, AP), or the like, and may also be a user equipment capable of implementing functions of the foregoing micro network node. A macro network node may be an evolved base station (evolved NodeB, eNB), and may also be a base station (Node B, NB), a donor base station (Donor eNB, DeNB), a HeNB gateway, an HNB gateway, or the like.

An uplink resource (Uplink Grant, UG) may also be referred to as an uplink grant.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person skilled in the art based on the embodiments of the present invention without creative efforts shall fall within the protection scope of the present invention.

Figure 1:
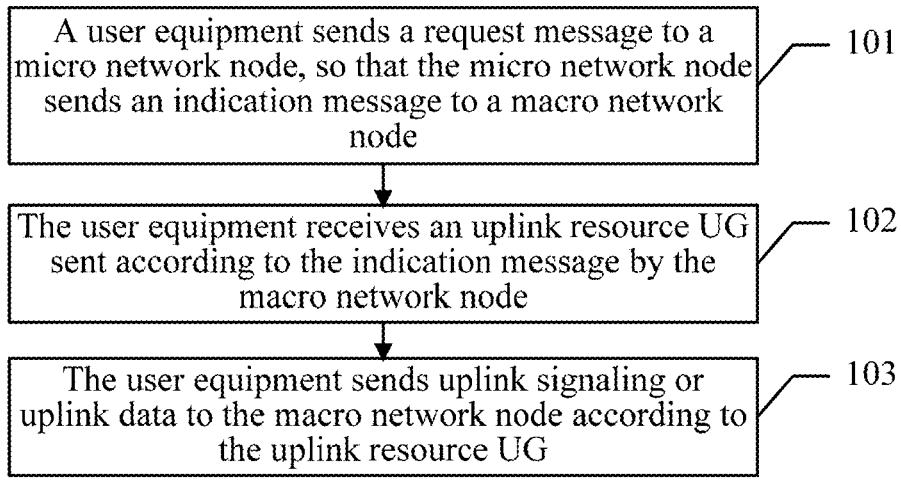
FIG. 1 is a schematic diagram of an embodiment of a communication method according to an embodiment of the present invention.

Referring to FIG. 1, a communication method according to an embodiment of the present invention includes:

101: A user equipment sends a request message to a micro network node, so that the micro network node sends an indication message to a macro network node.

The request message in the embodiment of the present invention may be an access request message, a scheduling request message, a connection request message, a request message for sending new data or signaling, or a radio resource control (Radio Resource Control, RRC) message; and may also be a physical signal or a control information element.

102: The user equipment receives an uplink resource (UG) sent according to the indication message by the macro network node.

103: The user equipment sends uplink signaling or uplink data to the macro network node according to the uplink resource (UG).

In the embodiment of the present invention, a UE sends a request message to a micro network node, so that the micro network node sends an indication message to a macro network node; and the UE receives an uplink resource (UG) sent according to the indication message by the macro network node, and sends uplink signaling or uplink data to the macro network node according to the uplink resource (UG). Compared with the prior art where no micro network node participates and a UE directly uses a contention-based random access procedure to perform access, the solution provided by the embodiment of the present invention can enable a UE to more rapidly access a network, thereby reducing an access delay of the UE.

During implementation of the present invention, none of the user equipment, the macro network node, and the micro network node controls sending, by the UE, the uplink data or uplink signaling; as long as the user initiates an access request, and after the macro network node receives an indication from the micro network node, the macro network node allocates the uplink resource to the user equipment.

Optionally, based on the embodiment corresponding to FIG. 1, in a first optional embodiment of the communication method according to the embodiment of the present invention, the receiving an uplink resource (UG) sent according to the indication message by the macro network node includes:

receiving a first timing advance (TA) and the uplink resource (UG) by using a non-contention-based random access procedure.

Correspondingly, the sending uplink signaling or uplink data to the macro network node according to the uplink resource (UG) includes:

sending the uplink signaling or uplink data to the macro network node according to the first timing advance (TA) and the uplink resource (UG).

In the embodiment of the present invention, the non-contention-based random access procedure is defined in detail in the 3rd Generation Partnership Project (The 3rd Generation Partnership Project, 3GPP) protocol TS 36.321, and specifically includes the following: the macro network node sends a non-contention-based random access command to the UE, the UE responds to the non-contention-based random access command by sending a random access request to the macro network node, and the macro network node sends a random access response to the UE, where the random access response includes the uplink channel resource (UG) and the timing advance (Time Advance, TA) which are allocated. In this way, the UE can obtain an uplink sending time according to the TA, and sends the uplink signaling or uplink data at the uplink sending time by using the UG Optionally, based on the embodiment corresponding to FIG. 1, in a second optional embodiment of the communication method according to the embodiment of the present invention, the receiving an uplink resource (UG) sent according to the indication message by the macro network node includes:

receiving, through a physical downlink control channel (PDCCH), the uplink resource (UG) sent by the macro network node.

Correspondingly, the method further includes:

reading an existing second timing advance (TA).

The sending uplink signaling or uplink data to the macro network node according to the uplink resource (UG) includes:

sending the uplink signaling or uplink data to the macro network node according to the second timing advance (TA) and the uplink resource (UG).

In the embodiment of the present invention, when a TA has existed in the UE, the UE does not need to obtain a TA from the macro network node. Therefore, without using non-contention-based random access procedure, the macro network node can still allocate the UG to the UE, for example, the macro network node sends the UE a UG allocated to the UE directly through the physical downlink control channel (Physical Downlink Control Channel, PDCCH).

Optionally, based on the embodiment corresponding to FIG. 1 and the first or the second optional embodiment corresponding to FIG. 1, in a third optional embodiment of the communication method according to the embodiment of the present invention, both the request message and the indication message carry size information of the uplink signaling or uplink data, and the size information of the uplink signaling or uplink data is used by the macro network node to determine the uplink resource (UG).

In the embodiment of the present invention, the UE may add size of the uplink signaling or uplink data sent in the foregoing embodiment to the sent request message, so that the macro network node may determine size of the UG according to the size of the uplink signaling or uplink data. Therefore, compared with the UG randomly allocated in the foregoing embodiment, the UG allocated in the embodiment of the present invention exactly adapts to the uplink signaling or uplink data to be sent. In this way, it is avoided that the allocated uplink resource is inadequate to send the uplink signaling or uplink data and that excessive UGs are allocated to cause a waste of UGs.

Optionally, based on the embodiment corresponding to FIG. 1 and the first to the third optional embodiments corresponding to FIG. 1, in a fourth optional embodiment of the communication method according to the embodiment of the present invention, before the step of sending a request message to a micro network node, the method further includes:

determining first control information of the uplink signaling or uplink data, where both the request message and the indication message carry the first control information, and the first control information is used by the macro network node to perform access control on the user equipment.

In the embodiment of the present invention, the first control information is used by the macro network node to perform access control on the user equipment, which is specifically as follows: only after determining, according to the first control information, that the uplink signaling or uplink data meets a preset access control rule, the macro network node sends the uplink resource (UG) to the user equipment.

In the embodiment of the present invention, before sending the request message, the UE may determine the first control information of the uplink signaling or uplink data according to the uplink signaling or uplink data to be sent. For example, when the UE is about to send signaling for an emergency call, it may be determined that the first control information includes: emergency indication information, a service type being an emergency call service, or what is to be sent being signaling.

The first control information may be at least one of emergency indication information, service type information, data information or signaling information, quality of service (Quality of Service, QoS) information, an identity of a radio bearer (Radio Bearer, RB), an identity of a logical channel (Logical CHannel, LCH), and an identity of a logical channel group to which the logical channel used by the radio bearer belongs.

The emergency indication information indicates whether the data or signaling that needs to be sent by the UE is emergent.

Specifically, the emergency indication may be expressed by a bit. When the bit is 1, it indicates that the data or signaling is emergent; and when the bit is 0, it indicates that the data or signaling is not emergent, and vice versa.

The service type indicates a type of a service to be initiated by the UE, and the information is specifically any one of the following: an emergency call, a high-priority service, a delay-insensitive service, and the like.

The data or signaling indicates whether data or signaling is to be sent by the UE.

The quality of service (Quality of Service, QoS) information includes a QoS parameter of a service to be initiated by the UE, and may specifically include a QoS class identifier (QoS Class Identifier, QCI), an allocation and retention priority (Allocation and Retention Priority, ARP), and the like.

The identity of a radio bearer (Radio Bearer, RB), or the identity of a logical channel (Logical CHannel, LCH) used by the RB, or the identity of an LCH group to which the LCH used by the RB belongs indicates one or more established RBs which the uplink data or signaling to be sent by the UE is from.

In the embodiment of the present invention, the macro network node controls the access of the UE, and when the indication message includes the first control information, the macro network node determines that it is required to allocate the uplink resource (UG) to the user equipment when determining that the first control information meets an access control rule.

The access control rule in the embodiment of the present invention may be as follows: it is required to allocate an uplink resource for an emergency call, to allocate an uplink resource for signaling, to allocate an uplink resource for a high-priority service, or the like. For example, when the first control information is an emergency call, the macro network node determines that the emergency call meets the access control rule, and then determines that it is required to allocate the uplink resource (UG) to the user equipment.

Optionally, based on the embodiment corresponding to FIG. 1, and the first to the third optional embodiments corresponding to FIG. 1, in a fifth optional embodiment of the communication method according to the embodiment of the present invention, before the step of sending a request message to a micro network node, the method further includes: receiving a first configuration message sent by the macro network node, where the first configuration message carries an uplink synchronization flag and/or second control information, and the uplink synchronization flag is used for instructing, after a time alignment timer (Time Alignment Timer, TAT) of a timing advance group (Timing advance group, TAG) to which a macro cell controlled by the macro network node belongs expires, the user equipment to still maintain continuous running of a TAT of a TAG to which a micro cell controlled by the micro network node belongs.

Optionally, based on the fifth optional embodiment corresponding to FIG. 1, in a sixth optional embodiment according to the embodiment of the present invention, when the first configuration message carries the second control information, after the step of receiving a first configuration message sent by the macro network node, the method further includes:

determining third control information of the uplink signaling or uplink data; and when the third control information meets an access control rule specified by the second control information, sending the access request message to the micro network node.

In the embodiment of the present invention, in order to control the access of the UE, the macro network node sends the first configuration message to the UE, where the first configuration message carries the second control information; the UE determines whether third control information of the uplink signaling or uplink data meets an access control rule specified by the second control information, and when the third control information meets the access control rule specified by the second control information, the UE determines that it is required to send the request message to the micro network node.

In the embodiment of the present invention, the control rule may vary in multiple situations. For example, the second control information includes emergency indication information and emergency call information, and the specified access control rule indicates that, when the second control information includes one piece of information in the third control information, the request message can be sent. For example, when the third control information only includes the emergency indication information, the request message can be sent. Alternatively, when the third control information includes the emergency indication information and a signaling identity, and the second control information includes the emergency indication information, the request message may also be sent. If the specified access control rule is that the request message can be sent only when the information in the third control information is completely identical with the information in the second control information; then, in the example, only when the third control information includes the emergency indication information and the emergency call information, the request message can be sent.

Optionally, based on the embodiment corresponding to FIG. 1 and the first to the third optional embodiments corresponding to FIG. 1, in a seventh optional embodiment of the communication method according to the embodiment of the present invention, before the step of sending a request message to a micro network node, the method may further include:

determining fourth control information of the uplink signaling or uplink data.

The request message carries the fourth control information, so that after determining that the fourth control information meets an access control rule specified by fifth control information that is carried in a second configuration message sent by the macro network node, the micro network node sends the indication message to the macro network node.

In the embodiment of the present invention, the micro network node performs access control. The UE determines the fourth control information according to the uplink signaling or uplink data, and adds the fourth control information to the request message; in this way, the micro network node can determine whether the fourth control information meets the access control rule specified by the fifth control information that is carried in the second configuration message sent by the macro network node, and when the fourth control information meets the access control rule specified by the fifth control information, the micro network node sends the indication message to the macro network node.

In the embodiment of the present invention, the specified access control rule may vary in multiple situations. For example, the fifth control information includes emergency indication information and emergency call information, and the specified access control rule indicates that, when the second control information includes one piece of information in the fourth control information, the indication message can be sent. For example, when the fourth control information only includes the emergency indication information, the indication message can be sent. Alternatively, when the fourth control information includes the emergency indication information and a signaling identity, and the fifth control information includes the emergency indication information, the indication message may also be sent. If the specified access control rule is that the indication message can be sent only when the information in the fourth control information is completely identical with the information in the fifth control information; then, in the example, only when the fourth control information includes the emergency indication information and the emergency call information, the indication message can be sent.

Optionally, based on the embodiment corresponding to FIG. 1 and the seventh optional embodiment corresponding to FIG. 1, in an eighth optional embodiment of the communication method according to the embodiment of the present invention, the indication message carries the fourth control information, and the fourth control information is further used by the macro network node to perform access control on the user equipment.

In the embodiment of the present invention, the indication message carries the fourth control information, the macro network node determines, according to the fourth control information, whether the uplink signaling or data meets the preset access control rule, and only after the macro network node determines that the uplink signaling or data meets the preset access control rule, the macro network node sends the uplink resource (UG) to the user equipment.

In the embodiment of the present invention, the micro network node and the macro network node perform access control at the same time. When the micro network node determines that the fourth control information meets the access control rule specified by the fifth control information, the micro network node adds the fourth control information to the indication message; and after determining that the fourth control information meets the access control rule, the macro network node sends the uplink resource (UG) to the user equipment.

Optionally, based on the embodiment corresponding to FIG. 1 and the first to the third optional embodiments corresponding to FIG. 1, in a ninth optional embodiment of the communication method according to the embodiment of the present invention, before the step of sending a request message to a micro network node, the method further includes:

receiving a third configuration message sent by the macro network node, where the third configuration message carries sixth control information; and determining seventh control information of the uplink signaling or uplink data.

The sending an access request message to the micro network node includes:

when the seventh control information meets an access control rule specified by the sixth control information, sending the access request message to the micro network node.

Correspondingly, both the request message and the indication message further carry the seventh control information, and the seventh control information is used by the macro network node to perform access control on the user equipment.

In the embodiment of the present invention, only after determining that the uplink signaling or data meets the preset access control rule, the macro network node sends the uplink resource (UG) to the user equipment.

In the embodiment of the present invention, the UE and the macro network node control access at the same time. For a relationship between the sixth control information and the seventh control information, reference may be made to a relationship between the third control information and the second control information for understanding.

Optionally, based on the embodiment corresponding to FIG. 1 and the first to the third optional embodiments corresponding to FIG. 1, in a tenth optional embodiment of the communication method according to the embodiment of the present invention, before the step of sending a request message to a micro network node, the method further includes:

receiving a fourth configuration message sent by the macro network node, where the fourth configuration message carries eighth control information; and determining ninth control information of the uplink signaling or uplink data.

The sending an access request message to the micro network node includes:

when the ninth control information meets an access control rule specified by the eighth control information, sending the access request message to the micro network node.

Correspondingly, the request message carries the ninth control information, so that after determining that the ninth control information meets a control rule specified by tenth control information that is carried in a fifth configuration message sent by the macro network node to the micro network node, the micro network node sends the indication message to the macro network node.

In the embodiment of the present invention, the UE and the micro network node control access at the same time. In the embodiment of the present invention, for a relationship between the eighth control information and the ninth control information, reference may be made to the relationship between the second control information and the third control information for understanding; and for a relationship between the ninth control information and the tenth control information, reference may be made to a relationship between the fourth control information and the fifth control information for understanding.

Optionally, based on the tenth optional embodiment, in an eleventh optional embodiment according to the embodiment of the present invention, the indication message carries the ninth control information, and the ninth control information is further used by the macro network node to perform access control on the user equipment.

In the embodiment of the present invention, the process of performing, by the macro network node, access control is as follows: the macro network node determines, according to the ninth control information, whether the uplink signaling or uplink data meets an access control rule, and after determining that the uplink signaling or uplink data meets the access control rule, the macro network node sends the uplink resource (UG) to the user equipment.

In the embodiment of the present invention, the UE, the macro network node, and the micro network node perform access control at the same time. When the indication message carries the ninth control information, when determining that the ninth control information meets the access control rule, the macro network node determines that it is required to allocate the uplink resource (UG) to the user equipment.

Optionally, in the foregoing multiple optional embodiments, the first control information, the second control information, the third control information, the fourth control information, the fifth control information, the sixth control information, the seventh control information, the eighth control information, the ninth control information, and the tenth control information each include at least one of emergency indication information, service type information, data information or signaling information, quality of service (QoS) information, an identity of a radio bearer (RB), an identity of a logical channel (LCH), and an identity of a logical channel group to which the logical channel used by the radio bearer belongs.

In the embodiment of the present invention, the first control information, the second control information, the third control information, the fourth control information, the fifth control information, the sixth control information, the seventh control information, the eighth control information, the ninth control information, and the tenth control information each may be an information set, and each set may include at least one information parameter.

Figure 2:
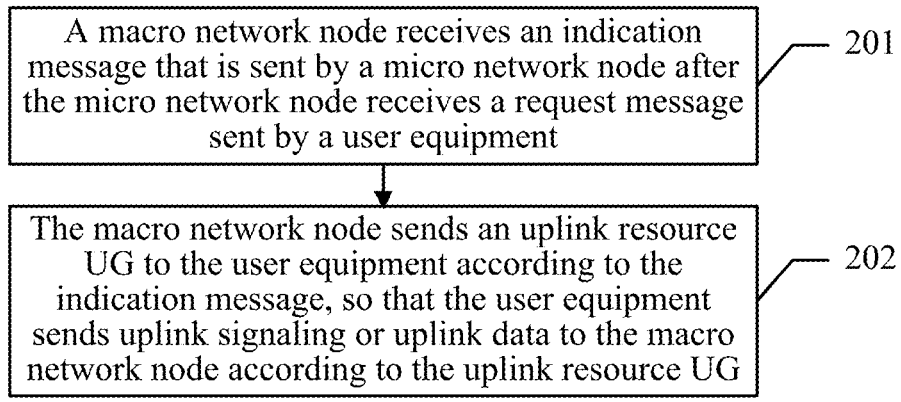
FIG. 2 is a schematic diagram of another embodiment of a communication method according to an embodiment of the present invention.

Referring to FIG. 2, a communication method according to an embodiment of the present invention includes:

201: A macro network node receives an indication message that is sent by a micro network node after the micro network node receives a request message sent by a user equipment.

202: The macro network node sends an uplink resource (UG) to the user equipment according to the indication message, so that the user equipment sends uplink signaling or uplink data to the macro network node according to the uplink resource (UG).

In the embodiment of the present invention, a macro network node receives an indication message that is sent by a micro network node after the micro network node receives a request message sent by a user equipment; and sends an uplink resource (UG) to the user equipment according to the indication message, so that the user equipment sends uplink signaling or uplink data to the macro network node according to the uplink resource (UG). Compared with the prior art where no micro network node participates and a UE directly uses a contention-based random access procedure to perform access, the solution provided by the embodiment of the present invention can enable a UE to more rapidly access a network, thereby reducing an access delay of the UE.

During implementation of the present invention, none of the user equipment, the macro network node, and the micro network node controls sending, by the UE, the uplink data or uplink signaling; as long as the user initiates an access request, and after the macro network node receives an indication from the micro network node, the macro network node allocates the uplink resource to the user equipment.

Optionally, based on the embodiment corresponding to FIG. 2, in a first optional embodiment of the communication method according to the embodiment of the present invention, the sending the uplink resource (UG) to the user equipment according to the indication message includes:

initiating a non-contention-based random access procedure to the user equipment according to the indication message, and sending a first timing advance (TA) and the uplink resource (UG) to the user equipment in the non-contention-based random access procedure, so that the user equipment sends the uplink signaling or uplink data to the macro network node according to the first timing advance (TA) and the uplink resource (UG).

In the embodiment of the present invention, no matter whether a TA exists in the UE or not, the macro network node can initiate the non-contention-based random access procedure, so that the UE obtains the UG and the TA used for sending the uplink signaling or uplink data.

Optionally, based on the embodiment corresponding to FIG. 2, in a second optional embodiment of the communication method according to the embodiment of the present invention, the sending the uplink resource (UG) to the user equipment includes:

sending the uplink resource (UG) to the user equipment through a physical downlink control channel (PDCCH) according to the indication message, so that the user equipment sends, after reading an existing second timing advance (TA), uplink signaling or uplink data to the macro network node according to the second timing advance (TA) and the uplink resource (UG).

In the embodiment of the present invention, when determining that a TA has existed in the UE, the macro network node may not need to initiate the contention-based random access procedure, but only needs to send the uplink resource (UG) to the user equipment through the physical downlink control channel (PDCCH); then, after reading the existing second timing advance (TA), the UE may send uplink signaling or uplink data to the macro network node according to the second timing advance (TA) and the uplink resource (UG).

Optionally, based on FIG. 2 and the first or the second optional embodiment corresponding to FIG. 2, in a third optional embodiment of the communication method according to the embodiment of the present invention, both the request message and the indication message carry size information of the uplink signaling or uplink data to be sent.

Before the sending an uplink resource (UG) to the user equipment, the method may further include:

determining the uplink resource (UG) according to the size information of the uplink signaling or uplink data.

In the embodiment of the present invention, when the indication message carries the size information of the uplink signaling or uplink data, the macro network node may determine, according to the size information of the uplink signaling or uplink data, the UG required for the size information of the uplink signaling or uplink data. Therefore, compared with the UG randomly allocated in the foregoing embodiment, the UG allocated in the embodiment of the present invention exactly adapts to the uplink signaling or uplink data to be sent. In this way, it is avoided that the allocated uplink resource is inadequate to send the uplink signaling or uplink data and that excessive UGs are allocated to cause a waste of UGs.

Optionally, based on FIG. 2 and any one of the first to the third optional embodiments corresponding to FIG. 2, in a fourth optional embodiment of the communication method according to the embodiment of the present invention:

both the request message and the indication message further carry first control information, determined by the user equipment, of the uplink signaling or uplink data; and before the step of sending an uplink resource (UG) to the user equipment, the method further includes:

performing access control on the user equipment according to the first control information.

In the embodiment of the present invention, an access control process is as follows: only after determining, according to the first control information, that the uplink signaling or data meets an access control rule, the macro network node sends the uplink resource (UG) to the user equipment.

In the embodiment of the present invention, the macro network node performs access control. When determining, according to the first control information carried in the indication message, that the first control information meets an access control rule, the macro network node allocates the uplink resource (UG) to the user equipment, where the access control rule may be, for example, as follows: allocating an uplink resource for an emergency call, allocating an uplink resource for signaling, allocating an uplink resource for a high-priority service, or the like. For example, when the first control information is an emergency call, the macro network node determines that the emergency call meets the access control rule, and then determines that it is required to allocate the uplink resource (UG) to the user equipment.

Optionally, based on FIG. 2 and any one of the first to the third optional embodiments corresponding to FIG. 2, in a fifth optional embodiment of the communication method according to the embodiment of the present invention, before the step of receiving the indication message, the method further includes:

sending a first configuration message to the user equipment, where the first configuration message carries an uplink synchronization flag and/or second control information, and the uplink synchronization flag is used for instructing, after a time alignment timer (TAT) of a timing advance group (TAG) to which a macro cell controlled by the macro network node belongs expires, the user equipment to still maintain continuous running of a TAT of a TAG to which a micro cell controlled by the micro network node belongs.

In the embodiment of the present invention, the uplink synchronization flag is used for notifying that, when the time alignment timer (TAT) of the timing advance group (TAG) to which the macro cell belongs expires, the UE still can send the request message to the micro cell controlled by the micro network node.

Optionally, based on the fifth optional embodiment corresponding to FIG. 2, in a sixth optional embodiment of the communication method according to the embodiment of the present invention, the first configuration message carries the second control information, so that the user equipment sends, after determining third control information of the uplink signaling or uplink data, the request message to the micro network node when the third control information meets an access control rule specified by the second control information.

In the embodiment of the present invention, the UE performs access control. For a relationship between the second control information and the third control information, reference may be made to the relationship between the second control information and the third control information in the UE-side embodiment for understanding.

Optionally, based on FIG. 2 and any one of the first to the third optional embodiments corresponding to FIG. 2, in a seventh optional embodiment of the communication method according to the embodiment of the present invention, the request message carries fourth control information, determined by the user equipment, of the uplink signaling or uplink data.

Before the step of receiving the indication message, the method further includes:

sending a second configuration message to the micro network node, where the second configuration message carries fifth control information, so that after determining whether the fourth control information meets an access control rule specified by the fifth control information, the micro network node sends the indication message to the macro network node.

In the embodiment of the present invention, the micro network node performs access control. For a relationship between the fourth control information and the fifth control information, reference may be made to the relationship between the fourth control information and the fifth control information in the UE-side embodiment for understanding.

Optionally, based on the seventh optional embodiment corresponding to FIG. 2, in an eighth optional embodiment of the communication method according to the embodiment of the present invention, the indication message carries the fourth control information; and before the step of sending an uplink resource (UG) to the user equipment, the method further includes:

performing access control on the user equipment according to the fourth control information.

In the embodiment of the present invention, an access control process is as follows: only after determining, according to the fourth control information, that the uplink signaling or data meets an access control rule, the macro network node sends the uplink resource (UG) to the user equipment.

In the embodiment of the present invention, the micro network node and the macro network node perform access control at the same time.

Optionally, based on FIG. 2 and any one of the first to the third optional embodiments corresponding to FIG. 2, in a ninth optional embodiment of the communication method according to the embodiment of the present invention, before the step of receiving the indication message, the method further includes:

sending a third configuration message to the user equipment, where the third configuration message carries sixth control information, so that after determining that seventh control information of the uplink signaling or uplink data meets an access control rule specified by the sixth control information, the user equipment sends the access request message to the micro network node.

Correspondingly, both the request message and the indication message further carry the seventh control information, and before the step of sending the uplink resource (UG) to the user equipment, the method further includes:

performing access control on the user equipment according to the seventh control information.

In the embodiment of the present invention, the access control process of the macro network node is as follows: the macro network node determines, according to the seventh control information, whether the uplink signaling or data meets an access control rule, and only after determining that the uplink signaling or data meets the access control rule, the macro network node sends the uplink resource (UG) to the user equipment.

In the embodiment of the present invention, the UE and the macro network node perform access control at the same time. For a relationship between the seventh control information and the sixth control information, reference may be made to the relationship between the seventh control information and the sixth control information in the UE-side embodiment for understanding.

Optionally, based on FIG. 2 and any one of the first to the third optional embodiments corresponding to FIG. 2, in a tenth optional embodiment of the communication method according to the embodiment of the present invention, before the step of receiving the indication message, the method further includes:

sending a fourth configuration message to the user equipment, where the fourth configuration message carries eighth control information, so that after determining that ninth control information of the uplink signaling or uplink data meets an access control rule specified by the eighth control information, the user equipment sends the access request message to the micro network node, where correspondingly, the request message carries the ninth control information; and sending a fifth configuration message to the micro network node, where the fifth configuration message carries tenth control information, so that after determining that the ninth control information meets an access control rule specified by the tenth control information, the micro network node sends the indication message to the macro network node.

In the embodiment of the present invention, the UE and the micro network node perform access control at the same time. For a relationship between the ninth control information and the eighth control information and a relationship between the ninth control information and the tenth control information, reference may be made to the relationship between the ninth control information and the eighth control information and the relationship between the ninth control information and the tenth control information in the UE-side embodiment for understanding.

Optionally, based on the tenth optional embodiment corresponding to FIG. 2, in an eleventh optional embodiment according to the embodiment of the present invention, the indication message carries the ninth control information; and before the step of sending an uplink resource (UG) to the user equipment, the method further includes:

performing access control on the user equipment according to the ninth control information.

In the embodiment of the present invention, an access control process is as follows: the macro network node determines, according to the ninth control information, whether the uplink signaling or data meets an access control rule, and only after determining that the uplink signaling or data meets the access control rule, the macro network node sends the uplink resource (UG) to the user equipment.

In the embodiment of the present invention, the UE, the macro network node, and the micro network node perform access control at the same time.

Optionally, in the foregoing multiple optional embodiments corresponding to FIG. 2, the first control information, the second control information, the third control information, the fourth control information, the fifth control information, the sixth control information, the seventh control information, the eighth control information, the ninth control information, and the tenth control information each include at least one of emergency indication information, service type information, data information or signaling information, quality of service (QoS) information, an identity of a radio bearer (RB), an identity of a logical channel (LCH), and an identity of a logical channel group to which the logical channel used by the radio bearer belongs.

Figure 3:
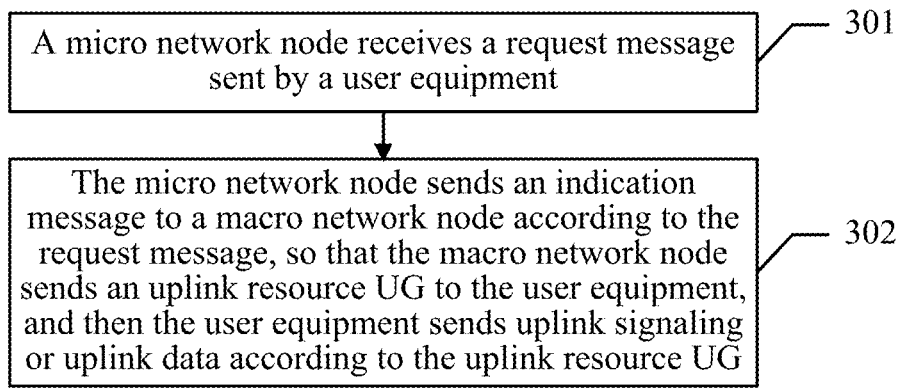
FIG. 3 is a schematic diagram of another embodiment of a communication method according to an embodiment of the present invention.

Referring to FIG. 3, a communication method according to an embodiment of the present invention includes:

301: A micro network node receives a request message sent by a user equipment.

302: The micro network node sends an indication message to a macro network node according to the request message, so that the macro network node sends an uplink resource (UG) to the user equipment, and then the user equipment sends uplink signaling or uplink data according to the uplink resource (UG).

In the embodiment of the present invention, a micro network node receives a request message sent by a user equipment; and sends an indication message to a macro network node according to the request message, so that the macro network node sends an uplink resource (UG) to the user equipment, and then the user equipment sends uplink signaling or uplink data according to the uplink resource (UG). Compared with the prior art where no micro network node participates and a UE directly uses a contention-based random access procedure to perform access, the solution provided by the embodiment of the present invention can enable a UE to more rapidly access a network, thereby reducing an access delay of the UE.

During implementation of the present invention, none of the user equipment, the macro network node, and the micro network node controls sending, by the UE, the uplink data or uplink signaling; as long as the user initiates an access request, and after the macro network node receives an indication from the micro network node, the macro network node allocates the uplink resource to the user equipment.

Optionally, based on the embodiment corresponding to FIG. 3, in a first optional embodiment according to the embodiment of the present invention, both the request message and the indication message carry first control information, determined by the user equipment, of the uplink signaling or uplink data, and the first control information is used by the macro network node to perform access control on the user equipment.

In the embodiment of the present invention, the macro network node performs access control as follows: the macro network node determines, according to the first control information, whether the uplink signaling or data meets an access control rule, and only after determining that the uplink signaling or data meets the access control rule, the macro network node allocates the uplink resource (UG) to the user equipment.

In the embodiment of the present invention, the macro network node performs access control.

Optionally, based on the embodiment corresponding to FIG. 3, in a second optional embodiment according to the embodiment of the present invention, the request message carries fourth control information, determined by the user equipment, of the uplink signaling or uplink data; and before the step of receiving a request message sent by a user equipment, the method further includes:

receiving a second configuration message sent by the macro network node, where the second configuration message carries fifth control information.

Correspondingly, the sending an indication message to a macro network node includes:

when the fourth control information meets an access control rule specified by the fifth control information, sending the indication message to the macro network node.

In the embodiment of the present invention, the micro network node performs access control.

Optionally, based on the second optional embodiment corresponding to FIG. 3, in a third optional embodiment according to the embodiment of the present invention, the indication message further carries the fourth control information, and the fourth control information is further used by the macro network node to perform access control on the user equipment.

In the embodiment of the present invention, the macro network node performs access control as follows: the macro network node determines, according to the fourth control information, whether the uplink signaling or uplink data meets an access control rule, and only after determining that the uplink signaling or uplink data meets the access control rule, the macro network node sends the uplink resource (UG) to the user equipment.

In the embodiment of the present invention, the micro network node and the macro network node perform access control at the same time.

Optionally, based on the embodiment corresponding to FIG. 3, in a fourth optional embodiment according to the embodiment of the present invention, the receiving a request message sent by a user equipment includes:

when seventh control information, determined by the user equipment, of the uplink signaling or uplink data meets an access control rule specified by sixth control information that is carried in a third configuration message sent by the macro network node, receiving an access request message sent by the user equipment, where the access request message carries the seventh control information, where the indication message carries the seventh control information, and the seventh control information is used by the macro network node to perform access control on the user equipment.

In the embodiment of the present invention, the process of performing, by the macro network node, access control is as follows: the macro network node determines, according to the seventh control information, whether the uplink signaling or uplink data meets an access control rule, and when determining that the uplink signaling or uplink data meets the access control rule, the macro network node sends the uplink resource (UG) to the user equipment.

In the embodiment of the present invention, the UE and the macro network node perform access control at the same time.

Optionally, based on the embodiment corresponding to FIG. 3, in a fifth optional embodiment according to the embodiment of the present invention, the receiving a request message sent by a user equipment includes:

when ninth control information, determined by the user equipment, of the uplink signaling or uplink data meets an access control rule specified by eighth control information that is carried in a fourth configuration message sent by the macro network node, receiving an access request message sent by the user equipment, where the access request message carries the ninth control information.

Before the step of receiving a request message sent by a user equipment, the method further includes:

receiving a fifth configuration message sent by the macro network node, where the fifth configuration message carries tenth control information.

Correspondingly, the sending an indication message to a macro network node includes:

when the ninth control information meets an access control rule specified by the tenth control information, sending the indication message to the macro network node.

In the embodiment of the present invention, the UE and the micro network node perform access control at the same time.

Optionally, based on the fifth optional embodiment corresponding to FIG. 3, in a sixth optional embodiment according to the embodiment of the present invention, the indication message carries the ninth control information, and the ninth control information is further used by the macro network node to perform access control on the user equipment.

In the embodiment of the present invention, the process of performing, by the macro network node, access control is as follows: the macro network node determines, according to the ninth control information, whether the uplink signaling or uplink data meets an access control rule, and after determining that the uplink signaling or uplink data meets the access control rule, the macro network node sends the uplink resource (UG) to the user equipment.

In the embodiment of the present invention, the UE, the micro network node, and the macro network node perform access control at the same time.

Optionally, based on the multiple embodiments corresponding to FIG. 3, the first control information, the fourth control information, the fifth control information, the sixth control information, the seventh control information, the eighth control information, the ninth control information, and the tenth control information each include at least one of emergency indication information, service type information, data information or signaling information, quality of service (QoS) information, an identity of a radio bearer (RB), an identity of a logical channel (LCH), and an identity of a logical channel group to which the logical channel used by the radio bearer belongs.

Figure 4:
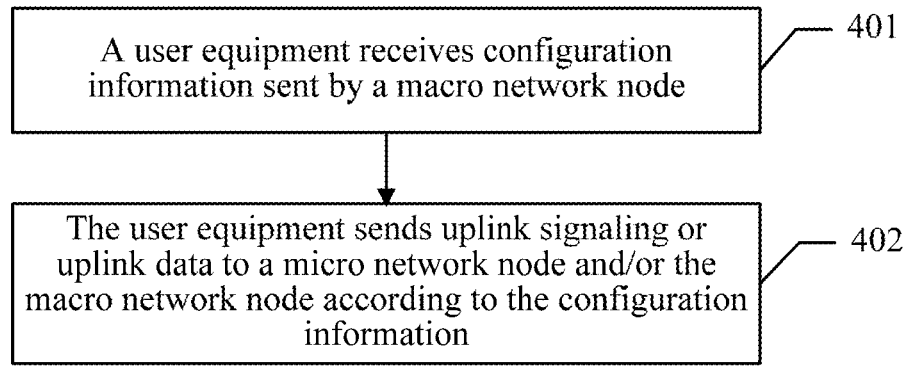
FIG. 4 is a schematic diagram of another embodiment of a communication method according to an embodiment of the present invention.

Referring to FIG. 4, a communication method according to an embodiment of the present invention includes:

401: A user equipment receives configuration information sent by a macro network node.

The configuration information in the embodiment of the present invention may be carried in a configuration message for transmission.

402: The user equipment sends uplink signaling or uplink data to a micro network node and/or the macro network node according to the configuration information.

In the embodiment of the present invention, a user equipment receives configuration information sent by a macro network node, and sends uplink signaling or uplink data to a micro network node and/or the macro network node according to the configuration information. Compared with the prior art where no micro network node participates and a UE directly uses a contention-based random access procedure to perform access, the solution provided by the embodiment of the present invention can enable a UE to more rapidly access a network, thereby reducing an access delay of the UE.

Optionally, based on the embodiment corresponding to FIG. 4, in a first optional embodiment of the communication method according to the embodiment of the present invention, the method may further include:

receiving downlink signaling or downlink data sent by the macro network node and/or the micro network node; and when the downlink signaling or downlink data sent by the macro network node and the micro network node is received, deleting duplicate signaling or data in the downlink signaling or downlink data sent by the macro network node and in the downlink signaling or downlink data sent by the micro network node.

In the embodiment of the present invention, when the user equipment simultaneously receives the downlink signaling or downlink data sent by the macro network node and the micro network node, the user equipment needs to delete the duplicate signaling or data and only reserve one copy of the signaling or data.

Optionally, based on the embodiment corresponding to FIG. 4 and the first optional embodiment corresponding to FIG. 4, in a second optional embodiment of the communication method according to the embodiment of the present invention, the configuration information includes an identity of a micro cell controlled by the micro network node and an identity of a radio bearer (RB) of the user equipment.

The sending uplink signaling or uplink data to a micro network node according to the configuration information includes:

sending, to the micro network node, the uplink signaling or uplink data transmitted on a radio bearer corresponding to the identity of the RB, where the uplink signaling or uplink data is sent by using a default logical channel and through a micro cell corresponding to the identity of the micro cell.

In the embodiment of the present invention, when the configuration information includes the identity of the micro cell controlled by the micro network node and the identity of the radio bearer (RB) of the user equipment, the uplink signaling or uplink data is transmitted on a default logical channel corresponding to the radio bearer.

Optionally, based on the second optional embodiment corresponding to FIG. 4, in a third optional embodiment of the communication method according to the embodiment of the present invention, when the configuration information further includes the identity of the logical channel (LCH), the sending uplink signaling or uplink data to a micro network node according to the configuration information includes:

sending, to the micro network node, the uplink signaling or uplink data transmitted on the radio bearer corresponding to the identity of the RB, where the uplink signaling or uplink data is sent by using a logical channel corresponding to the identity of the LCH and through the micro cell corresponding to the identity of the micro cell.

In the embodiment of the present invention, when the configuration information further includes the identity of the logical channel (LCH), the uplink signaling or uplink data is sent to the micro cell corresponding to the identity of the micro cell through the logical channel corresponding to the identity of the LCH.

Optionally, based on the second or the third optional embodiment corresponding to FIG. 4, in a fourth optional embodiment of the communication method according to the embodiment of the present invention, when the configuration information further includes an uplink flag, the receiving downlink signaling or downlink data sent by the macro network node and/or the micro network node includes:

receiving downlink signaling or downlink data sent by the macro network node.

The uplink flag is used for indicating that uplink signaling or uplink data can be sent to the macro network node and the micro network node in an uplink direction, but in a downlink direction, signaling or data can only be received from the macro network node.

Optionally, based on the second, third, or fourth optional embodiment corresponding to FIG. 4, in a fifth optional embodiment of the communication method according to the embodiment of the present invention, the configuration information further includes an uplink synchronization flag, where the uplink synchronization flag is used for instructing, after a time alignment timer (TAT) of a timing advance group (TAG) to which a macro cell controlled by the macro network node belongs expires, the user equipment to still maintain continuous running of a TAT of a TAG to which a micro cell controlled by the micro network node belongs.

Optionally, based on the embodiment corresponding to FIG. 4 and any one of the first to the fifth optional embodiments corresponding to FIG. 4, in a sixth optional embodiment of the communication method according to the embodiment of the present invention, the uplink signaling is an uplink radio resource control (RRC) message, and the downlink signaling is a downlink radio resource control (RRC) message.

Optionally, based on the sixth optional embodiment corresponding to FIG. 4, in a seventh optional embodiment of the communication method according to the embodiment of the present invention, the uplink RRC message includes an uplink measurement report (Measurement Report, MR) message and an uplink information transfer (Uplink Information Transfer, UIT) message, and the downlink RRC message includes a handover command message and a downlink information transfer message.

Figure 5:
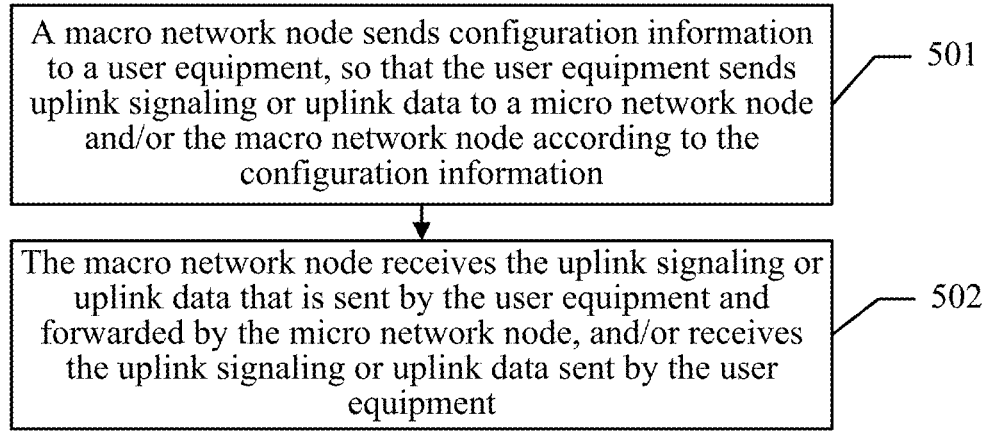
FIG. 5 is a schematic diagram of another embodiment of a communication method according to an embodiment of the present invention.

Referring to FIG. 5, a communication method according to an embodiment of the present invention includes:

501: A macro network node sends configuration information to a user equipment, so that the user equipment sends uplink signaling or uplink data to a micro network node and/or the macro network node according to the configuration information.

502: The macro network node receives the uplink signaling or uplink data that is sent by the user equipment and forwarded by the micro network node, and/or receives the uplink signaling or uplink data sent by the user equipment.

In the embodiment of the present invention, a macro network node sends configuration information to a user equipment, so that the user equipment sends uplink signaling or uplink data to a micro network node and/or the macro network node according to the configuration information; and the macro network node receives uplink signaling or uplink data that is sent by the user equipment and forwarded by the micro network node, and/or, receives the uplink signaling or uplink data sent by the user equipment. Compared with the prior art where no micro network node participates and a UE directly uses a contention-based random access procedure to perform access, the solution provided by the embodiment of the present invention can enable a UE to more rapidly access a network, thereby reducing an access delay of the UE.

Optionally, based on the embodiment corresponding to FIG. 5, in a first optional embodiment of the communication method according to the embodiment of the present invention, when the uplink signaling or uplink data that is sent by the user equipment and forwarded by the micro network node is received and the uplink signaling or uplink data sent by the user equipment is received, duplicate signaling or data in the uplink signaling or uplink data sent by the user equipment and in the uplink signaling or uplink data sent by the micro network node is deleted.

In the embodiment of the present invention, when the macro network node simultaneously receives the signaling or data sent by the UE and the micro network node, the macro network node needs to delete the duplicate signaling or data and only reserve one copy of the signaling or data.

Optionally, based on the embodiment corresponding to FIG. 5 and a first optional embodiment corresponding to FIG. 5, in a second optional embodiment of the communication method according to the embodiment of the present invention, the method may further include:

sending a seventh configuration message to the micro network node, where the seventh configuration message carries another configuration information, so that the micro network node forwards downlink signaling or downlink data to the user equipment according to the another configuration information; and sending the downlink signaling or downlink data to the micro network node.

Optionally, based on the second optional embodiment corresponding to FIG. 5, in a third optional embodiment of the communication method according to the embodiment of the present invention, the uplink signaling is an uplink radio resource control (RRC) message, and the downlink signaling is a downlink radio resource control (RRC) message.

Optionally, based on the third optional embodiment corresponding to FIG. 5, in a fourth optional embodiment of the communication method according to the embodiment of the present invention, the uplink RRC message includes an uplink measurement report message and an uplink information transfer message, and the downlink RRC message includes a handover command message and a downlink information transfer message.

Figure 6:
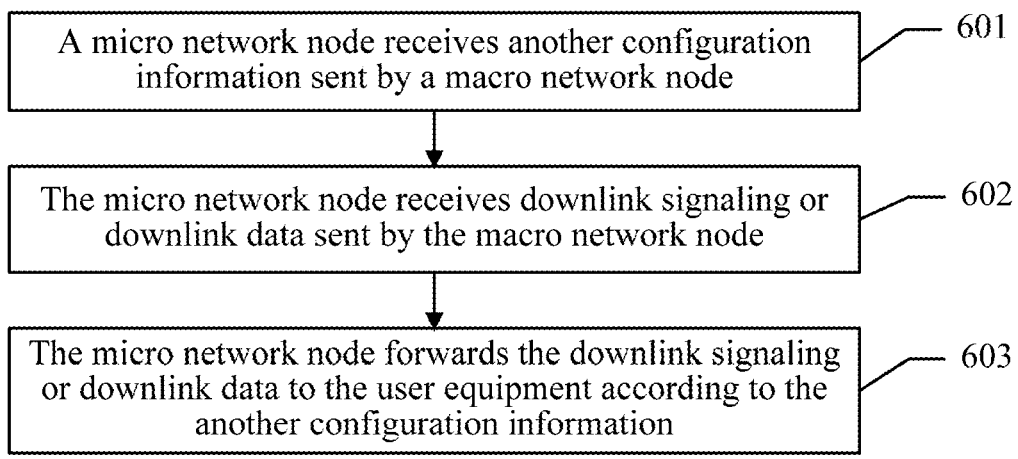
FIG. 6 is a schematic diagram of another embodiment of a communication method according to an embodiment of the present invention.

Referring to FIG. 6, an embodiment of a communication method according to an embodiment of the present invention includes:

601: A micro network node receives another configuration information sent by a macro network node.

602: The micro network node receives downlink signaling or downlink data sent by the macro network node.

603: The micro network node forwards the downlink signaling or downlink data to a user equipment according to the another configuration information.

In the embodiment of the present invention, a micro network node receives another configuration information sent by a macro network node, and receives downlink signaling or downlink data sent by the macro network node; and the micro network node forwards the downlink signaling or downlink data to the user equipment according to the another configuration information. Compared with the prior art where no micro network node participates and a UE directly uses a contention-based random access procedure to perform access, the solution provided by the embodiment of the present invention can enable a UE to more rapidly access a network, thereby reducing an access delay of the UE.

Optionally, based on the embodiment corresponding to FIG. 6, in a first optional embodiment of the communication method according to the embodiment of the present invention, the another configuration information includes an identity of the user equipment and an identity of a radio bearer (RB) of the user equipment.

The forwarding the downlink signaling or downlink data to the user equipment according to the another configuration information includes:

sending, to the user equipment, the downlink signaling or downlink data transmitted on a radio bearer corresponding to the identity of the RB, where the downlink signaling or downlink data is sent by using a default logical channel and through a micro cell corresponding to an identity of the micro cell.

In the embodiment of the present invention, when no identity of an LCH exists in the another configuration information, the sent uplink signaling or uplink data is received on the default logical channel corresponding to a radio bearer corresponding to the identity of the radio bearer (RB).

Optionally, based on the embodiment corresponding to FIG. 6 and the first optional embodiment corresponding to FIG. 6, in a second optional embodiment of the communication method according to the embodiment of the present invention, the another configuration information further includes the identity of the logical channel (LCH); and the forwarding the downlink signaling or downlink data to the user equipment according to the another configuration information includes:

sending, to the user equipment, the downlink signaling or downlink data transmitted on the radio bearer corresponding to the identity of the RB, where the downlink signaling or downlink data is sent by using a logical channel corresponding to the identity of the LCH and through the micro cell corresponding to the identity of the micro cell.

In the embodiment of the present invention, when the another configuration information further includes the identity of the logical channel (LCH), the uplink signaling or uplink data is received in the logical channel corresponding to the identity of the LCH.

The downlink signaling is a downlink radio resource control (RRC) message. The downlink RRC message includes a handover command message and a downlink information transfer message.

Figure 7:
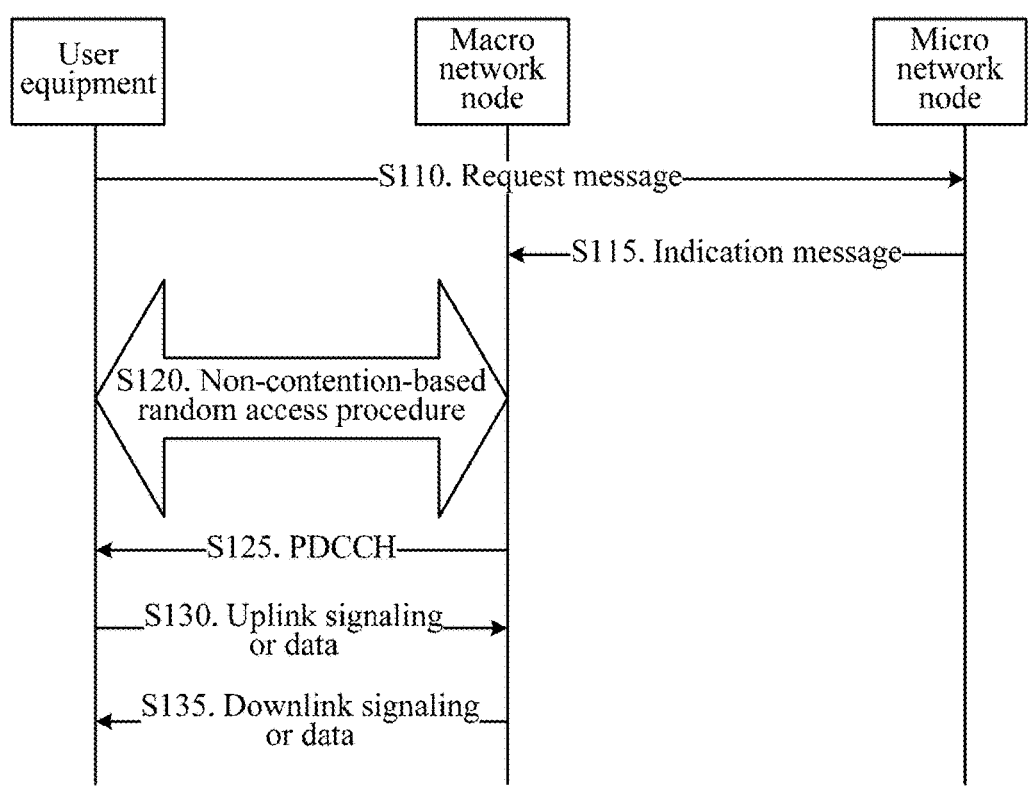
FIG. 7 is a schematic diagram of an embodiment of an application scenario according to an embodiment of the present invention.

For ease of understanding, several application scenarios are used as examples in the following to elaborate a communication process in the embodiment of the present invention:

Referring to FIG. 7, FIG. 7 shows a communication process when none of a user equipment, a macro network node, and a micro network node performs access control, and the communication process includes:

S110: The user equipment sends a request message to the micro network node.

The request message in the embodiment of the present invention may be an access request message, a scheduling request message, a connection request message, a request message for sending new data or signaling, or a radio resource control (Radio Resource Control, RRC) message; and may also be a physical signal or a control information element.

S115: The micro network node sends an indication message to the macro network node.

S120: The macro network node initiates a non-contention-based random access procedure, so that the UE obtains an uplink resource (UG) and a TA that are allocated by the macro network node.

In the embodiment of the present invention, the non-contention-based random access procedure is defined in detail in the 3rd Generation Partnership Project (The 3rd Generation Partnership Project, 3GPP) protocol TS 36.321, and specifically includes the following: the macro network node sends a non-contention-based random access command to the UE, the UE responds to the non-contention-based random access command and sends a random access request to the macro network node, and the macro network node sends a random access response to the UE, where the random access response includes the uplink resource (UG) and the timing advance (Time Advance, TA) which are allocated.

S125: The user equipment receives, through a physical downlink control channel (PDCCH), the uplink resource (UG) sent by the macro network node.

In this step, the user equipment may read an existing TA.

It is unnecessary to execute both step S120 and step S125. If step S120 is executed, step S125 is not executed; and if step S125 is executed, step S120 is not executed.

S130: The user equipment sends uplink signaling or uplink data to the macro network node.

In this way, the UE can obtain an uplink sending time according to the TA, and sends the uplink signaling or uplink data at the uplink sending time by using the UG S135: The macro network node sends downlink signaling or downlink data to the user equipment.

Step S135 is optional.

In the embodiment of the present invention, neither the request message nor the indication message carries any information; in this case, the macro network node randomly allocates the UG to the user equipment for the uplink signaling or uplink data to be sent. If the request message and the indication message both carry size information of the uplink signaling or uplink data, the macro network node allocates an appropriate UG to the user equipment according to the size information, so as to avoid resource shortage or resource waste in randomly allocating the UG.

Figure 8:
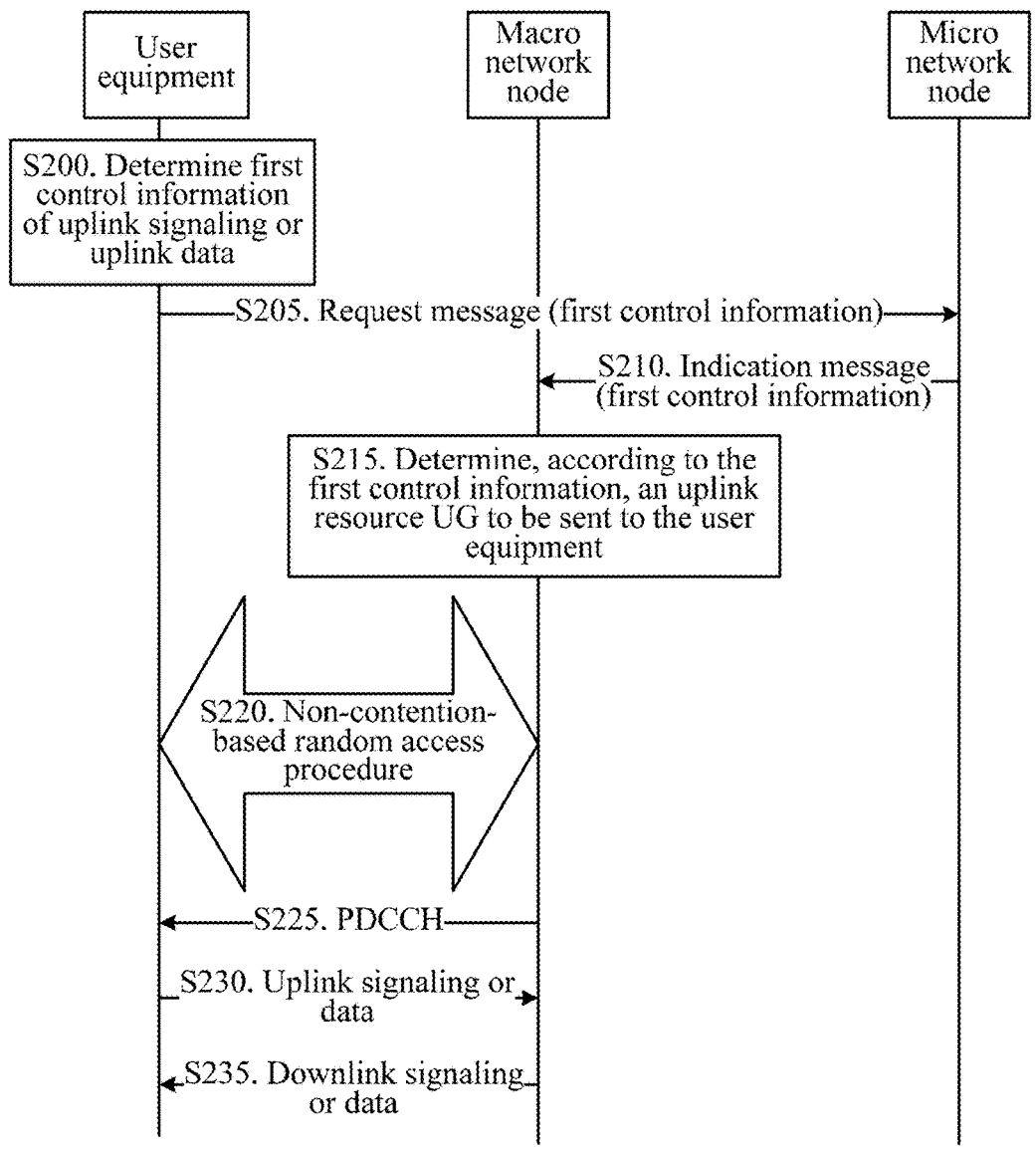
FIG. 8 is a schematic diagram of another embodiment of an application scenario according to an embodiment of the present invention.

Referring to FIG. 8, FIG. 8 shows a situation where only a macro network node performs access control. A communication process in the embodiment of the present invention includes:

S200: A user equipment determines first control information of uplink signaling or uplink data to be sent.

In this step, the first control information may be determined from multiple aspects such as an emergency situation, a service type, whether it is data information or signaling information, and quality of service; specifically, a rule for determining the first control information may be preset.

For example, when the UE is about to send signaling of an emergency call, the UE may determine that the first control information includes: emergency indication information, a service type being an emergency call service, or what is to be sent being signaling.

The first control information may be at least one of emergency indication information, service type information, data/signaling information, quality of service (Quality of Service, QoS) information, an identity of a radio bearer (Radio Bearer, RB), an identity of a logical channel (Logical CHannel, LCH), and an identity of a logical channel group to which the logical channel used by the radio bearer belongs.

The emergency indication information indicates whether the data or signaling that needs to be sent by the UE is emergent.

Specifically, the emergency indication may be expressed by a bit. When the bit is 1, it indicates that the data or signaling is emergent; and when the bit is 0, it indicates that the data or signaling is not emergent, and vice versa.

The service type indicates a type of a service to be initiated by the UE, and the information is specifically any one of the following: an emergency call, a high-priority service, a delay-insensitive service, and the like.

The data/signaling information indicates whether data or signaling is to be sent by the UE.

The quality of service (Quality of Service, QoS) information includes a QoS parameter of a service to which the uplink signaling or uplink data to be sent by the UE belongs, and may specifically include a QoS class identifier (QoS Class Identifier, QCI), an allocation and retention priority (Allocation and Retention Priority, ARP), and the like.

The identity of the radio bearer (Radio Bearer, RB), or the identity of the logical channel (Logical CHannel, LCH) used by the RB, or the identity of the LCH group to which the LCH used by the RB belongs indicates one or more established RBs, or one or more established LCHs which the uplink data or signaling to be sent by the UE is from.

S205: The user equipment sends a request message to the micro network node, where the request message carries the first control information.

S210: The micro network node sends an indication message to the macro network node, where the indication message carries the first control information.

S215: The macro network node determines, according to the first control information, an uplink resource (UG) to be sent to the user equipment.

In step S215, the macro network node first determines whether the first control information meets an access control rule, and when the first control information meets the access control rule, determines that it is required to allocate the uplink resource (UG) to the user equipment, where the access control rule is preset and stored in the macro network node by the system.

S220: The macro network node initiates a non-contention-based random access procedure, so that the UE obtains the uplink resource (UG) and a TA that are allocated by the macro network node.

In step S220, the non-contention-based random access procedure is the same as that in step S120, so the details are not described herein again.

S225: The user equipment receives, through a physical downlink control channel (PDCCH), the uplink resource (UG) sent by the macro network node.

In this step, the UE may read an existing TA.

It is unnecessary to execute both step S220 and step S225. If step S220 is executed, step S225 is not executed; and if step S225 is executed, step S220 is not executed.

S230: The user equipment sends uplink signaling or uplink data to the macro network node.

S235: The macro network node sends downlink signaling or downlink data to the user equipment.

Step S235 is an optional step.

Figure 9:
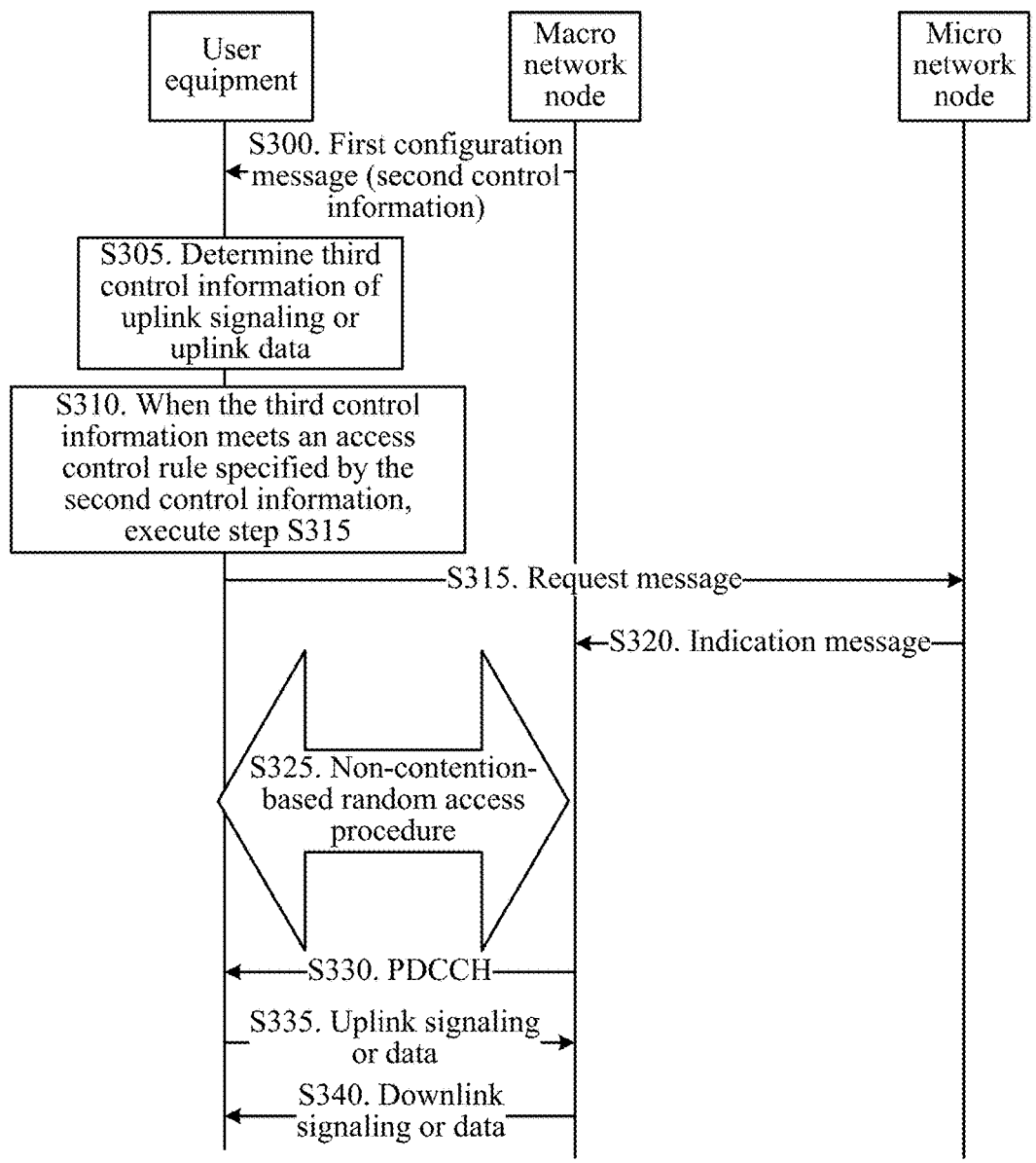
FIG. 9 is a schematic diagram of another embodiment of an application scenario according to an embodiment of the present invention.

Referring to FIG. 9, FIG. 9 shows a situation where only a user equipment performs access control. A communication process in the embodiment of the present invention includes:

S300: A macro network node sends a first configuration message to the user equipment, where the first configuration message carries second control information.

S305: The user equipment determines third control information of uplink signaling or uplink data.

S310: When the third control information meets an access control rule specified by the second control information, execute step S315.

For step S305 and step S310, specifically, the user equipment generates the third control information according to the second control information, and determines, according to whether a value of the third control information and a value of the second control information are identical, whether the third control information meets the access control rule specified by the second control information. For example, when the second control information includes emergency indication information, and the value of the emergency indication information is "emergency", the third control information determined by the user equipment is emergency indication information of the uplink signaling or uplink data; if the value of the emergency indication information of the uplink signaling or uplink data is also "emergency", the user equipment may send a request message. For another example, when the second control information includes service type information and data/signaling information, and the value of the service type information is an "emergency call" and the value of the data/signaling information is "signaling", the third control information determined by the user equipment is service type information and data/signaling information of the uplink signaling or uplink data; when the value of the service type information of the uplink signaling or uplink data is an "emergency call" or the value of the data/signaling information of the uplink signaling or uplink data is "signaling", the user equipment may send the request message. For still another example, when the second control information includes an identity of a radio bearer (RB), and values of the identity of the radio bearer (RB) are "SRB 1" and "DRB 2", the third control information determined by the user equipment is the identity of the radio bearer (RB) of the uplink signaling or uplink data; when the value of the identity of the radio bearer (RB) of the uplink signaling or uplink data is "SRB 1" or "DRB 2", the user equipment may send the request message. For yet another example, when the second control information includes QoS information, the QoS information includes a QCI and an ARP, and a value of the QCI is "1" and a value of the ARP is "2", the third control information determined by the user equipment is the QoS information of the uplink signaling or uplink data; when the value of the QCI in the QoS information of the uplink signaling or uplink data is "1" and the value of the ARP is "2", the user equipment may send the request message.

S315: Send the request message to the micro network node.

S320: The micro network node sends an indication message to the macro network node.

S325: The macro network node initiates a non-contention-based random access procedure, so that the UE obtains an uplink resource (UG) and a TA that are allocated by the macro network node.

S330: The user equipment receives, through a physical downlink control channel (PDCCH), the uplink resource (UG) sent by the macro network node.

The premise of this step is that the user equipment may read an existing TA.

It is unnecessary to execute both step S325 and step S330. If step S325 is executed, step S330 is not executed; and if step S330 is executed, step S325 is not executed.

S335: The user equipment sends uplink signaling or uplink data to the macro network node.

S340: The macro network node sends downlink signaling or downlink data to the user equipment.

Step S340 is an optional step.

In the embodiment of the present invention, neither of the request message and the indication message carries control information, and both of them may carry the size information of the uplink signaling or uplink data.

Figure 10:
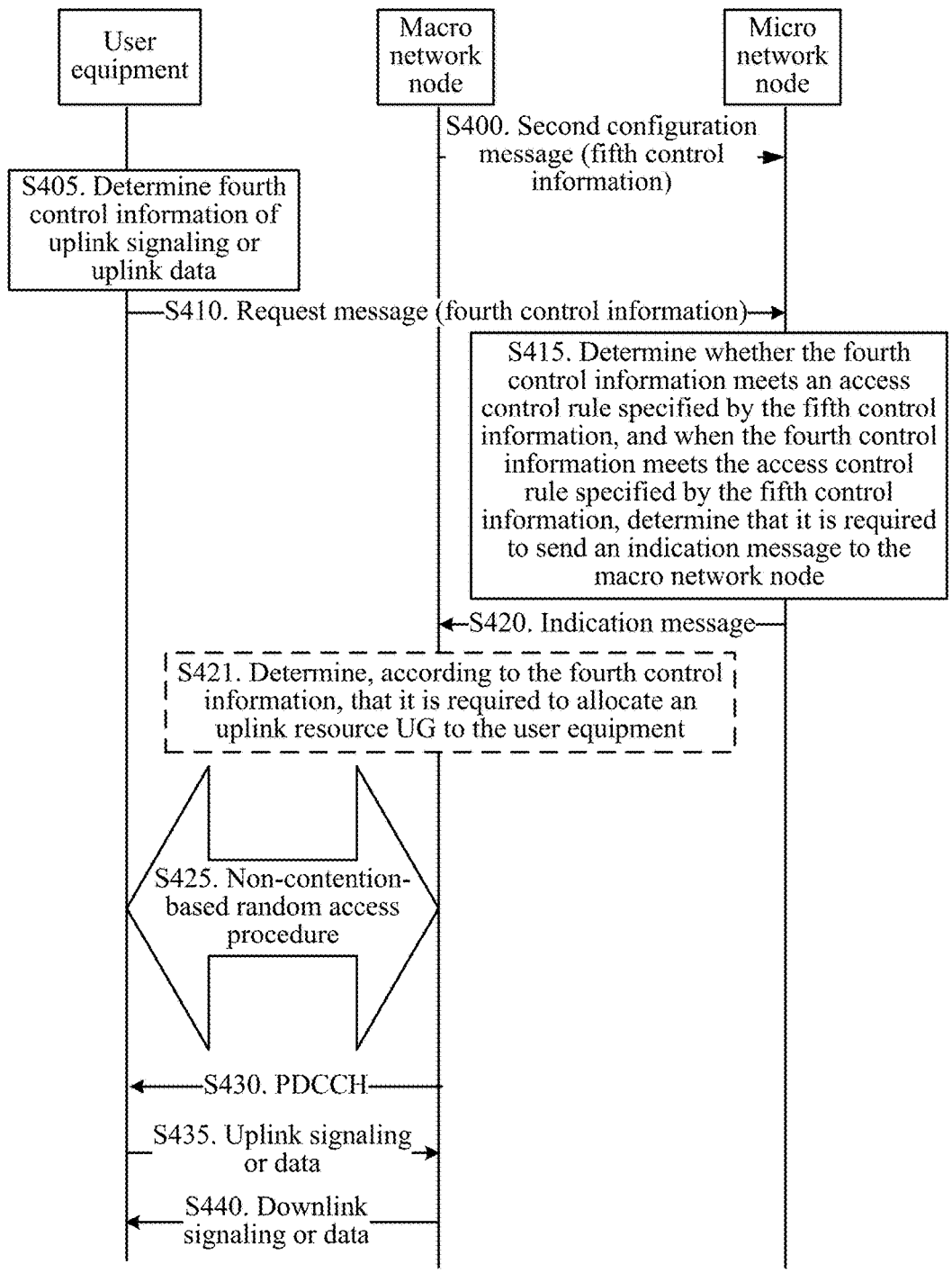
FIG. 10 is a schematic diagram of another embodiment of an application scenario according to an embodiment of the present invention.

Referring to FIG. 10, FIG. 10 shows a situation where only a micro network node performs access control. A communication process in the embodiment of the present invention includes:

S400: A macro network node sends a second configuration message to the micro network node, where the second configuration message carries fifth control information.

S405: The user equipment determines fourth control information of the uplink signaling or uplink data.

A process of determining the fourth control information in this step is basically the same as the process of determining the first control information in step S200, and reference may be made to the process of determining the first control information in step S200 for understanding.

S410: The user equipment sends a request message to the micro network node, where the request message carries the fourth control information.

S415: The micro network node determines whether the fourth control information meets an access control rule specified by the fifth control information, and when the fourth control information meets the access control rule specified by the fifth control information, the micro network node determines that it is required to send an indication message to the macro network node.

A process of determining that the fourth information meets the access control rule specified by the fifth control information in this step is basically the same as the process of determining that the third information meets the access control rule specified by the second control information in step S310, and reference may be made to the process in step S310 for understanding.

S420: The micro network node sends an indication message to the macro network node.

S425: The macro network node initiates a non-contention-based random access procedure, so that the UE obtains an uplink resource (UG) and a TA that are allocated by the macro network node.

S430: The user equipment receives, through a physical downlink control channel (PDCCH), the uplink resource (UG) sent by the macro network node.

The premise of this step is that the UE may read an existing TA.

It is unnecessary to execute both step S425 and step S430. If step S425 is executed, step S430 is not executed; and if step S430 is executed, step S425 is not executed.

S435: The user equipment sends uplink signaling or uplink data to the macro network node.

S440: The macro network node sends downlink signaling or downlink data to the user equipment.

Step S440 is an optional step.

In the embodiment of the present invention, only the micro network node performs access control. The indication message in step S420 does not carry any control information, and when the indication message in step S420 carries the fourth control information, the communication process further includes:

Step S421: The macro network node determines, according to the fourth control information, that it is required to allocate the uplink resource (UG) to the user equipment.

In this way, in the embodiment of the communication process including step S421, the macro network node and the micro network node perform access control at the same time.

Figure 11:
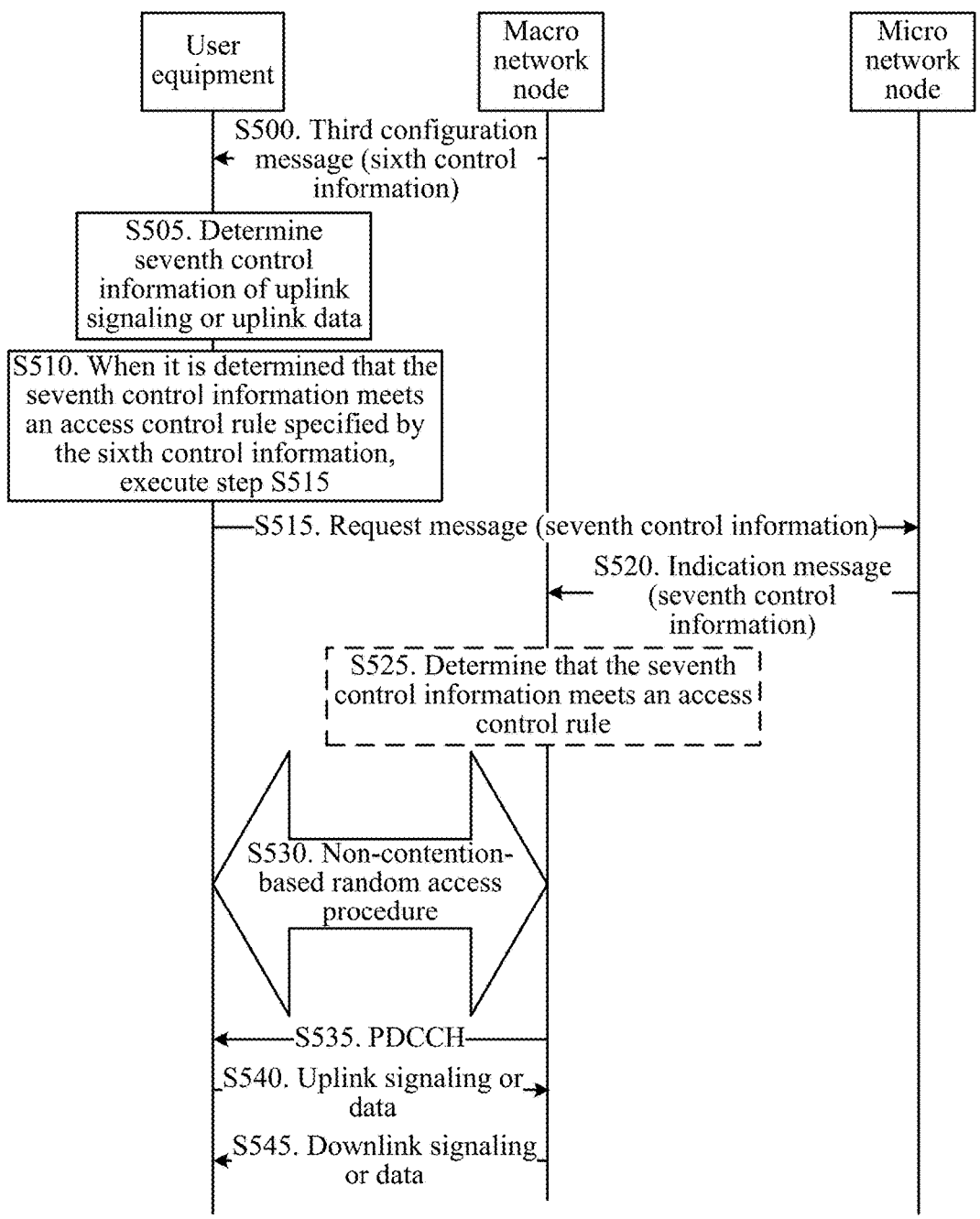
FIG. 11 is a schematic diagram of another embodiment of an application scenario according to an embodiment of the present invention.

Referring to FIG. 11, FIG. 11 shows a situation where a user equipment and a macro network node perform access control at the same time. A communication process in the embodiment of the present invention includes:

S500: The macro network node sends a third configuration message to the user equipment, where the third configuration message carries sixth control information.

S505: The user equipment determines seventh control information of uplink signaling or uplink data to be sent.

S510: After the user equipment determines that the seventh control information meets an access control rule specified by the sixth control information, execute step S515.

A process of determining the seventh control information in the embodiment of the present invention is basically the same as the process of determining the third control information in step S305, and a process of determining that the seventh control information meets the access control rule specified by the sixth control information in the embodiment of the present invention is basically the same as the process of determining that the third control information meets the access control rule specified by the second control information in step S310, and reference may be made to processes of the corresponding steps separately for understanding.

S515: Send the request message to the micro network node, where the request message carries the seventh control information.

S520: The micro network node sends an indication message to the macro network node, where the indication message carries the seventh control information.

S525: The macro network node determines that the seventh control information meets an access control rule.

S530: The macro network node initiates a non-contention-based random access procedure, so that the UE obtains an uplink resource (UG) and a TA that are allocated by the macro network node.

S535: The user equipment receives, through a physical downlink control channel (PDCCH), the uplink resource (UG) sent by the macro network node.

The premise of this step is that the UE may read an existing TA.

It is unnecessary to execute both step S530 and step S535. If step S530 is executed, step S535 is not executed; and if step S535 is executed, step S530 is not executed.

S540: The user equipment sends uplink signaling or uplink data to the macro network node.

S545: The macro network node sends downlink signaling or downlink data to the user equipment.

Step S545 is an optional step.

Figure 12:
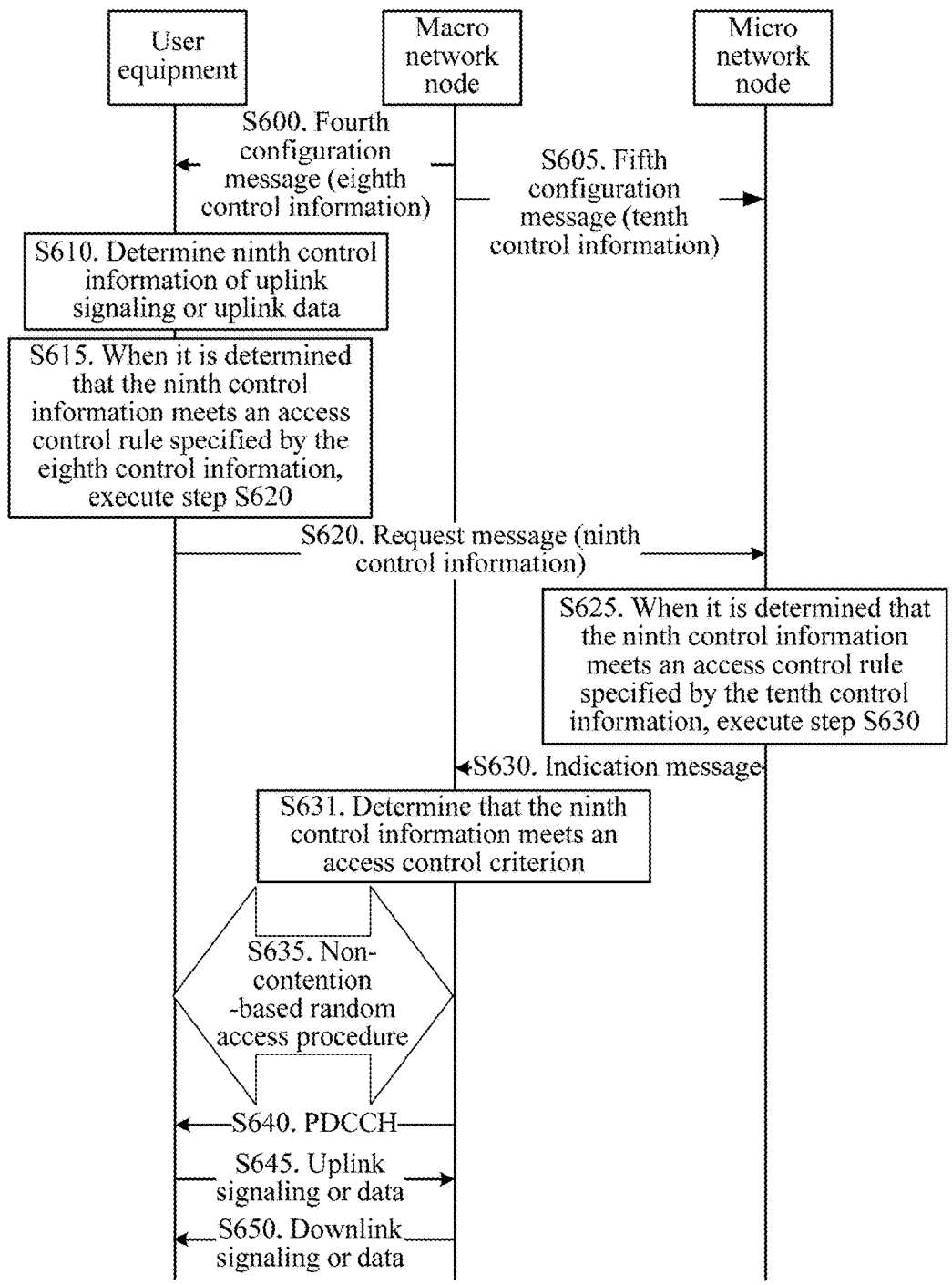
FIG. 12 is a schematic diagram of another embodiment of an application scenario according to an embodiment of the present invention.

Referring to FIG. 12, FIG. 12 shows a situation where a user equipment and a micro network node perform access control at the same time. A communication process in the embodiment of the present invention includes:

S600: A macro network node sends a fourth configuration message to the user equipment, where the fourth configuration message carries eighth control information.

S605: The macro network node sends a fifth configuration message to the micro network node, where the fifth configuration message carries tenth control information.

The sequence of step S600 and step S605 is not limited.

S610: The user equipment determines ninth control information of uplink signaling or uplink data to be sent.

S615: When the user equipment determines that the ninth control information meets an access control rule specified by the eighth control information, execute step S620. In this step, for a relationship between the eighth control information and the ninth control information, reference may be made to the relationship between the second control information and the third control information in the foregoing embodiment for understanding, and the details are not described herein again.

S620: Send the request message to the micro network node, where the request message carries the ninth control information.

S625: After the micro network node determines that the ninth control information meets an access control rule specified by the tenth control information, execute step S630.

S630: Send the indication message to the macro network node.

S635: The macro network node initiates a non-contention-based random access procedure, so that the UE obtains an uplink resource (UG) and a TA that are sent by the macro network node.

S640: The user equipment receives, through a physical downlink control channel (PDCCH), the uplink resource (UG) sent by the macro network node.

The premise of this step is that the UE may read an existing TA.

It is unnecessary to execute both step S635 and step S640. If step S635 is executed, step S640 is not executed; and if step S640 is executed, step S635 is not executed.

S645: The user equipment sends uplink signaling or uplink data to the macro network node.

S650: The macro network node sends downlink signaling or downlink data to the user equipment.

Step S640 is an optional step.

The indication message in step S630 in the embodiment corresponding to FIG. 12 does not carry any control information, and when the indication message in step S630 carries the ninth control information, the communication process further includes:

Step S631: The macro network node determines that the ninth control information meets an access control rule.

When the embodiment includes step S631, it indicates that the user equipment, the macro network node, and the micro network node perform access control at the same time.

In embodiments of the foregoing multiple application scenarios, the first control information, the second control information, the third control information, the fourth control information, the fifth control information, the sixth control information, the seventh control information, the eighth control information, the ninth control information, and the tenth control information each include at least one of emergency indication information, service type information, data/signaling information, quality of service (QoS) information, an identity of a radio bearer (RB), an identity of a logical channel (LCH), and an identity of a logical channel group to which the logical channel used by the radio bearer belongs.

The emergency indication information indicates whether the data or signaling that needs to be sent by the UE is emergent.

Specifically, the emergency indication may be expressed by a bit. When the bit is 1, it indicates that the data or signaling is emergent; and when the bit is 0, it indicates that the data or signaling is not emergent, and vice versa.

The service type indicates a type of a service to be initiated by the UE, and the information may be specifically any one of the following: an emergency call, a high-priority service, a delay-insensitive service, and the like.

The data/signaling information indicates whether data or signaling is to be sent by the UE.

The quality of service (Quality of Service, QoS) information includes a QoS parameter of a service to which the data or signaling to be sent by the UE belongs, and may specifically include a QoS class identifier (QoS Class Identifier, QCI), an allocation and retention priority (Allocation and Retention Priority, ARP), and the like.

The identity of the radio bearer (Radio Bearer, RB), or the identity of the logical channel (Logical CHannel, LCH) used by the RB, or the identity of the LCH group to which the LCH used by the RB belongs indicates one or more established RBs, or one or more established LCHs which the uplink data or signaling to be sent by the UE is from.

Moreover, the access request message and the indication message in the foregoing multiple embodiments may both carry the size information of the uplink signaling or uplink data. In this way, in each application scenario, the macro network node needs to determine, according to the size information, the size of the UG to be allocated to the user equipment for the uplink signaling or uplink data to be sent.

In the multiple embodiments of the present invention, the first configuration message may carry an uplink synchronization flag, where the uplink synchronization flag is used for instructing, after a time alignment timer (TAT) of a timing advance group (TAG) to which a macro cell controlled by the macro network node belongs expires, the user equipment to still maintain continuous running of a TAT of a TAG to which a micro cell controlled by the micro network node belongs.

In the embodiment of the present invention, when the TAT of the macro cell expires, the user equipment further needs to send uplink data or uplink signaling to the macro network node. In the foregoing multiple embodiments, the UG and the TA can be allocated to the user equipment only by the macro network node by initiating a non-contention-based random access procedure. If the user equipment does not have a resource for sending a scheduling request (Scheduling Request, SR) on the macro cell, and needs to send uplink signaling or uplink data to the macro network node, and moreover, the user equipment fails to send a dynamic scheduling request (Dynamic Scheduling Request, DSR) on the macro cell, that is, a quantity of times that the user equipment continuously sends an SR exceeds a predetermined maximum quantity of times, the macro network node may send the UG to the user equipment through the physical downlink control channel (PDCCH). In these two situations, since a TA has existed in the user equipment, and the user equipment does not need to depend on the non-contention-based random access procedure to obtain a TA.

Figure 13:
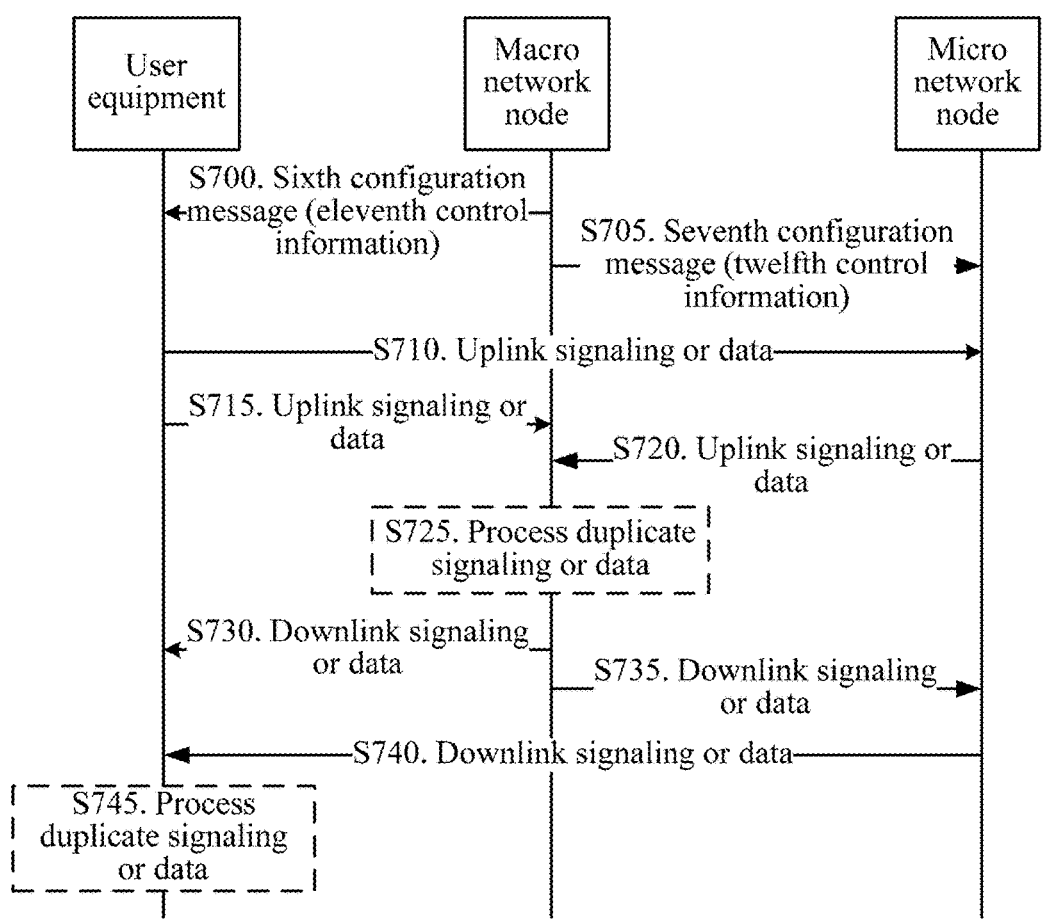
FIG. 13 is a schematic diagram of another embodiment of an application scenario according to an embodiment of the present invention.

Referring to FIG. 13, FIG. 13 shows another application scenario embodiment of a communication method according to an embodiment of the present invention, and the method includes:

S700: A macro network node sends a sixth configuration message to a user equipment, where the sixth configuration message carries configuration information.

The configuration information includes an identity of a micro cell controlled by a micro network node and an identity of a radio bearer (RB) of the user equipment.

The configuration information may further include any one or more of an identity of a logical channel (LCH), an uplink flag, configuration related to an RLC (Radio Link Control), and configuration related to the LCH.

S705: The macro network node sends a seventh configuration message to the micro network node, where the seventh configuration message carries another configuration information.

The another configuration information includes an identity of the user equipment and the identity of the radio bearer (RB) of the user equipment.

The another configuration information may further include any one or more of the identity of the logical channel (LCH), the configuration related to the RLC (Radio Link Control), and the configuration related to the LCH.

The execution sequence of step S700 and step S705 is not limited.

S710: The user equipment sends uplink signaling or uplink data to the micro network node.

Specifically, the user equipment sends, to the micro network node, uplink signaling or uplink data transmitted on the radio bearer corresponding to the identity of the radio bearer (RB), where the uplink signaling or uplink data is sent through a micro cell corresponding to the identity of the micro cell. Optionally, the user equipment sends the uplink signaling or uplink data by using the LCH corresponding to the identity of the LCH, the configuration related to the RLC and/or the configuration related to the LCH.

In the embodiment of the present invention, the uplink signaling may be an unlink radio resource control (Radio Resource Control, RRC) message, and the uplink RRC message includes a measurement report (Measurement Report, MR) message, an uplink information transfer (Uplink Information Transfer, UIT) message, and the like.

S715: The user equipment sends uplink signaling or uplink data to the macro network node.

S720: The micro network node forwards, to the macro network node, the uplink signaling or uplink data sent by the user equipment.

In the embodiment of the present invention, both step S710 and step S715 may be executed, or only one of the steps may be executed. When the two steps are both executed, step S725 needs to be further executed; and when one of the steps is executed, step S725 does not need to be executed. When step S710 is executed, step S720 needs to be further executed; and when step S710 is not executed, step S720 does not need to be executed.

S725: The macro network node deletes duplicate signaling or data in the uplink signaling or uplink data sent by the user equipment and in the uplink signaling or uplink data sent by the micro network node.

S730: The macro network node sends downlink signaling or downlink data to the user equipment.

In the embodiment of the present invention, the downlink signaling may be a downlink radio resource control (RRC) message, and the downlink RRC message includes a handover command (Handover Command, HC) message, a downlink information transfer (Downlink Information Transfer, DIT) message, and the like.

S735: The macro network node sends downlink signaling or downlink data to the micro network node.

S740: The micro network node forwards, to the user equipment, the downlink signaling or downlink data sent by the macro network node.

Specifically, the micro network node sends, to the user equipment, downlink signaling or downlink data transmitted on the radio bearer corresponding to the identity of the radio bearer (RB), where the downlink signaling or downlink data is sent through a micro cell corresponding to the identity of the micro cell. Optionally, the micro network node sends the downlink signaling or downlink data by using the LCH corresponding to the identity of the LCH, the configuration related to the RLC and/or the configuration related to the LCH.

In the embodiment of the present invention, both step S730 and step S735 may be executed, or only one of the steps may be executed. When the two steps are both executed, step S740 needs to be further executed; and when one of the steps is executed, step S740 does not need to be executed. When step S735 is executed, step S740 needs to be further executed; and when step S735 is not executed, step S740 does not need to be executed. When the configuration information includes an uplink flag, step S735 and step S740 are not executed, and only step S730 is executed, that is, the user equipment receives the downlink signaling or downlink data from the macro network node, and does not receive the downlink signaling or downlink data from the micro network node.

S745: The user equipment deletes duplicate signaling or data in the downlink signaling or downlink data sent by the macro network node and in the downlink signaling or downlink data sent by the micro network node.

The present invention elaborates the communication process among the user equipment, the macro network node, and the micro network node by using the foregoing multiple application scenarios.

Figure 14:
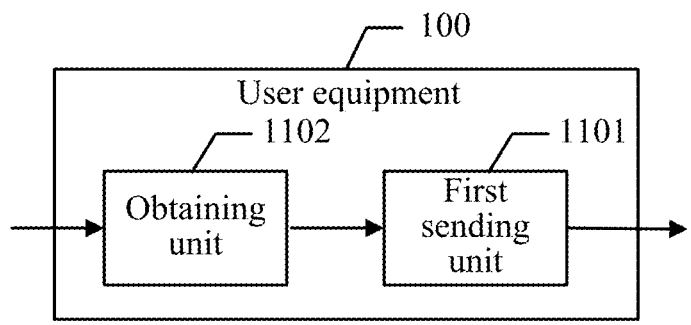
FIG. 14 is a schematic diagram of an embodiment of a user equipment according to an embodiment of the present invention.

Referring to FIG. 14, a user equipment according to an embodiment of the present invention includes:

a first sending unit 1101, configured to send a request message to a micro network node, so that the micro network node sends an indication message to a macro network node; and an obtaining unit 1102, configured to receive an uplink resource (UG) sent according to the indication message by the macro network node, where the first sending unit 1101 is further configured to send uplink signaling or uplink data to the macro network node according to the uplink resource (UG) obtained by the obtaining unit.

In the embodiment of the present invention, the first sending unit 1101 sends a request message to a micro network node, so that the micro network node sends an indication message to a macro network node; the obtaining unit 1102 receives an uplink resource (UG) sent according to the indication message by the macro network node; and the first sending unit 1101 sends uplink signaling or uplink data to the macro network node according to the uplink resource (UG) obtained by the obtaining unit. Compared with the prior art, the user equipment provided by the embodiment of the present invention more rapidly accesses a network with the participation of the micro network node, thereby reducing an access delay.

Based on the embodiment corresponding to FIG. 14, in a first optional embodiment of the user equipment according to the embodiment of the present invention, the obtaining unit 1102 is configured to receive, by using a non-contention-based random access procedure, a first timing advance (TA) and the uplink resource (UG) in the non-contention-based random access procedure; and the first sending unit 1101 is configured to send the uplink signaling or uplink data to the macro network node according to the first timing advance (TA) and the uplink resource (UG) obtained by the obtaining unit 1102.

Based on the embodiment corresponding to FIG. 14, in a second optional embodiment of the user equipment according to the embodiment of the present invention, the obtaining unit 1102 is configured to read an existing second timing advance (TA), and receive, through a physical downlink control channel (PDCCH), the uplink resource (UG) sent by the macro network node; and the first sending unit 1101 is configured to send the uplink signaling or uplink data to the macro network node according to the second timing advance (TA) and the uplink resource (UG) obtained by the obtaining unit 1102.

Figure 15:
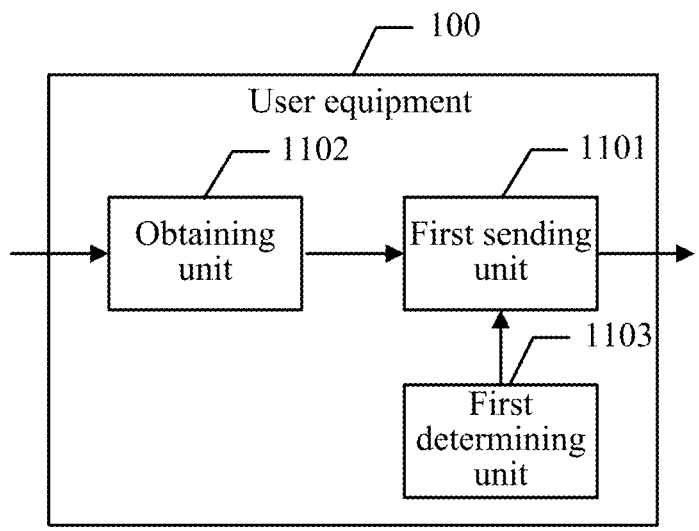
FIG. 15 is a schematic diagram of another embodiment of a user equipment according to an embodiment of the present invention.

Based on the embodiment corresponding to FIG. 14 and the first or the second optional embodiment corresponding to FIG. 14, referring to FIG. 15, in a third optional embodiment of the user equipment according to the embodiment of the present invention, the user equipment further includes:

a first determining unit 1103, configured to: before the first sending unit 1101 sends the request message, determine first control information of the uplink signaling or uplink data, where both the request message and the indication message carry the first control information, and the first control information is used by the macro network node to perform access control on the user equipment.

Figure 16:
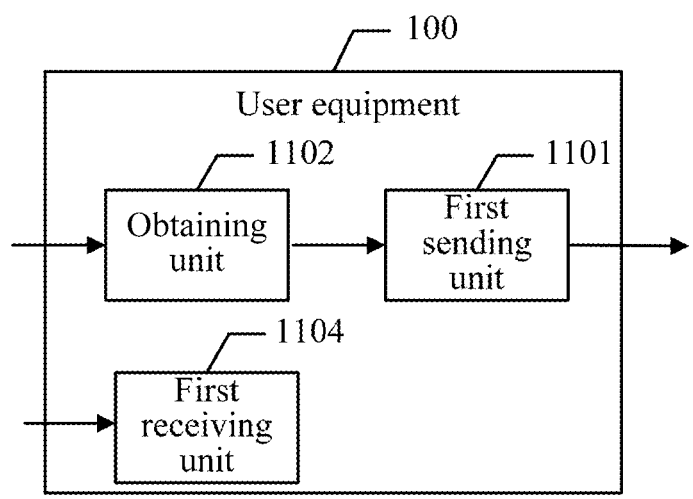
FIG. 16 is a schematic diagram of another embodiment of a user equipment according to an embodiment of the present invention.

Based on the embodiment corresponding to FIG. 14 and the first or the second optional embodiment corresponding to FIG. 14, referring to FIG. 16, in a fourth optional embodiment of the user equipment according to the embodiment of the present invention, the user equipment further includes:

a first receiving unit 1104, configured to receive a first configuration message sent by the macro network node, where the first configuration message carries an uplink synchronization flag and/or second control information, the uplink synchronization flag is used for instructing, after a time alignment timer (TAT) of a timing advance group (TAG) to which a macro cell controlled by the macro network node belongs expires, the user equipment to still maintain continuous running of a TAT of a TAG to which a micro cell controlled by the micro network node belongs.

Figure 17:
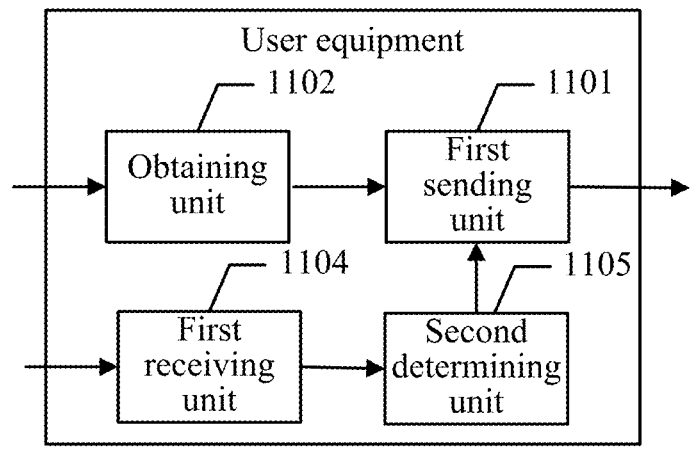
FIG. 17 is a schematic diagram of another embodiment of a user equipment according to an embodiment of the present invention.

Based on the fourth optional embodiment, referring to FIG. 17, in a fifth optional embodiment of the user equipment according to the embodiment of the present invention, the user equipment further includes:

a second determining unit 1105, configured to determine third control information of the uplink signaling or uplink data, and send the request message to the micro network node when the third control information meets an access control rule specified by the second control information.

Figure 18:
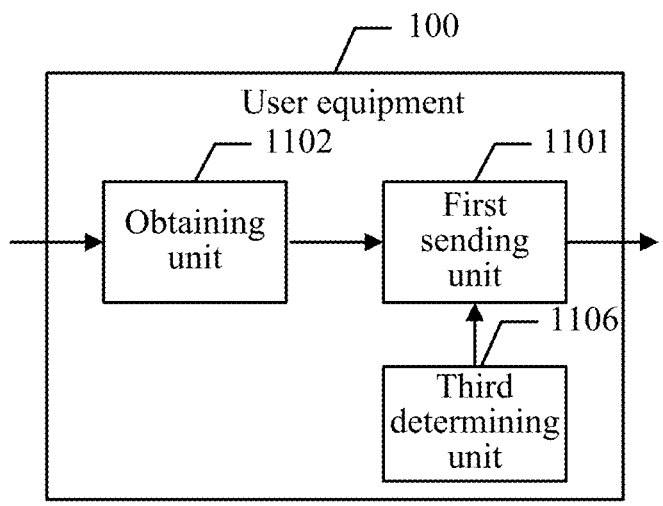
FIG. 18 is a schematic diagram of another embodiment of a user equipment according to an embodiment of the present invention.

Based on the embodiment corresponding to FIG. 14 and the first or the second optional embodiment corresponding to FIG. 14, referring to FIG. 18, in a sixth optional embodiment of the user equipment according to the embodiment of the present invention, the user equipment further includes:

a third determining unit 1106, configured to determine fourth control information of the uplink signaling or uplink data, where the request message carries the fourth control information, so that after determining that the fourth control information meets an access control rule specified by fifth control information that is carried in a second configuration message sent by the macro network node, the micro network node sends the indication message to the macro network node.

Figure 19:
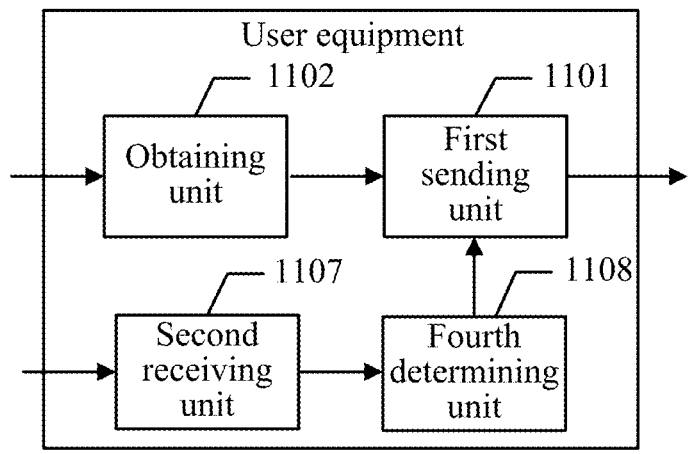
FIG. 19 is a schematic diagram of another embodiment of a user equipment according to an embodiment of the present invention.

Based on the embodiment corresponding to FIG. 14 and the first or the second optional embodiment corresponding to FIG. 14, referring to FIG. 19, in a seventh optional embodiment of the user equipment according to the embodiment of the present invention, the user equipment further includes:

a second receiving unit 1107, configured to receive a third configuration message sent by the macro network node, where the third configuration message carries sixth control information; and a fourth determining unit 1108, configured to determine seventh control information of the uplink signaling or uplink data, where the first sending unit 1101 is further configured to: when the seventh control information meets an access control rule specified by the sixth control information, send the request message to the micro network node.

Figure 20:
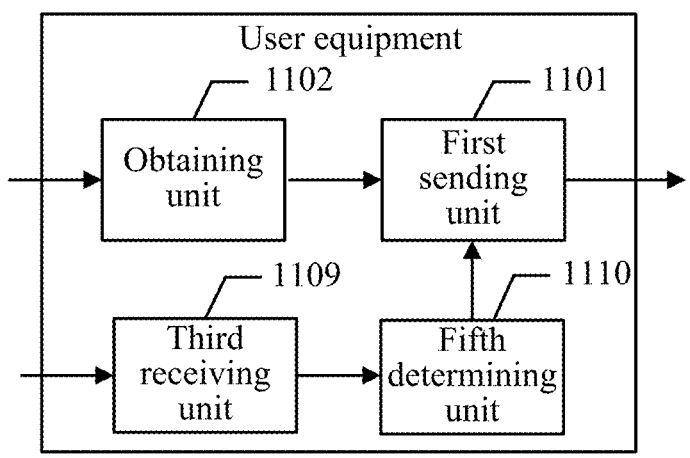
FIG. 20 is a schematic diagram of another embodiment of a user equipment according to an embodiment of the present invention.

Based on the embodiment corresponding to FIG. 14 and the first or the second optional embodiment corresponding to FIG. 14, referring to FIG. 20, in an eighth optional embodiment of the user equipment according to the embodiment of the present invention, the user equipment further includes:

a third receiving unit 1109, configured to receive a fourth configuration message sent by the macro network node, where the fourth configuration message carries eighth control information; and a fifth determining unit 1110, configured to determine ninth control information of the uplink signaling or uplink data, where the first sending unit 1101 is further configured to: when the ninth control information meets an access control rule specified by the eighth control information, send the request message to the micro network node.

Figure 21:
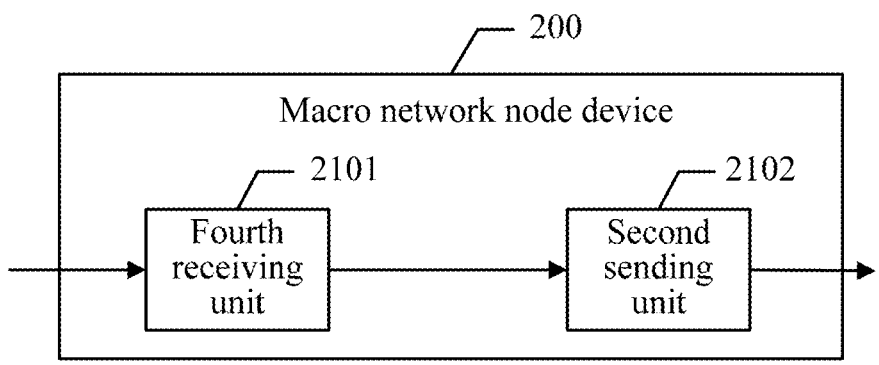
FIG. 21 is a schematic diagram of an embodiment of a macro network node device according to an embodiment of the present invention.

Referring to FIG. 21, a macro network node device according to an embodiment of the present invention includes:

a fourth receiving unit 2101, configured to receive an indication message that is sent by a micro network node after the micro network node receives a request message sent by a user equipment; and a second sending unit 2102, configured to send an uplink resource (UG) to the user equipment according to the indication message, so that the user equipment sends uplink signaling or uplink data according to the uplink resource (UG).

In the embodiment of the present invention, the fourth receiving unit 2101 receives an indication message that is sent by a micro network node after the micro network node receives a request message sent by a user equipment; and the second sending unit 2102 sends an uplink resource (UG) to the user equipment according to the indication message, so that the user equipment sends uplink signaling or uplink data according to the uplink resource (UG). Compared with the prior art, the macro network node device provided by the embodiment of the present invention can help the UE more rapidly access a network, thereby reducing an access delay of the UE.

Based on the embodiment corresponding to FIG. 21, in a first optional embodiment of the macro network node device according to the embodiment of the present invention, the second sending unit 2102 is configured to initiate a non-contention-based random access procedure to the user equipment according to the indication message, and send a first timing advance (TA) and the uplink resource (UG) to the user equipment in the non-contention-based random access procedure, so that the user equipment sends uplink signaling or uplink data to the macro network node according to the first timing advance (TA) and the uplink resource (UG).

Based on the embodiment corresponding to FIG. 21, in a second optional embodiment of the macro network node device according to the embodiment of the present invention, the second sending unit 2102 is configured to send the uplink resource (UG) to the user equipment through a physical downlink control channel (PDCCH) according to the indication message, so that the user equipment sends, after reading an existing second timing advance (TA), uplink signaling or uplink data to the macro network node according to the second timing advance (TA) and the uplink resource (UG).

Figure 22:
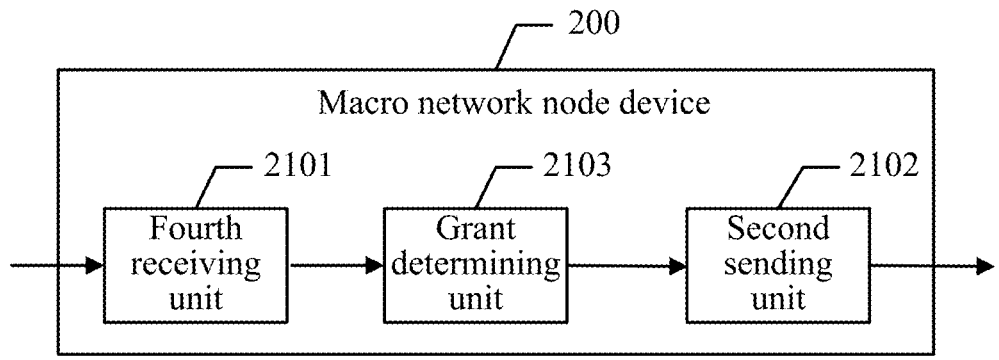
FIG. 22 is a schematic diagram of another embodiment of a macro network node device according to an embodiment of the present invention.

Based on the embodiment corresponding to FIG. 21 and the first or the second optional embodiment, referring to FIG. 22, in a third optional embodiment of the macro network node device according to the embodiment of the present invention, both the request message and the indication message carry size information of the uplink signaling or uplink data to be sent; the macro network node device further includes: a resource determining unit 2103, where the resource determining unit 2103 is configured to determine the uplink resource (UG) required for the uplink signaling or uplink data according to the size information of the uplink signaling or uplink data, and allocate the determined uplink resource (UG) to the user equipment.

Figure 23:
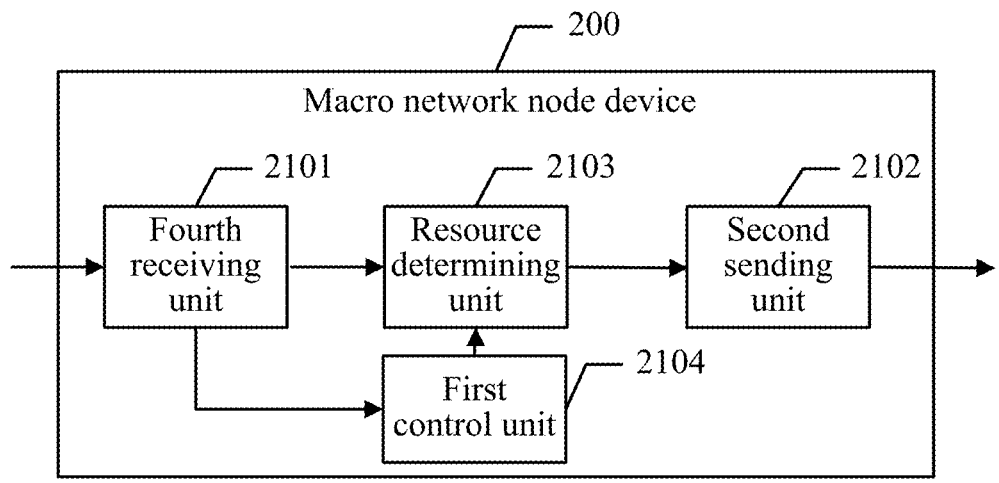
FIG. 23 is a schematic diagram of another embodiment of a macro network node device according to an embodiment of the present invention.

Based on the embodiment corresponding to FIG. 21 and any one of the first to the third optional embodiments, in a fourth optional embodiment of the macro network node device according to the embodiment of the present invention, both the request message and the indication message further carry first control information, determined by the user equipment, of the uplink signaling or uplink data. Referring to FIG. 23, the macro network node device further includes:

a first control unit 2104, configured to perform access control on the user equipment according to the first control information.

Based on the embodiment corresponding to FIG. 21 and any one of the first to the fourth optional embodiments, in a fifth optional embodiment of the macro network node device according to the embodiment of the present invention, the second sending unit 2012 is further configured to send a first configuration message to the user equipment, where the first configuration message carries an uplink synchronization flag and/or second control information, and the uplink synchronization flag is used for instructing, after a time alignment timer (TAT) of a timing advance group (TAG) to which a macro cell controlled by the macro network node belongs expires, the user equipment to still maintain continuous running of a TAT of a TAG to which a micro cell controlled by the micro network node belongs.

Based on the embodiment corresponding to FIG. 21 and any one of the first to the fourth optional embodiments, in a sixth optional embodiment of the macro network node device according to the embodiment of the present invention, the second sending unit 2012 is further configured to send a second configuration message to the micro network node, where the second configuration message carries fifth control information, so that after determining that the fourth control information meets an access control rule specified by the fifth control information, the micro network node sends the indication message to the macro network node.

Figure 24:
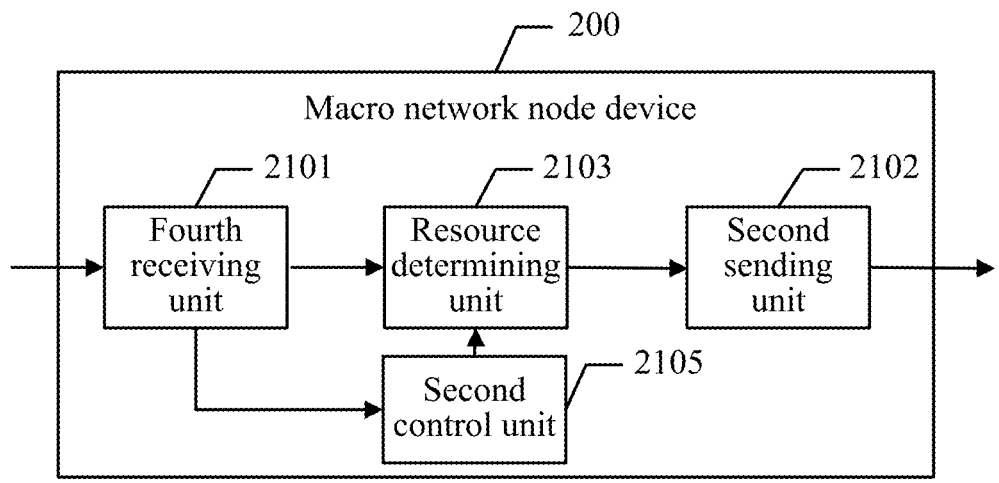
FIG. 24 is a schematic diagram of another embodiment of a macro network node device according to an embodiment of the present invention.

Based on the sixth optional embodiment, referring to FIG. 24, in a seventh optional embodiment of the macro network node device according to the embodiment of the present invention, the macro network node device further includes:

a second control unit 2105, configured to perform access control on the user equipment according to the fourth control information.

Figure 25:
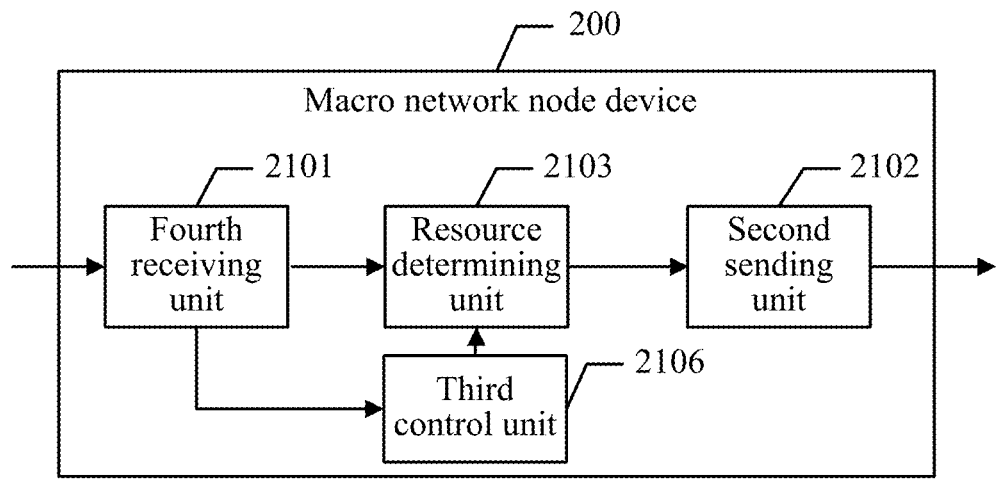
FIG. 25 is a schematic diagram of another embodiment of a macro network node device according to an embodiment of the present invention.

Based on the embodiment corresponding to FIG. 21 and any one of the first to the fourth optional embodiments, in an eighth optional embodiment of the macro network node device according to the embodiment of the present invention, referring to FIG. 25, the macro network node device further includes:

the second sending unit 2102 is further configured to send a third configuration message to the user equipment, where the third configuration message carries sixth control information, so that after determining that seventh control information of the uplink signaling or uplink data meets an access control rule specified by the sixth control information, the user equipment sends the request message to the micro network node;

a third control unit 2106, configured to: when both the request message and the indication message further carry the seventh control information, perform access control on the user equipment according to the seventh control information.

Based on the embodiment corresponding to FIG. 21 and any one of the first to the fourth optional embodiments, in a ninth optional embodiment of the macro network node device according to the embodiment of the present invention, the second sending unit 2102 is further configured to send a fourth configuration message to the user equipment, where the fourth configuration message carries eighth control information, so that after determining that ninth control information of the uplink signaling or uplink data meets an access control rule specified by the eighth control information, the user equipment sends the request message to the micro network node;

the request message carries the ninth control information; and the second sending unit 2102 is further configured to send a fifth configuration message to the micro network node, where the fifth configuration message carries tenth control information, so that after determining that the ninth control information meets an access control rule specified by the tenth control information, the micro network node sends the indication message to the macro network node.

Figure 26:
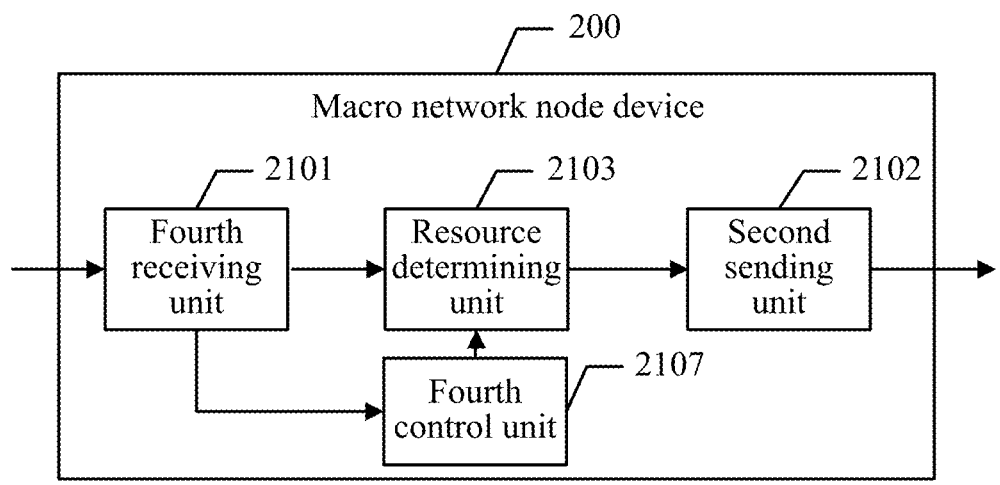
FIG. 26 is a schematic diagram of another embodiment of a macro network node device according to an embodiment of the present invention.

Based on the ninth optional embodiment, and referring to FIG. 26, in a tenth optional embodiment of the macro network node device according to the embodiment of the present invention, the macro network node device further includes:

a fourth control unit 2107, configured to perform access control on the user equipment according to the ninth control information.

Figure 27:
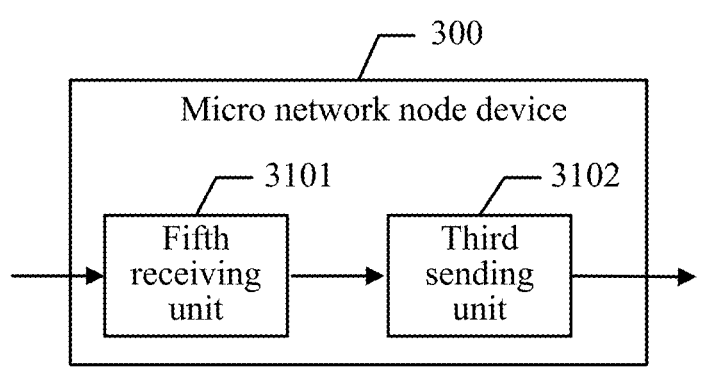
FIG. 27 is a schematic diagram of an embodiment of a micro network node device according to an embodiment of the present invention.

Referring to FIG. 27, a micro network node device according to an embodiment of the present invention includes:

a fifth receiving unit 3101, configured to receive a request message sent by a user equipment; and a third sending unit 3102, configured to send an indication message to a macro network node, so that the macro network node allocates an uplink resource (UG) to the user equipment, and then the user equipment sends uplink signaling or uplink data to the macro network node by using the uplink resource (UG).

In the embodiment of the present invention, the fifth receiving unit 3101 receives a request message sent by a user equipment; and the third sending unit 3102 sends an indication message to a macro network node, so that the macro network node allocates an uplink resource (UG) to the user equipment, and then the user equipment sends uplink signaling or uplink data to the macro network node by using the uplink resource (UG). Compared with the prior art, the micro network node device provided by the embodiment of the present invention can help the UE more rapidly access a network, thereby reducing an access delay of the UE.

Figure 28:
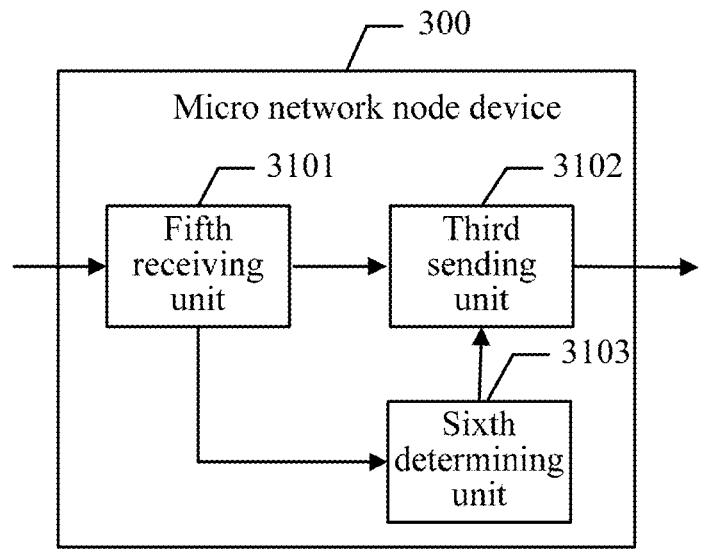
FIG. 28 is a schematic diagram of another embodiment of a micro network node device according to an embodiment of the present invention.

Based on the embodiment corresponding to FIG. 27, and referring to FIG. 28, a first optional embodiment of the micro network node device according to the embodiment of the present invention includes:

the fifth receiving unit 3101 is further configured to receive a second configuration message sent by the macro network node, where the second configuration message carries fifth control information;

a sixth determining unit 3103, configured to determine whether the fourth control information meets an access control rule specified by the fifth control information.

The third sending unit 3102 is further configured to: after the fourth control information meets an access control rule specified by the fifth control information, send the indication message to the macro network node.

Based on the first optional embodiment, in a second optional embodiment of the micro network node device according to the embodiment of the present invention, the fifth receiving unit 3101 is configured to: after seventh control information, determined by the user equipment, of the uplink signaling or uplink data meets an access control rule specified by sixth control information that is carried in a third configuration message sent by the macro network node, receive the request message sent by the user equipment, where the request message carries the seventh control information.

Figure 29:
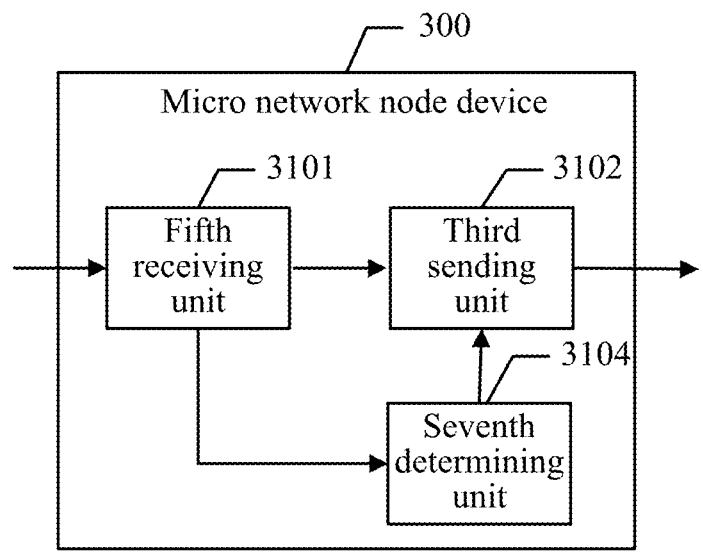
FIG. 29 is a schematic diagram of another embodiment of a micro network node device according to an embodiment of the present invention.

Based on the embodiment corresponding to FIG. 27, and referring to FIG. 29, a third optional embodiment of the micro network node device according to the embodiment of the present invention includes:

the fifth receiving unit 3101 is configured to: after ninth control information, determined by the user equipment, of the uplink signaling or uplink data meets an access control rule specified by eighth control information that is carried in a fourth configuration message sent by the macro network node, receive the request message sent by the user equipment, where the request message carries the ninth control information; and the fifth receiving unit 3101 is further configured to receive a fifth configuration message sent by the macro network node, where the fifth configuration message carries tenth control information;

a seventh determining unit 3105, configured to determine whether the ninth control information meets an access control rule specified by the tenth control information.

The third sending unit 3102 is further configured to: after the ninth control information meets an access control rule specified by the tenth control information, send the indication message to the macro network node.

Figure 30:
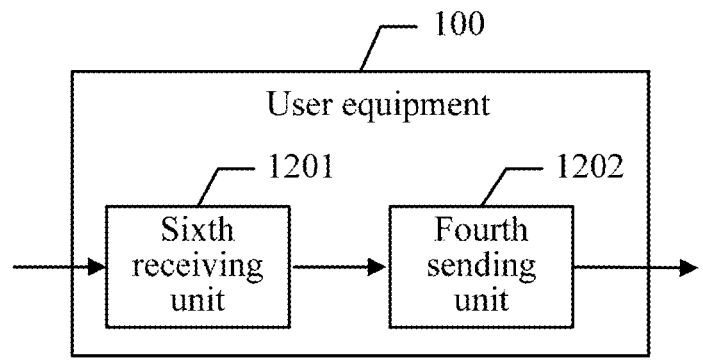
FIG. 30 is a schematic diagram of another embodiment of a user equipment according to an embodiment of the present invention.

Referring to FIG. 30, a user equipment according to an embodiment of the present invention includes:

a sixth receiving unit 1201, configured to receive configuration information sent by a macro network node; and a fourth sending unit 1202, configured to send uplink signaling or uplink data to a micro network node and/or the macro network node according to the configuration information received by the sixth receiving unit 1201.

In the embodiment of the present invention, the sixth receiving unit 1201 receives configuration information sent by a macro network node, and the fourth sending unit 1202 sends uplink signaling or uplink data to a micro network node and/or the macro network node according to the configuration information received by the sixth receiving unit 1201. Compared with the prior art, the user equipment according to the embodiment of the present invention can more rapidly access a network.

Figure 31:
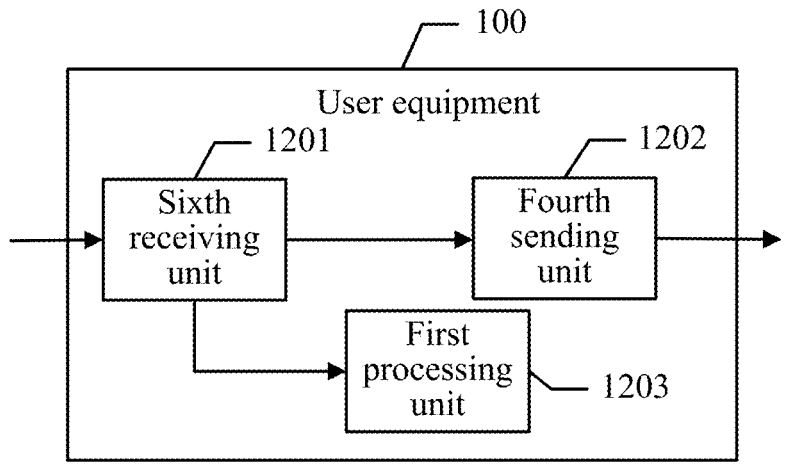
FIG. 31 is a schematic diagram of another embodiment of a user equipment according to an embodiment of the present invention.

Based on the embodiment corresponding to FIG. 30, and referring to FIG. 31, a first optional embodiment of the user equipment according to the embodiment of the present invention includes:

the sixth receiving unit 1201 is configured to receive downlink signaling or downlink data sent by the macro network node and/or the micro network node;

a first processing unit 1203, configured to: when the downlink signaling or downlink data sent by the macro network node and the micro network node is received, delete duplicate signaling or data in the downlink signaling or downlink data sent by the macro network node and in the downlink signaling or downlink data sent by the micro network node.

Based on the embodiment corresponding to FIG. 30 or FIG. 31, in a second optional embodiment of the user equipment provided by the embodiment of the present invention, the fourth sending unit 1202 is configured to send, to the micro network node, the uplink signaling or uplink data transmitted on a radio bearer corresponding to an identity of the RB, where the uplink signaling or uplink data is sent by using a default logical channel and through a micro cell corresponding to an identity of the micro cell.

Based on the second optional embodiment, in a third optional embodiment of the user equipment according to the embodiment of the present invention, the fourth sending unit 1202 is configured to send, to the micro network node, the uplink signaling or uplink data transmitted on a radio bearer corresponding to the identity of the RB, where the uplink signaling or uplink data is sent by using a logical channel corresponding to an identity of the LCH and through the micro cell corresponding to the identity of the micro cell.

Based on the second or the third optional embodiment, in a fourth optional embodiment of the user equipment according to the embodiment of the present invention, the sixth receiving unit 1201 is configured to receive downlink signaling or downlink data sent by the macro network node.

Figure 32:
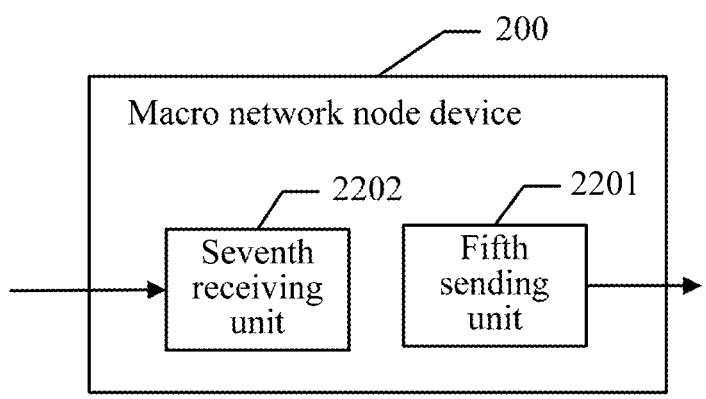
FIG. 32 is a schematic diagram of an embodiment of a macro network node device according to an embodiment of the present invention.

Referring to FIG. 32, an embodiment of a macro network node device according to an embodiment of the present invention includes:

a fifth sending unit 2201, configured to send configuration information to a user equipment, so that the user equipment sends uplink signaling or uplink data to a micro network node and/or a macro network node according to the configuration information; and a seventh receiving unit 2202, configured to receive the uplink signaling or uplink data that is sent by the user equipment and forwarded by the micro network node, and/or receive the uplink signaling or uplink data sent by the user equipment.

In the embodiment of the present invention, the fifth sending unit 2201 sends configuration information to a user equipment, so that the user equipment sends uplink signaling or uplink data to a micro network node and/or a macro network node according to the configuration information; and the seventh receiving unit 2202 receives uplink signaling or uplink data that is sent by the user equipment and forwarded by the micro network node and/or receives uplink signaling or uplink data sent by the user equipment. Compared with the prior art, the macro network node device provided by the embodiment of the present invention can help the UE more rapidly access a network, thereby reducing an access delay of the UE.

Figure 33:
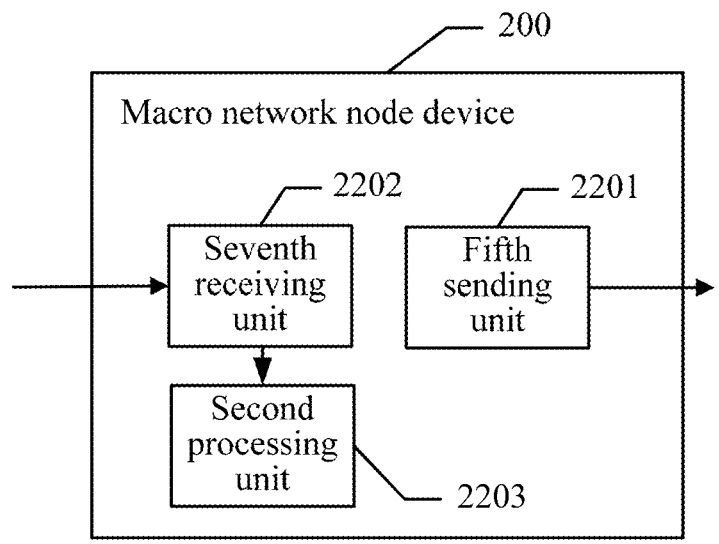
FIG. 33 is a schematic diagram of an embodiment of a macro network node device according to an embodiment of the present invention.

Based on the embodiment corresponding to FIG. 32, and referring to FIG. 33, a first optional embodiment of the macro network node device according to the embodiment of the present invention further includes:

a second processing unit 2203, configured to: when the uplink signaling or uplink data that is sent by the user equipment and forwarded by the micro network node is received and the uplink signaling or uplink data sent by the user equipment is received, delete duplicate signaling or data in the uplink signaling or uplink data sent by the user equipment and in the uplink signaling or uplink data sent by the micro network node.

Figure 34:
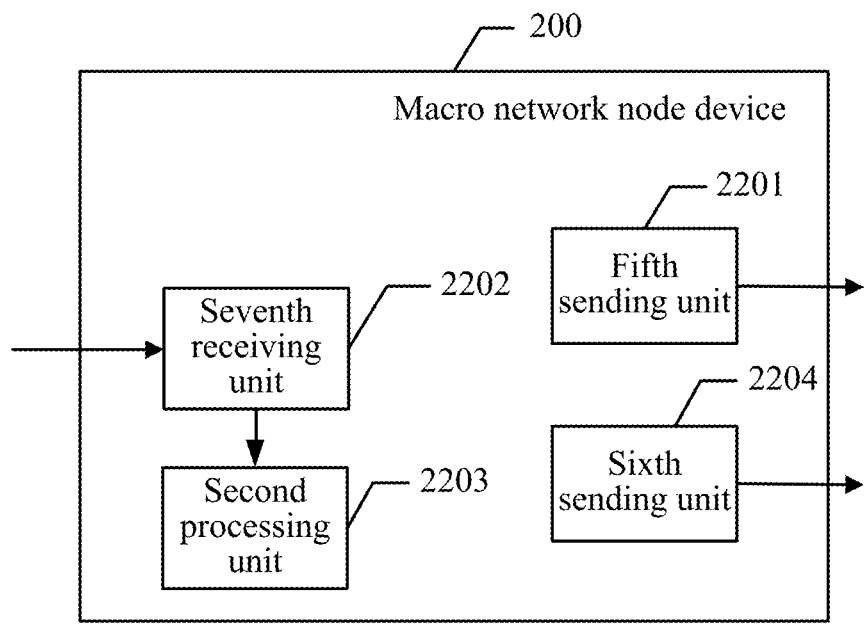
FIG. 34 is a schematic diagram of an embodiment of a macro network node device according to an embodiment of the present invention.

Based on the embodiment corresponding to FIG. 33, and referring to FIG. 34, a second optional embodiment of the macro network node device according to the embodiment of the present invention further includes:

a sixth sending unit, configured to send another configuration information to the micro network node, so that the micro network node forwards downlink signaling or downlink data to the user equipment according to the another configuration information, where the sixth sending unit is further configured to send the downlink signaling or downlink data to the micro network node.

Figure 35:
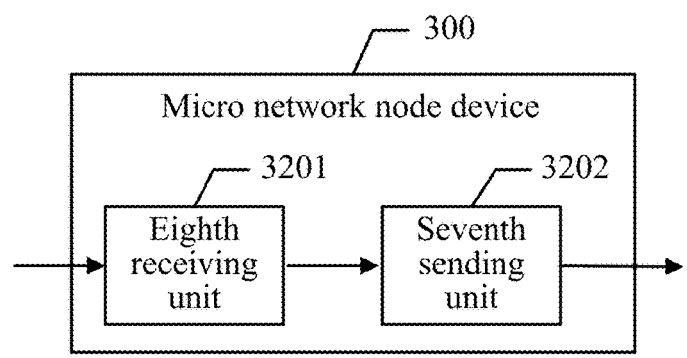
FIG. 35 is a schematic diagram of another embodiment of a micro network node device according to an embodiment of the present invention.

Referring to FIG. 35, a micro network node device according to an embodiment of the present invention includes:

an eighth receiving unit 3201, configured to receive another configuration information sent by a macro network node, where the eighth receiving unit 3201 is further configured to receive downlink signaling or downlink data sent by the macro network node; and a seventh sending unit 3202, configured to forward the downlink signaling or downlink data to the user equipment according to the another configuration information.

In the embodiment of the present invention, the eighth receiving unit 3201 receives another configuration information sent by a macro network node; the eighth receiving unit 3201 is further configured to receive downlink signaling or downlink data sent by the macro network node; and the seventh sending unit 3202 forwards the downlink signaling or downlink data to the user equipment according to the another configuration information. Compared with the prior art, the micro network node device provided by the embodiment of the present invention can help the UE more rapidly access a network, thereby reducing an access delay of the UE.

Based on the embodiment corresponding to FIG. 35, in a first optional embodiment of the micro network node device according to the embodiment of the present invention, the another configuration information includes an identity of the user equipment and an identity of a radio bearer (RB) of the user equipment; and the seventh sending unit 3202 is configured to send, to the user equipment, the downlink signaling or downlink data transmitted on a radio bearer corresponding to the identity of the RB, where the downlink signaling or downlink data is sent by using a default logical channel and through a micro cell corresponding to an identity of the micro cell.

Based on the first optional embodiment, in a second optional embodiment of the micro network node device according to the embodiment of the present invention, when the another configuration information further includes an identity of a logical channel (LCH), the seventh sending unit 3202 is configured to send, to the user equipment, the downlink signaling or downlink data transmitted on a radio bearer corresponding to the identity of the RB, where the downlink signaling or downlink data is sent through a logical channel corresponding to the identity of the LCH by using the micro cell corresponding to the identity of the micro cell.

Figure 36:
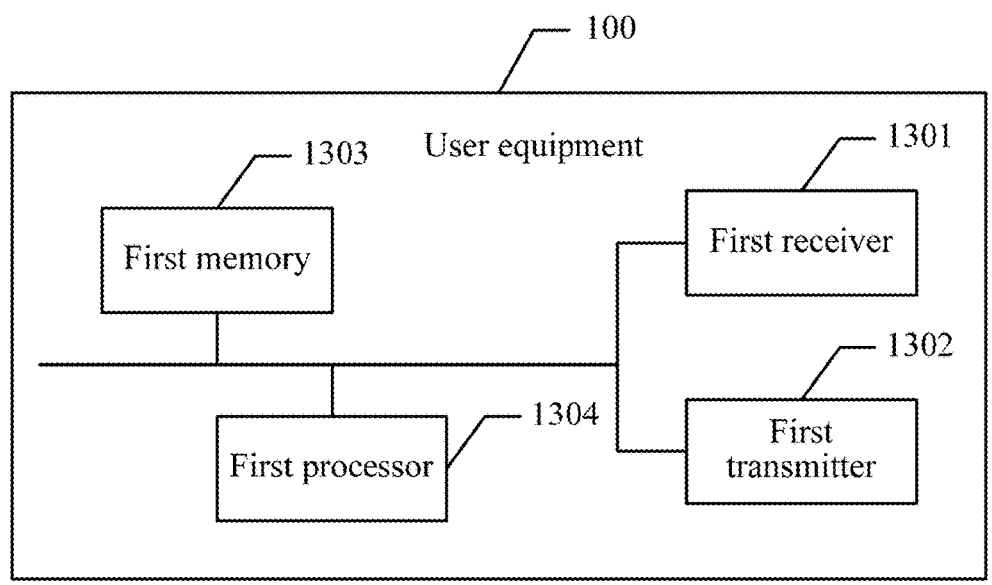
FIG. 36 is a schematic diagram of another embodiment of a user equipment according to an embodiment of the present invention.

Referring to FIG. 36, a user equipment according to an embodiment of the present invention includes: a first receiver 1301, a first transmitter 1302, a first memory 1303, and a first processor 1304.

The first transmitter 1302 is configured to send a request message to a micro network node, so that the micro network node sends an indication message to a macro network node.

The first receiver 1301 is configured to receive an uplink resource (UG) sent according to the indication message by the macro network node.

The first transmitter 1302 is further configured to send uplink signaling or uplink data to the macro network node according to the uplink resource (UG).

In some embodiments of the present invention, the first receiver 1301 is configured to obtain, by using a non-contention-based random access procedure, a first timing advance (TA) and the uplink resource (UG) in the non-contention-based random access procedure; and the first transmitter 1302 is configured to send uplink signaling or uplink data to the macro network node according to the first timing advance (TA) and the uplink resource (UG).

In some embodiments of the present invention, the first receiver 1301 is configured to read an existing second timing advance (TA), and receive, through a physical downlink control channel (PDCCH), the uplink resource (UG) sent by the macro network node; and the first transmitter 1302 is configured to send the uplink signaling or uplink data to the macro network node according to the second timing advance (TA) and the uplink resource (UG).

In some embodiments of the present invention, the first processor 1304 is configured to determine first control information of the uplink signaling or uplink data.

In some embodiments of the present invention, the first receiver 1301 is configured to receive a first configuration message sent by the macro network node, where the first configuration message carries an uplink synchronization flag and/or second control information, and the uplink synchronization flag is used for instructing, after a time alignment timer (TAT) of a timing advance group (TAG) to which a macro cell controlled by the macro network node belongs expires, the user equipment to still maintain continuous running of a TAT of a TAG to which a micro cell controlled by the micro network node belongs.

In some embodiments of the present invention, the first processor 1304 is configured to determine third control information of the uplink signaling or uplink data; and the first transmitter 1302 is configured to: when the third control information meets an access control rule specified by the second control information, send the request message to the micro network node.

In some embodiments of the present invention, the first processor 1304 is configured to determine fourth control information of the uplink signaling or uplink data, where the request message carries the fourth control information, so that after determining that the fourth control information meets an access control rule specified by fifth control information that is carried in a second configuration message sent by the macro network node, the micro network node sends the indication message to the macro network node.

In some embodiments of the present invention, the first receiver 1301 is configured to receive a third configuration message sent by the macro network node, where the third configuration message carries sixth control information;

the first processor 1304 is configured to determine seventh control information of the uplink signaling or uplink data; and the first transmitter 1302 is configured to: when the seventh control information meets an access control rule specified by the sixth control information, send the request message to the micro network node.

In some embodiments of the present invention, the first receiver 1301 is configured to receive a fourth configuration message sent by the macro network node, where the fourth configuration message carries eighth control information;

the first processor 1304 is configured to determine ninth control information of the uplink signaling or uplink data; and the first transmitter 1302 is configured to: when the ninth control information meets an access control rule specified by the eighth control information, send the request message to the micro network node.

Figure 37:
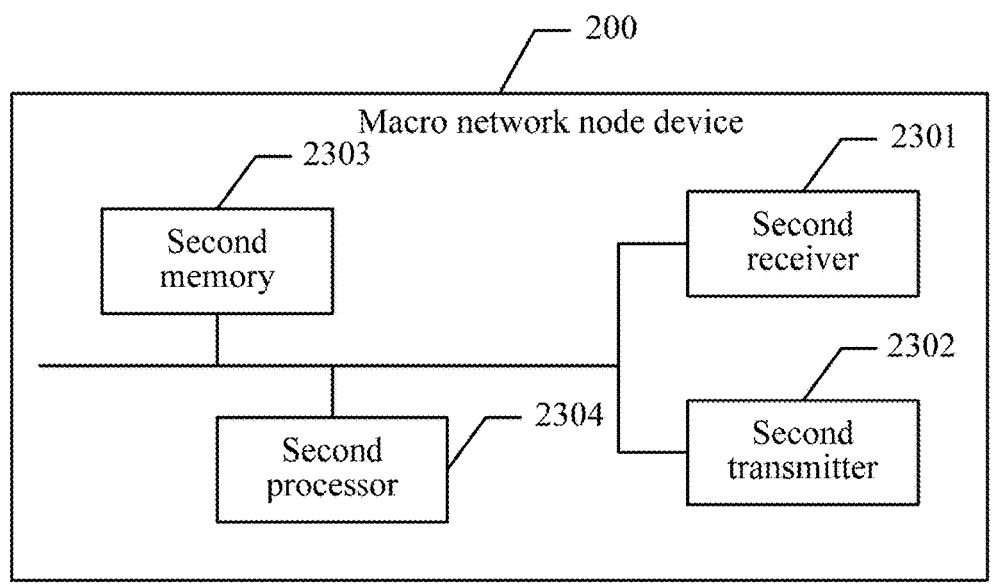
FIG. 37 is a schematic diagram of an embodiment of a macro network node device according to an embodiment of the present invention.

Referring to FIG. 37, a macro network node device according to an embodiment of the present invention includes: a second receiver 2301, a second transmitter 2302, a second memory 2303, and a second processor 2304.

The second receiver 2301 is configured to receive an indication message that is sent by a micro network node after the micro network node receives a request message sent by a user equipment.

The second transmitter 2302 is configured to send an uplink resource (UG) to the user equipment according to the indication message, so that the user equipment sends uplink signaling or uplink data according to the uplink resource (UG).

In some embodiments of the present invention, the second transmitter 2302 is configured to initiate a non-contention-based random access procedure to the user equipment according to the indication message, and send a first timing advance (TA) and the uplink resource (UG) to the user equipment in the non-contention-based random access procedure, so that the user equipment sends uplink signaling or uplink data to the macro network node according to the first timing advance (TA) and the uplink resource (UG).

In some embodiments of the present invention, the second transmitter 2302 is configured to send the uplink resource (UG) to the user equipment through a physical downlink control channel (PDCCH) according to the indication message, so that the user equipment sends, after reading an existing second timing advance (TA), uplink signaling or uplink data to the macro network node according to the second timing advance (TA) and the uplink resource (UG).

In some embodiments of the present invention, both the request message and the indication message carry size information of the uplink signaling or uplink data to be sent; and the second processor 2304 is configured to determine the uplink resource (UG) according to the size information of the uplink signaling or uplink data.

In some embodiments of the present invention, both the request message and the indication message further carry first control information, determined by the user equipment, of the uplink signaling or uplink data; and the second processor 2304 is configured to perform access control on the user equipment according to the first control information.

In some embodiments of the present invention, the second transmitter 2302 is configured to send a first configuration message to the user equipment, where the first configuration message carries an uplink synchronization flag and/or second control information, and the uplink synchronization flag is used for instructing, after a time alignment timer (TAT) of a timing advance group (TAG) to which a macro cell controlled by the macro network node belongs, the user equipment to still maintain continuous running of a TAT of a TAG to which a micro cell controlled by the micro network node belongs.

In some embodiments of the present invention, the second transmitter 2302 is configured to send a second configuration message to the micro network node, where the second configuration message carries fifth control information, so that after determining that fourth control information meets an access control rule specified by the fifth control information, the micro network node sends the indication message to the macro network node; and the second processor 2304 is further configured to: when the indication message carries the fourth control information, perform access control on the user equipment according to the fourth control information.

In some embodiments of the present invention, the second transmitter 2302 is configured to send a third configuration message to the user equipment, where the third configuration message carries sixth control information, so that after determining that seventh control information of the uplink signaling or uplink data meets an access control rule specified by the sixth control information, the user equipment sends the request message to the micro network node; and the second processor 2304 is configured to: when both the request message and the indication message further carry the seventh control information, perform access control on the user equipment according to the seventh control information.

In some embodiments of the present invention, the second transmitter 2302 is configured to send a fourth configuration message to the user equipment, where the fourth configuration message carries eighth control information, so that after determining that ninth control information of the uplink signaling or uplink data meets an access control rule specified by the eighth control information, the user equipment sends the request message to the micro network node; and the second transmitter 2302 is configured to send a fifth configuration message to the micro network node, where the fifth configuration message carries tenth control information, so that after determining that the ninth control information meets an access control rule specified by the tenth control information, the micro network node sends the indication message to the macro network node.

In some embodiments of the present invention, the second processor 2304 performs access control on the user equipment according to the ninth control information.

Figure 38:
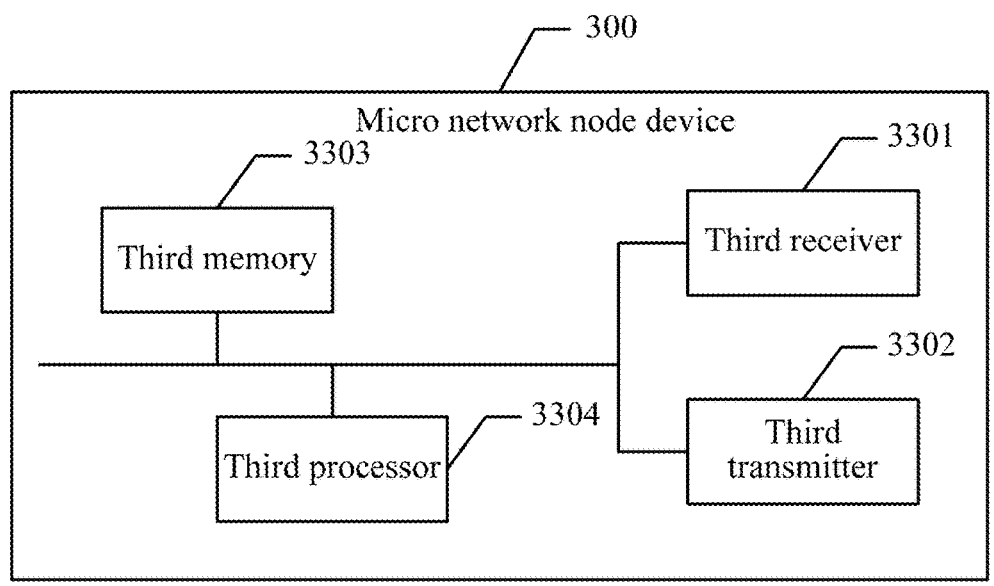
FIG. 38 is a schematic diagram of another embodiment of a micro network node device according to an embodiment of the present invention.

Referring to FIG. 38, a micro network node device according to an embodiment of the present invention includes: a third receiver 3301, a third transmitter 3302, a third memory 3303, and a third processor 3304.

The third receiver 3301 is configured to receive a request message sent by a user equipment; and the third transmitter 3302 is configured to send an indication message to a macro network node according to the request message, so that the macro network node sends an uplink resource (UG) to the user equipment, and then the user equipment sends uplink signaling or uplink data to the macro network node according to the uplink resource (UG).

In some embodiments of the present invention, the request message carries fourth control information, determined by the user equipment, of the uplink signaling or uplink data.

The third receiver 3301 is configured to receive a second configuration message sent by the macro network node, where the second configuration message carries fifth control information.

The third processor 3304 is configured to determine whether the fourth control information meets an access control rule of the fifth control information.

The third transmitter 3302 is configured to: after the fourth control information meets the access control rule specified by the fifth control information, send the indication message to the macro network node.

In some embodiments of the present invention, the third receiver 3301 is configured to: when seventh control information, determined by the user equipment, of the uplink signaling or uplink data meets an access control rule specified by sixth control information that is carried in a third configuration message sent by the macro network node, receive the request message sent by the user equipment, where the request message carries the seventh control information.

In some embodiments of the present invention, the third receiver 3301 is configured to: when ninth control information, determined by the user equipment, of the uplink signaling or uplink data meets an access control rule specified by eighth control information that is carried in a fourth configuration message sent by the macro network node, receive the request message sent by the user equipment, where the request message carries the ninth control information.

The third receiver 3301 is further configured to receive a fifth configuration message sent by the macro network node, where the fifth configuration message carries tenth control information.

The third processor 3304 is configured to determine whether the ninth control information meets an access control rule of the tenth control information.

The third transmitter 3302 is further configured to: when the ninth control information meets an access control rule specified by the tenth control information, send the indication message to the macro network node.

Figure 39:
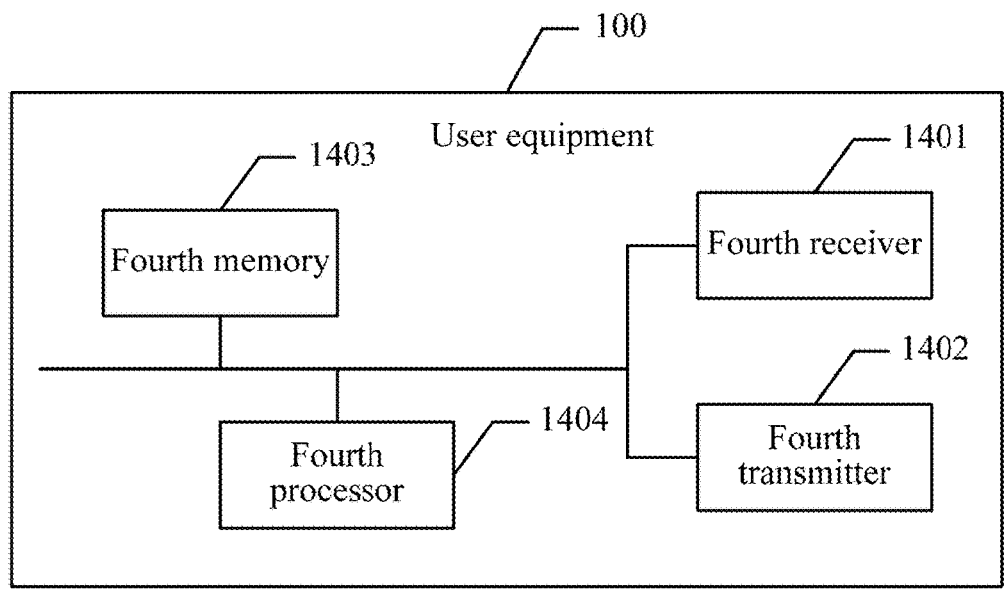
FIG. 39 is a schematic diagram of another embodiment of a user equipment according to an embodiment of the present invention.

Referring to FIG. 39, a user equipment according to an embodiment of the present invention includes: a fourth receiver 1401, a fourth transmitter 1402, a fourth memory 1403, and a fourth processor 1404.

The fourth receiver 1401 is configured to receive configuration information sent by a macro network node.

The fourth transmitter 1402 is configured to send uplink signaling or uplink data to a micro network node and/or the macro network node according to the configuration information.

In some embodiments of the present invention, the fourth receiver 1401 is configured to receive downlink signaling or downlink data sent by the macro network node and/or the micro network node.

The fourth processor 1404 is configured to: when the downlink signaling or downlink data sent by the macro network node and the micro network node is received, delete duplicate signaling or data in the downlink signaling or downlink data sent by the macro network node and in the downlink signaling or downlink data sent by the micro network node.

In some embodiments of the present invention, the configuration information includes an identity of a micro cell controlled by the micro network node and an identity of a radio bearer (RB) of the user equipment.

The fourth transmitter 1402 is configured to send, to the micro network node, the uplink signaling or uplink data transmitted on a radio bearer corresponding to the identity of the RB, where the uplink signaling or uplink data is sent by using a default logical channel and through a micro cell corresponding to the identity of the micro cell.

In some embodiments of the present invention, the fourth transmitter 1402 is configured to send, to the micro network node, the uplink signaling or uplink data transmitted on a radio bearer corresponding to the identity of the RB, where the uplink signaling or uplink data is sent by using a logical channel corresponding to the identity of the LCH and through the micro cell corresponding to the identity of the micro cell.

In some embodiments of the present invention, when the configuration information further includes an uplink flag, the fourth receiver 1401 is configured to receive the downlink signaling or downlink data sent by the macro network node.

Figure 40:
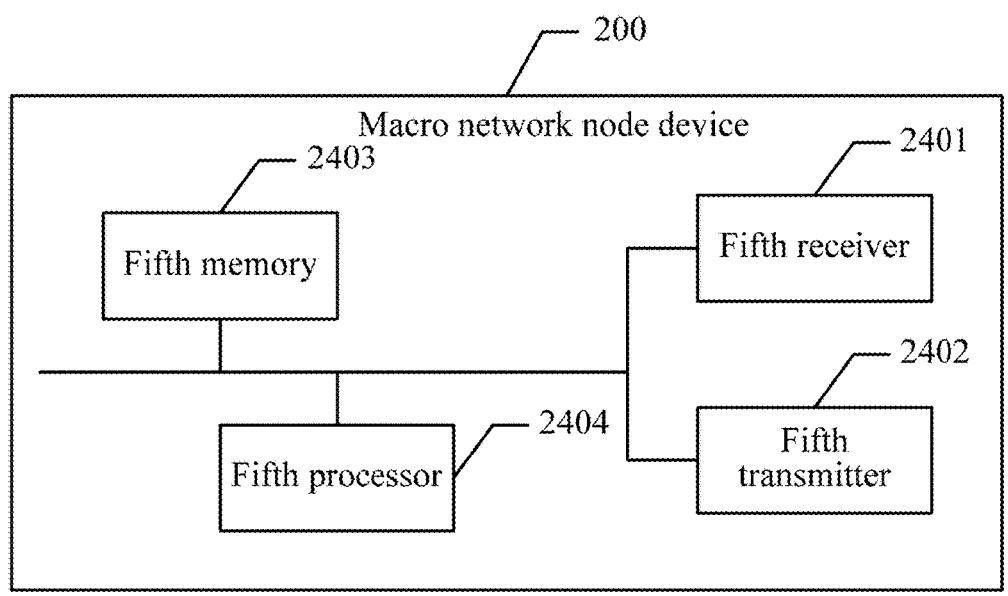
FIG. 40 is a schematic diagram of an embodiment of a macro network node device according to an embodiment of the present invention.

Referring to FIG. 40, an embodiment of a macro network node device according to an embodiment of the present invention includes: a fifth receiver 2401, a fifth transmitter 2402, a fifth memory 2403, and a fifth processor 2404.

The fifth transmitter 2402 is configured to send configuration information to a user equipment, so that the user equipment sends uplink signaling or uplink data to a micro network node and/or a macro network node according to the configuration information; and the fifth receiver 2401 is configured to receive the uplink signaling or uplink data that is sent by the user equipment and forwarded by the micro network node, and/or receive the uplink signaling or uplink data sent by the user equipment.

In some embodiments of the present invention, the fifth processor 2404 is configured to: when the uplink signaling or uplink data that is sent by the user equipment and forwarded by the micro network node is received and the uplink signaling or uplink data sent by the user equipment is received, delete the duplicate signaling or data in the uplink signaling or uplink data sent by the user equipment and in the uplink signaling or uplink data sent by the micro network node.

In some embodiments of the present invention, the fifth transmitter 2402 is configured to send another configuration information to the micro network node, so that the micro network node forwards downlink signaling or downlink data to the user equipment according to the another configuration information; and the fifth transmitter 2402 is configured to send the downlink signaling or downlink data to the micro network node.

Figure 41:
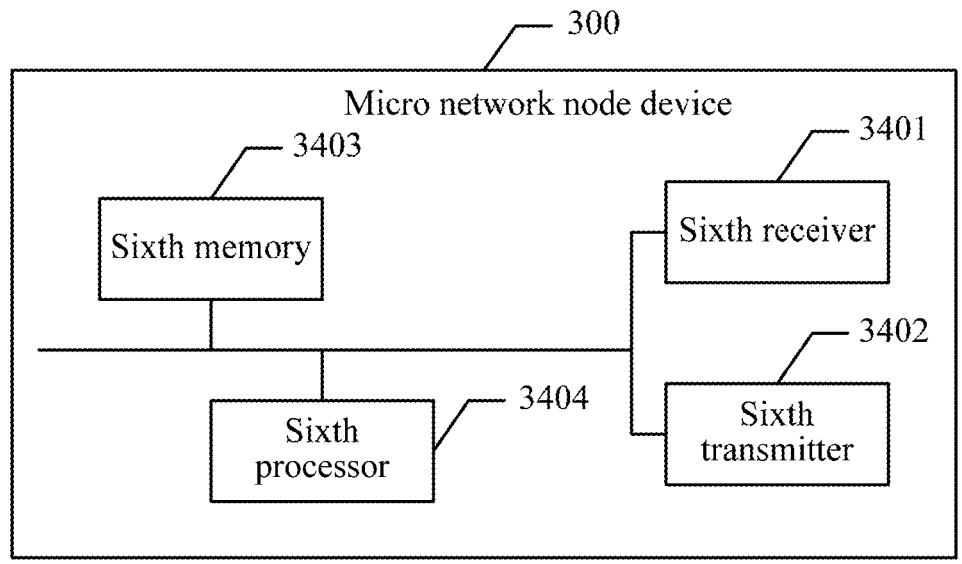
FIG. 41 is a schematic diagram of another embodiment of a micro network node device according to an embodiment of the present invention.

Referring to FIG. 41, an embodiment of a micro network node device according to an embodiment of the present invention includes: a sixth receiver 3401, a sixth transmitter 3402, a sixth memory 3403, and a sixth processor 3404.

The sixth receiver 3401 is configured to receive another configuration information sent by a macro network node.

The sixth transmitter 3402 is further configured to receive downlink signaling or downlink data sent by the macro network node.

The sixth transmitter 3402 is configured to forward the downlink signaling or downlink data to the user equipment according to the another configuration information.

In some embodiments of the present invention, the sixth transmitter 3402 is configured to send, to the user equipment, the downlink signaling or downlink data transmitted on a radio bearer corresponding to the identity of the RB, where the downlink signaling or downlink data is sent by using a default logical channel and through a micro cell corresponding to an identity of the micro cell.

In some embodiments of the present invention, when the another configuration information further includes an identity of the logical channel (LCH), the sixth transmitter 3402 is configured to send, to the user equipment, the downlink signaling or downlink data transmitted on a radio bearer corresponding to the identity of the RB, where the downlink signaling or downlink data is sent by using a logical channel corresponding to the identity of the LCH and through the micro cell corresponding to the identity of the micro cell.

Figure 42A:
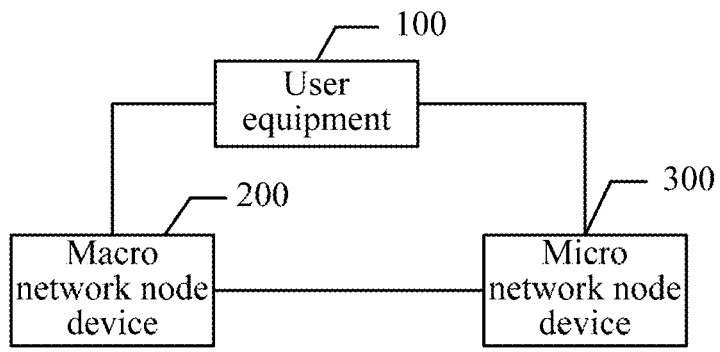
FIG. 42A is a schematic diagram of an embodiment of a communication system according to an embodiment of the present invention.

Referring to FIG. 42A, an embodiment of a communication system according to an embodiment of the present invention includes: a user equipment 100, a macro network node device 200, and a micro network node device 300.

The user equipment 100 is configured to send a request message to a micro network node, so that the micro network node sends an indication message to a macro network node; and receive an uplink resource (UG) sent according to the indication message by the macro network node, and send uplink signaling or uplink data to the macro network node according to the uplink resource (UG).

The macro network node device 200 is configured to receive the indication message that is sent by the micro network node after the micro network node receives the request message sent by the user equipment; and send an uplink resource (UG) to the user equipment according to the indication message, so that the user equipment sends uplink signaling or uplink data according to the uplink resource (UG).

The micro network node device 300 is configured to receive the request message sent by the user equipment; and send the indication message to the macro network node according to the request message, so that the macro network node sends an uplink resource (UG) to the user equipment, and then the user equipment sends the uplink signaling or uplink data according to the uplink resource (UG).

Figure 42B:
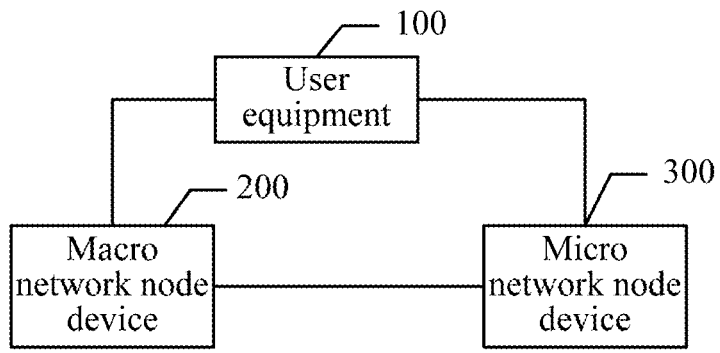
FIG. 42B is a schematic diagram of another embodiment of a communication system according to an embodiment of the present invention.

Referring to FIG. 42B, another embodiment of the communication system according to the embodiment of the present invention includes: a user equipment 100, a macro network node device 200, and a micro network node device 300.

The user equipment 100 is configured to receive configuration information sent by a macro network node, and send uplink signaling or uplink data to a micro network node and/or the macro network node according to the configuration information.

The macro network node device 200 is configured to send configuration information to the user equipment, so that the user equipment sends uplink signaling or uplink data to the micro network node and/or the macro network node according to the configuration information; and receive uplink signaling or uplink data that is sent by the user equipment and forwarded by the micro network node and/or receive uplink signaling or uplink data sent by the user equipment.

The micro network node device 300 is configured to receive another configuration information sent by the macro network node; receive downlink signaling or downlink data sent by the macro network node; and forward the downlink signaling or downlink data to the user equipment according to the another configuration information.

A person of ordinary skill in the art may understand that all or a part of the steps of the methods in the foregoing embodiments may be implemented by a program instructing relevant hardware. The program may be stored in a computer readable storage medium. The storage medium may include a ROM, a RAM, a magnetic disk, or an optical disc.

The communication method, device, and system according to the embodiments of the present invention are introduced in detail above. Specific examples are used for describing principles and implementation manners of the present invention. The foregoing descriptions of the embodiments are merely for understanding a method and a core idea of the present invention. Meanwhile, a person of ordinary skill in the art may make modifications to the specific implementation manners and application ranges according to the idea of the present invention. To sum up, the content of the specification shall not be regarded as a limitation to the present invention.

What is claimed is:

1. A communication method, comprising:
receiving, by user equipment (UE), configuration information from a first network node; and
sending, by the UE, uplink information to the first network node and uplink information to a second network node according to the configuration information, wherein the uplink information sent to the first network node comprises uplink signaling and/or uplink data, and the uplink information sent to the second network node comprises uplink signaling and/or uplink data, and wherein the uplink information sent to the first network node and the uplink information sent to the second network node comprise duplicate information.

2. The method according to claim 1, further comprising:
receiving, by the UE, downlink information from the first network node and downlink information from the second network node; and
deleting, by the UE, duplicate information in the downlink information from the first network node and in the downlink information from the second network node, wherein downlink information from the first network node comprises downlink signaling and/or downlink data, and downlink information from the second network node comprises downlink signaling and/or downlink data.

3. The method according to claim 1, wherein:
the configuration information comprises an identity of a cell controlled by the second network node and an identity of a radio bearer (RB) of the UE; and
sending the uplink information to the second network node comprises:
sending, by using a default logical channel and through a cell corresponding to the identity of the cell controlled by the second network node, the uplink information to the second network node, wherein the uplink information is sent on an RB corresponding to the identity of the RB.

4. The method according to claim 1, wherein:
the configuration information comprises an identity of a cell controlled by the second network node, an identity of a radio bearer (RB) of the UE, and a logical channel (LCH) identity; and
sending the uplink information to the second network node comprises:
sending, by using a logical channel corresponding to the LCH identity and through a cell corresponding to the identity of the cell controlled by the second network node, the uplink information to the second network node, wherein the uplink information is sent on an RB corresponding to the identity of the RB.

5. The method according to claim 1, wherein the configuration information further comprises an uplink synchronization flag, and the uplink synchronization flag is used for instructing, when a time alignment timer (TAT) of a timing advance group (TAG) to which a cell controlled by the first network node belongs expires, the UE to maintain continuous running of a TAT of a TAG to which a cell controlled by the second network node belongs.

6. The method according to claim 1, wherein the first network node is macro network node, and the second network node is a micro network node.

7. A communication device, comprising:
a processor; and
memory comprising instructions that, when executed by the processor, cause the device to:
receive configuration information from a first network node; and
send uplink information to the first network node and uplink information to a second network node according to the configuration information, wherein the uplink information sent to the first network node comprises uplink signaling and/or uplink data, and the uplink information sent to the second network node comprises uplink signaling and/or uplink data, and wherein the uplink information sent to the first network node and the uplink information sent to the second network node comprise duplicate information.

8. The device according to claim 7, wherein the instructions, when executed by the processor, cause the device to:

receive downlink information from the first network node and downlink information from the second network node; and delete duplicate information in the downlink information from the first network node and in the downlink information from the second network node, wherein downlink information from the first network node comprises downlink signaling and/or downlink data, and downlink information from the second network node comprises downlink signaling and/or downlink data.

9. The device according to claim 7, wherein:

the configuration information comprises an identity of a cell controlled by the second network node and an identity of a radio bearer (RB) of the UE; and to send the uplink information to the second network node, the instructions, when executed by the processor, cause the device to:

send, by using a default logical channel and through a cell corresponding to the identity of the cell controlled by the second network node, the uplink information to the second network node, wherein the uplink information is sent on an RB corresponding to the identity of the RB.

10. The device according to claim 7, wherein:

the configuration information comprises an identity of a cell controlled by the second network node, an identity of a radio bearer (RB) of the UE, and a logical channel (LCH) identity; and to send the uplink information to the second network node, the instructions, when executed by the processor, cause the device to:

send, by using a logical channel corresponding to the LCH identity and through a cell corresponding to the identity of the cell controlled by the second network node, the uplink information to the second network node, wherein the uplink information is sent on an RB corresponding to the identity of the RB.

11. The device according to claim 7, wherein the configuration information further comprises an uplink synchronization flag, and the uplink synchronization flag is used for instructing, when a time alignment timer (TAT) of a timing advance group (TAG) to which a cell controlled by the first network node belongs expires, the UE to maintain continuous running of a TAT of a TAG to which a cell controlled by the second network node belongs.

12. The device according to claim 7, wherein the first network node is macro network node, and the second network node is a micro network node.

13. A communication method, comprising:

sending, by a first network node, configuration information to a user equipment (UE) for indicating the user equipment to send uplink information to the first network node and send uplink information to a second network node; and receiving, by the first network node, the uplink information from the UE;

receiving, by the first network node, the uplink information forwarded by the second network node from the UE; and deleting, by the first network node, duplicate information in the uplink information forwarded by the second network node and in the uplink information from the user equipment.

14. The method according to claim 13, wherein the configuration information comprises an identity of a cell controlled by the second network node and an identity of a radio bearer (RB) of the UE, and the uplink information on an RB corresponding to the identity of the RB is sent, to the second network node, by using a default logical channel and through a cell corresponding to the identity of the cell controlled by the second network node.

15. The method according to claim 13, wherein the configuration information comprises an identity of a cell controlled by the second network node, an identity of a radio bearer (RB) of the UE, and a logical channel (LCH) identity, and the uplink information on an RB corresponding to the identity of the RB is sent, to the second network node, by using a logical channel corresponding to the LCH identity and through a cell corresponding to the identity of the cell controlled by the second network node.

16. The method according to claim 13, further comprising:

sending, by the first network node, other configuration information to the second network node for the second network node to forward downlink information to the UE according to the other configuration information; and sending, by the first network node, the downlink information to the second network node.

17. A communication device, comprising:

a processor; and memory comprising instructions that, when executed by the processor, cause the device to:

send configuration information to a user equipment (UE) for indicating the user equipment to send uplink information to the first network node and send uplink information to a second network node;

receive the uplink information from the UE;

receive the uplink information forwarded by the second network node from the UE; and delete duplicate information in the uplink information forwarded by the second network node and in the uplink information from the user equipment.

18. The device according to claim 17, wherein the configuration information comprises an identity of a cell controlled by the second network node and an identity of a radio bearer (RB) of the UE, and the uplink information on an RB corresponding to the identity of the RB is sent, to the second network node, by using a default logical channel and through a cell corresponding to the identity of the cell controlled by the second network node.

19. The device according to claim 17, wherein the configuration information comprises an identity of a cell controlled by the second network node, an identity of a radio bearer (RB) of the UE, and a logical channel (LCH) identity, and the uplink information on an RB corresponding to the identity of the RB is sent, to the second network node, by using a logical channel corresponding to the LCH identity and through a cell corresponding to the identity of the cell controlled by the second network node.

20. The device according to claim 17, wherein the instructions, when executed by the processor, cause the device to:

send other configuration information to the second network node to forward downlink information to the UE according to the other configuration information; and send the downlink information to the second network node.

21. The device according to claim 17, wherein the first network node is a macro network node, and the second network node is a micro network node.

* * * * *